United States Patent
Tomura et al.

(10) Patent No.: US 9,555,714 B2
(45) Date of Patent: Jan. 31, 2017

(54) POWER SUPPLY SYSTEM OF ELECTRIC-POWERED VEHICLE

(71) Applicant: TOYOTA JIDOSHA KABUSHIKI KAISHA, Toyota-shi, Aichi-ken (JP)

(72) Inventors: Shuji Tomura, Nagakute (JP); Masanori Ishigaki, Nagakute (JP); Naoki Yanagizawa, Nagakute (JP); Masaki Okamura, Toyota (JP)

(73) Assignee: TOYOTA JIDOSHA KABUSHIKI KAISHA, Toyota-Shi (JP)

( * ) Notice: Subject to any disclaimer, the term of this patent is extended or adjusted under 35 U.S.C. 154(b) by 0 days.

(21) Appl. No.: 14/897,028

(22) PCT Filed: Jun. 5, 2014

(86) PCT No.: PCT/JP2014/064940
§ 371 (c)(1),
(2) Date: Dec. 9, 2015

(87) PCT Pub. No.: WO2014/199891
PCT Pub. Date: Dec. 18, 2014

(65) Prior Publication Data
US 2016/0129796 A1 May 12, 2016

(30) Foreign Application Priority Data
Jun. 11, 2013 (JP) .................. 2013-122499

(51) Int. Cl.
*B60L 11/18* (2006.01)
*B60K 6/22* (2007.10)
(Continued)

(52) U.S. Cl.
CPC .............. *B60L 11/1814* (2013.01); *B60K 6/22* (2013.01); *B60K 6/445* (2013.01); *B60L 7/14* (2013.01);
(Continued)

(58) Field of Classification Search
CPC ..... B60L 11/1814; B60L 11/123; B60L 11/14; B60L 11/18; B60L 11/1862; B60L 11/1883; B60L 2210/12; B60L 2210/14; B60L 2240/526; B60L 2240/527; B60L 2240/529; B60L 2240/545; B60L 2240/547; B60L 2240/549; B60L 2240/80; B60L 7/14; B60K 6/22; B60K 6/445; B60W 10/00; B60W 10/06; B60W 10/08; B60W 10/26; B60W 20/00; B60W 20/13; H02J 1/10; H02J 7/00; H02J 7/34; H02M 3/158; Y02T 10/6217; Y02T 10/6239; Y02T 10/7044; Y02T 10/705; Y02T 10/7077; Y02T 10/7225; Y02T 10/7233; Y02T 90/34; Y10S 903/906
See application file for complete search history.

(56) References Cited

U.S. PATENT DOCUMENTS

2012/0089290 A1* 4/2012 Kato ................. B60K 6/445
701/22
2013/0297130 A1 11/2013 Yaguchi et al.
(Continued)

FOREIGN PATENT DOCUMENTS

CN 102458907 A 5/2012
JP 2003-204603 A 7/2003
(Continued)

*Primary Examiner* — Helal A Algahaim
*Assistant Examiner* — Genna Mott
(74) *Attorney, Agent, or Firm* — Andrews Kurth Kenyon LLP

(57) ABSTRACT

A hybrid vehicle can travel using outputs from an engine and a second motor-generator. A first motor-generator can generate electric power for charging a plurality of DC power supplies using the output from the engine during vehicle traveling or during a vehicle stop. A power supply system includes a power converter connected across the DC power supplies and an electric power line connected in common to
(Continued)

| OPERATION MODE | USED POWER SUPPLY | OUTPUT VOLTAGE | S1 | S2 | S3 | S4 | k |
|---|---|---|---|---|---|---|---|
| PB | 10a AND 10b (IN PARALLEL) | VH→VH* | PWM CONTROL | | | | CONTROLLABLE |
| SB | 10a AND 10b (IN SERIES) | VH→VH* | PWM CONTROL | | | | $\frac{Va}{Va+Vb}$ |
| aB | ONLY 10a | VH→VH* | PWM CONTROL | | | | 1.0 |
| bB | ONLY 10b | VH→VH* | PWM CONTROL | | | | 0.0 |
| PD | 10a AND 10b | VH=Va=Vb | ON | ON | OFF | ON | INTERNAL RESISTANCE RATIO |
| SD | 10a AND 10b | VH=Va+Vb | ON | OFF | ON | OFF | $\frac{Va}{Va+Vb}$ |
| aD | ONLY 10a | VH=Va (Va>Vb) | ON | ON | OFF | OFF | 1.0 |
| bD | ONLY 10b | VH=Vb (Vb>Va) | ON | OFF | OFF | ON | 0.0 | the first and second motor-generators. A control device generates operation commands for the first and second motor-generators and the engine so as to ensure driving request power based on a vehicle traveling condition and charging/discharging request power for the DC power supplies as a whole. The setting of the charging/discharging request power is switched in accordance with an operation mode of the power converter.

7 Claims, 31 Drawing Sheets

(51) Int. Cl.
  *B60L 7/14* (2006.01)
  *B60L 11/12* (2006.01)
  *B60L 11/14* (2006.01)
  *B60W 10/00* (2006.01)
  *B60W 10/06* (2006.01)
  *B60W 10/08* (2006.01)
  *B60W 10/26* (2006.01)
  *B60W 20/00* (2016.01)
  *H02M 3/158* (2006.01)
  *H02J 1/10* (2006.01)
  *H02J 7/00* (2006.01)
  *H02J 7/34* (2006.01)
  *B60K 6/445* (2007.10)

(52) U.S. Cl.
  CPC .............. *B60L 11/123* (2013.01); *B60L 11/14* (2013.01); *B60L 11/18* (2013.01); *B60L 11/1862* (2013.01); *B60L 11/1883* (2013.01); *B60W 10/00* (2013.01); *B60W 10/06* (2013.01); *B60W 10/08* (2013.01); *B60W 10/26* (2013.01); *B60W 20/00* (2013.01); *B60W 20/13* (2016.01); *H02J 1/10* (2013.01); *H02J 7/00* (2013.01); *H02J 7/34* (2013.01); *H02M 3/158* (2013.01); *B60L 2210/12* (2013.01); *B60L 2210/14* (2013.01); *B60L 2240/526* (2013.01); *B60L 2240/527* (2013.01); *B60L 2240/529* (2013.01); *B60L 2240/545* (2013.01); *B60L 2240/547* (2013.01); *B60L 2240/549* (2013.01); *B60L 2240/80* (2013.01); *Y02T 10/6217* (2013.01); *Y02T 10/6239* (2013.01); *Y02T 10/705* (2013.01); *Y02T 10/7044* (2013.01); *Y02T 10/7077* (2013.01); *Y02T 10/7225* (2013.01); *Y02T 10/7233* (2013.01); *Y02T 90/34* (2013.01); *Y10S 903/906* (2013.01)

(56) References Cited

U.S. PATENT DOCUMENTS

| | | |
|---|---|---|
| 2014/0145694 A1 | 5/2014 | Ishigaki et al. |
| 2014/0265605 A1 | 9/2014 | Ishigaki et al. |
| 2016/0001660 A1 | 1/2016 | Tomura et al. |

FOREIGN PATENT DOCUMENTS

| | | |
|---|---|---|
| JP | 2004-248472 A | 9/2004 |
| JP | 3794224 B2 | 7/2006 |
| JP | 2007-517190 A | 6/2007 |
| JP | 2008-054363 A | 3/2008 |
| JP | 2010-057288 A | 3/2010 |
| JP | 2012-070514 A | 4/2012 |
| JP | 2013-013234 A | 1/2013 |
| JP | 2013-093923 A | 5/2013 |
| JP | 2014-193090 A | 10/2014 |
| WO | 2005050810 A1 | 6/2005 |
| WO | 2012039131 A2 | 3/2012 |
| WO | 2012101798 A1 | 8/2012 |

* cited by examiner

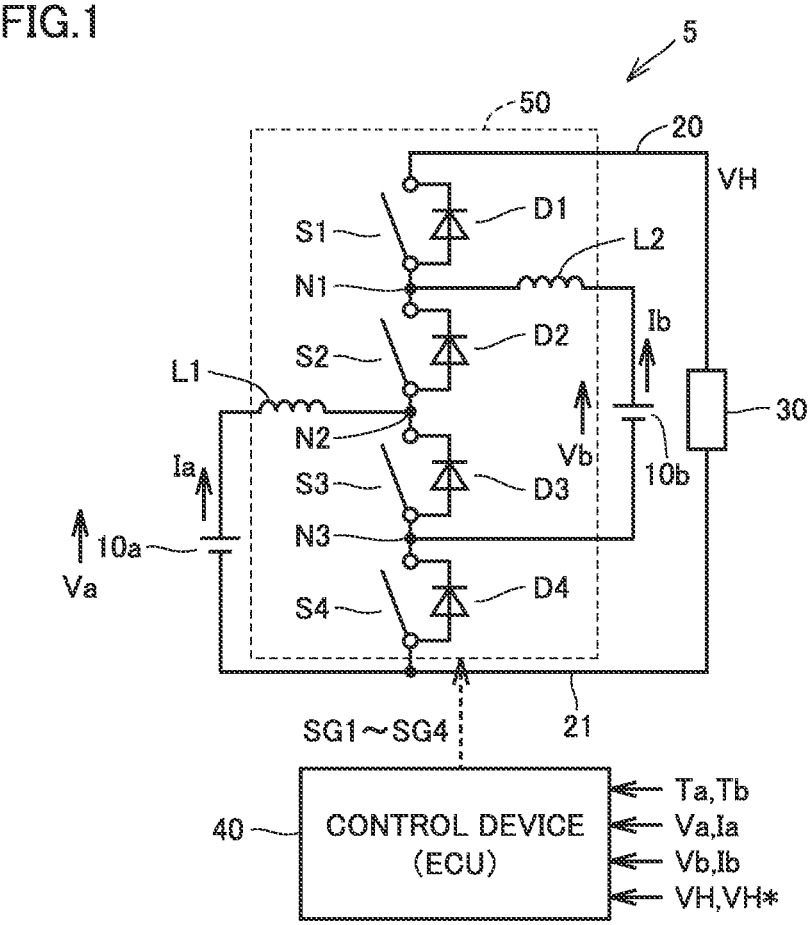

FIG.2

| OPERATION MODE | USED POWER SUPPLY | OUTPUT VOLTAGE | S1 | S2 | S3 | S4 | k |
|---|---|---|---|---|---|---|---|
| PB | 10a AND 10b (IN PARALLEL) | VH→VH* | PWM CONTROL | | | | CONTROLLABLE |
| SB | 10a AND 10b (IN SERIES) | VH→VH* | PWM CONTROL | | | | $\dfrac{Va}{Va+Vb}$ |
| aB | ONLY 10a | VH→VH* | PWM CONTROL | | | | 1.0 |
| bB | ONLY 10b | VH→VH* | PWM CONTROL | | | | 0.0 |
| PD | 10a AND 10b | VH=Va=Vb | ON | ON | OFF | ON | INTERNAL RESISTANCE RATIO |
| SD | 10a AND 10b | VH=Va+Vb | ON | OFF | ON | OFF | $\dfrac{Va}{Va+Vb}$ |
| aD | ONLY 10a | VH=Va (Va>Vb) | ON | ON | OFF | OFF | 1.0 |
| bD | ONLY 10b | VH=Vb (Vb>Va) | ON | OFF | OFF | ON | 0.0 |

| | CALCULATION EXPRESSION |
|---|---|
| SG1 | /SDa or /SDb |
| SG2 | /SDa or SDb |
| SG3 | SDa or SDb |
| SG4 | SDa or /SDb |
| Dffa | (VH*−Va)/VH* |
| Dffb | (VH*−Vb)/VH* or (VH−Vb)/VH |

FIG.24

| MD | CHARGING/DISCHARGING REQUEST POWER (REFLECTED IN LOAD POWER PL) |
|---|---|
| PB MODE | Pchg=Pchga+Pchgb |
| SD,SB MODE | Pchg=Pchgb (PROTECT SMALL-CAPACITY DC POWER SUPPLY) |
| aD,aB MODE | Pchg=Pchga |
| bD,bB MODE | Pchg=Pchgb |
| PD MODE | Pchg=0 |

FIG.25

| MD | CIRCULATION POWER VALUE |
|---|---|
| PB MODE | Pr=-Pchgb |
| OTHER THAN PB MODE | Pr=0 |

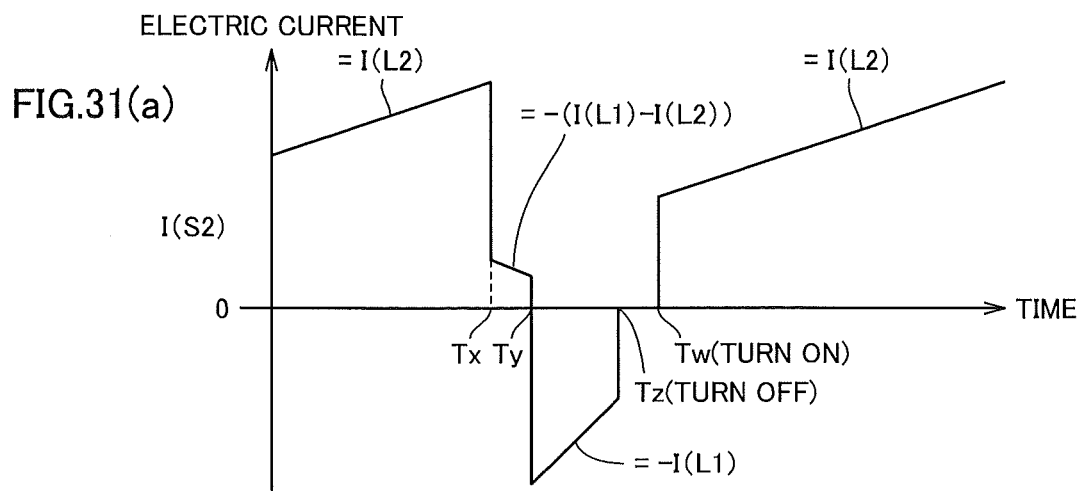
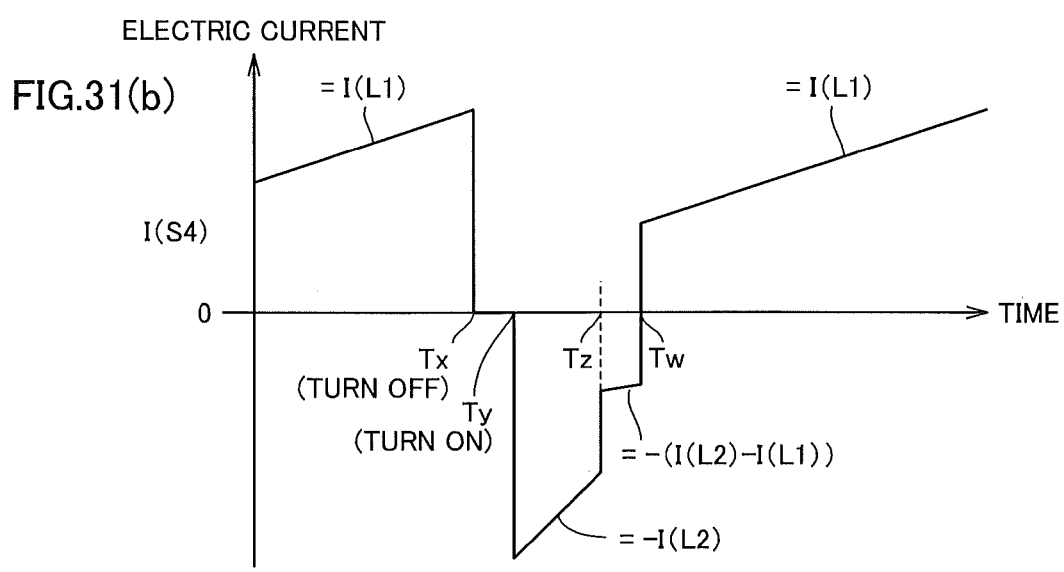

FIG.32

| OPERATING CONDITION | CONDITION OF DC POWER SUPPLY 10a – CONDITION OF DC POWER SUPPLY 10b | WAVEFORMS OF I(L1) AND I(L2) | REDUCTION OF TURN-ON LOSS | REDUCTION OF TURN-OFF LOSS | REDUCTION OF CONDUCTION LOSS | REDUCTION OF CONDUCTION LOSS |
|---|---|---|---|---|---|---|
| A | POWERING – POWERING | I(L2) I(L1) Ta Tb Tc | S2 AT Tb | S4 AT Tb | S4 IN Ta–Tb | S2 IN Tb–Tc |
| B | REGENERATIVE – REGENERATIVE | I(L1) I(L2) Ta Tb Tc | S4 AT Tb | S2 AT Tb | S2 IN Ta–Tb | S4 IN Tb–Tc |
| C | REGENERATIVE – POWERING | I(L2) I(L1) Ta Tb Tc | S3 AT Ta | S1 AT Ta | S1 IN Ta–Tb | S3 IN Tc–Ta |
| D | POWERING – REGENERATIVE | I(L1) I(L2) Ta Tb Tc | S1 AT Tc | S3 AT Tc | S1 IN Tb–Tc | S3 IN Tc–Ta |

|  | PB MODE | SB MODE |
|---|---|---|
| SG1 | /SDa or /SDb | /SDc→/SDa or /SDb |
| SG2 | /SDa or SDb | SDc→SDa and SDb |
| SG3 | SDa or SDb | FIXED AT H →SDa or SDb |
| SG4 | SDa or /SDb | SDc→SDa and SDb |

| MODE | k | Pr | CURRENT FB CONTROL | S1~S4 |
|---|---|---|---|---|
| PB | 0≤k≤1.0 | FREE | BOTH OF Ia, Ib | FIG. 21 |
| aB | 1.0 | 0 | ONLY Ia | S1,S2 /SDa<br>S3,S4　SDa |
| bB | 0 | 0 | ONLY Ib | S1,S4 /SDb<br>S2,S3　SDb |
| SB | Va/(Va+Vb) | 0 | ONLY ONE OF Ia AND Ib | FIG. 33 |

POWER SUPPLY SYSTEM OF ELECTRIC-POWERED VEHICLE

CROSS-REFERENCE TO RELATED APPLICATIONS

This is a national phase application based on the PCT International Patent Application No. PCT/JP2014/064940 filed Jun. 5, 2014, claiming priority to Japanese Patent Application No. 2013-122499 filed Jun. 11, 2013, the entire contents of both of which are incorporated herein by reference.

TECHNICAL FIELD

The present invention relates to a power supply system, and more particularly to controlling a power supply system in which a powertrain of an electric-powered vehicle having a mechanism for generating electric power for charging a DC power supply during vehicle traveling serves as a load.

BACKGROUND ART

A power supply device for a vehicle in which a plurality of power supplies are combined to supply electric power to a load is described in, for example, Japanese Patent Laying-Open No. 2008-54363 (PTD 1). PTD 1 describes controlling the state of charge of a power storage unit in the power supply device including a constant voltage source implemented by a battery and the power storage unit implemented by a storage element. Specifically, during a stop of the power supply device, voltage control is performed so as to leave the power storage unit at a voltage lower than that in the full state of charge, thereby elongating the life of the power storage unit.

Japanese Patent Laying-Open No. 2012-70514 (PTD 2) describes a configuration of a power converter capable of, by means of controlling of a plurality of switching elements, switching between an operation mode of carrying out DC/DC conversion with two DC power supplies connected in series (series connection mode) and an operation mode of carrying out DC/DC conversion with the two DC power supplies used in parallel (parallel connection mode).

CITATION LIST

Patent Document

PTD 1: Japanese Patent Laying-Open No. 2008-54363
PTD 2: Japanese Patent Laying-Open No. 2012-70514

SUMMARY OF INVENTION

Technical Problem

PTD 2 describes applying a power converter to an electric-powered vehicle. On the other hand, in an electric-powered vehicle (representatively, a hybrid vehicle) having a powertrain configured to be capable of generating electric power for charging a DC power supply during vehicle traveling or during a vehicle stop, charging/discharging of the DC power supply can be controlled during vehicle traveling by controlling operation of the powertrain.

Therefore, if the power converter configured such that the manner of charging/discharging of the DC power supplies varies depending on an operation mode as in PTD 2 is applied to the above-described electric-powered vehicle having the powertrain, it may not be possible to appropriately control SOC (State of Charge) of each of the DC power supplies when charging/discharging control of the DC power supplies is executed uniformly between operation modes. However, PTD 2 does not particularly mention about charging/discharging control of the DC power supplies under the condition that an operation mode is selected.

The present invention was made to solve such a problem, and has an object to control SOC of a plurality of DC power supplies appropriately in correspondence with selection of an operation mode of a power converter when a power supply system configured to include a power converter connected across the plurality of DC power supplies and a common electric power line is applied to an electric-powered vehicle having a mechanism for generating electric power for charging the DC power supplies during vehicle traveling or during a vehicle stop.

Solution to Problem

In an aspect of the present invention, a power supply system in which a powertrain of an electric-powered vehicle configured to include a first motor-generator for generating vehicle driving force a first motor-generator for generating vehicle driving force serves as a load includes an electric power line, a plurality of DC power supplies, a power converter connected across the plurality of DC power supplies and the electric power line, and a control device. The electric power line is electrically connected to the load. The control device is configured to control operations of the load and the power converter. The load is configured to have a mechanism for generating electric power for charging the plurality of DC power supplies during vehicle traveling or during a vehicle stop, in accordance with an operation command from the control device. The power converter includes a plurality of switching elements and is configured to control a voltage of the electric power line by operating with one operation mode among a plurality of operation modes different in a manner of power conversion between the plurality of DC power supplies and the electric power line being applied. The control device includes a charging/discharging control unit and an operation command generation unit. The charging/discharging control unit makes a setting of charging/discharging request power for the plurality of DC power supplies as a whole based on conditions of the plurality of DC power supplies. The operation command generation unit generates an operation command for the load so as to ensure driving request power based on a traveling condition of the electric-powered vehicle and the charging/discharging request power. The charging/discharging control unit switches the setting of the charging/discharging request power in accordance with the operation mode.

Preferably, in the power supply system of an electric-powered vehicle, the plurality of DC power supplies are implemented by a first DC power supply and a second DC power supply. The plurality of switching elements have first to fourth switching elements. The first switching element is electrically connected across a first node and the electric power line. The second switching element is electrically connected across a second node and the first node. The third switching element is electrically connected across a third node, electrically connected to a negative electrode terminal of the second DC power supply, and the second node. The fourth switching element is electrically connected across a negative electrode terminal of the first DC power supply and the third node. The power converter further has first and second reactors. The first reactor is electrically connected across the second node and a positive electrode terminal of the first DC power supply. The second reactor electrically connected across the first node and a positive electrode terminal of the second DC power supply.

More preferably, the first DC power supply has a capacity higher than the capacity of the second DC power supply. The plurality of operation modes include first and second modes. In the first mode, the power converter causes the first and second DC power supplies to execute DC voltage conversion in parallel with the electric power line by controlling on/off of the first to fourth switching elements. In the second mode, the power converter carries out DC voltage conversion with the electric power line with the first and second DC power supplies connected in series by keeping the third switching element on and controlling on/off of the first, second and fourth switching elements. The charging/discharging control unit, in the first mode, sets the charging/discharging request power so as to bring SOC of each of the first and second DC power supplies close to a control target, and in the second mode, sets the charging/discharging request power so as to bring SOC of the second DC power supply close to the control target.

More preferably, the plurality of operation modes further include a third mode. In the third mode, the power converter keeps on/off of the first to fourth switching elements to maintain the state where the first and second DC power supplies are connected in series with the electric power line. The charging/discharging control unit, in the third mode, sets the charging/discharging request power so as to bring SOC of the second DC power supply close to the control target.

Still more preferably, the plurality of operation modes further include fourth and fifth modes. In the fourth mode, the power converter executes DC voltage conversion between one of the first and second DC power supplies and the electric power line by controlling on/off of the first to fourth switching elements, and maintains the state where the other one of the first and second DC power supplies is electrically disconnected from the electric power line. In the fifth mode, the power converter keeps on/off of the first to fourth switching elements to maintain the state where one of the first and second DC power supplies is electrically connected to the electric power line and the other one of the first and second DC power supplies is electrically disconnected from the electric power line. The charging/discharging control unit, in each of the fourth and fifth modes, sets the charging/discharging request power so as to bring SOC of the one of the first and second DC power supplies close to the control target.

More preferably, the control device forcedly selects the first mode when present SOC in the first or second DC power supply reaches a control upper limit value or a control lower limit value.

Preferably, the control device includes a control arithmetic unit, a power distribution ratio setting unit, a power command value arithmetic unit, a current control unit, and a pulse width modulation unit. The control arithmetic unit calculates overall input/output power from the plurality of DC power supplies as a whole to the electric power line based on a deviation between a voltage detection value of the electric power line and a voltage command value. The power distribution ratio setting unit switches a power distribution ratio between the plurality of DC power supplies in response to a change of the operation mode. The power command value arithmetic unit sets a power command value for each of the plurality of DC power supplies in accordance with the overall input/output power and the power distribution ratio. The current control unit calculates, for each of the plurality of DC power supplies, a duty ratio for controlling output from each of the plurality of DC power supplies based on a deviation of a current detection value from a current command value obtained by dividing the power command value by an output voltage. The pulse width modulation unit generates on/off control signals for the plurality of switching elements based on control pulse signals respectively obtained in accordance with pulse width modulation by comparing the duty ratio calculated for each of the plurality of DC power supplies and a carrier wave.

More preferably, the control device further includes a first protection unit and a second protection unit. The first protection unit is provided in correspondence with a predetermined DC power supply among the plurality of DC power supplies, and restricts a power command value for the predetermined DC power supply set in accordance with the power distribution ratio to fall within a first power range set in accordance with the operating condition of the predetermined DC power supply. The second protection unit restricts overall input/output power to fall within a second power range set in accordance with the operating condition of the plurality of DC power supplies.

Alternatively, preferably, the control device includes a control arithmetic unit, a power distribution ratio setting unit, a power command value arithmetic unit, first and second current control units, and a pulse width modulation unit. The control arithmetic unit calculates overall input/output power from the first and second DC power supplies as a whole to the electric power line based on a deviation between a voltage detection value of the electric power line and a voltage command value. The power distribution ratio setting unit switches a power distribution ratio between the first and second DC power supplies in accordance with a change of the operation mode. The power command value arithmetic unit sets a first power command value for the first DC power supply and a second power command value for the second DC power supply in accordance with the overall input/output power and the power distribution ratio. The first current control unit calculates a first duty ratio for controlling output from the first DC power supply based on a deviation of a current detection value of the first DC power supply from a first current command value obtained by dividing the first power command value by the output voltage of the first DC power supply. The second current control unit calculates a second duty ratio for controlling output from the second DC power supply based on a deviation of a current detection value of the second DC power supply from a second current command value obtained by dividing the second power command value by the output voltage of the second DC power supply. The pulse width modulation unit generates on/off control signals for the first to fourth switching elements based on first and second control pulse signals respectively obtained in accordance with pulse width modulation by comparing a first carrier wave and the first duty ratio and comparing a second carrier wave and the second duty ratio.

More preferably, the control device further includes a carrier wave generation unit. The carrier wave generation unit variably controls the phase difference between the first and second carrier waves in accordance with the calculated first and second duty ratios such that a transition edge of the first control pulse signal coincides with the transition edge of the second control pulse signal on the time axis.

Preferably, the powertrain further includes the engine and the second motor-generator. The second motor-generator is configured to generate electric power using output from the engine. The operation command generation unit generates operation commands for the engine, and the first and second motor-generators such that overall request power in accordance with the sum of the driving request power and charging/discharging request power is distributed among the first and second motor-generators and the engine.

More preferably, the powertrain further includes a differential gear including first to third rotation elements that can rotate relative to one another. The load further includes inverters. In the differential gear, the first rotation element is mechanically coupled to an output shaft of the engine. The second rotation element is mechanically coupled to an output shaft of the second motor-generator. The third rotation element is mechanically coupled to a drive shaft mechanically coupled to a drive wheel and to an output shaft of the first motor-generator. The inverters are connected across the electric power line and each of the first and second motor-generators, respectively.

Preferably, the powertrain is configured to have a mechanism for generating electric power for charging the plurality of DC power supplies during vehicle traveling or a vehicle stop using output from a motor power supply different from the first motor-generator.

Advantageous Effects of Invention

According to the present invention, when a power supply system configured to include a power converter connected across a plurality of DC power supplies and a common electric power line is applied to an electric-powered vehicle having a mechanism for generating electric power for charging the DC power supplies during vehicle traveling or during a vehicle stop, SOC of the plurality of DC power supplies can be controlled appropriately in correspondence with selection of an operation mode of the power converter.

BRIEF DESCRIPTION OF DRAWINGS

FIG. 1 is a circuit diagram showing a configuration of a power supply system of an electric-powered vehicle according to a first embodiment of the present invention.

FIG. 2 is a table for describing a plurality of operation modes possessed by a power converter shown in FIG. 1.

FIG. 24 is a table showing setting formulas for a charging/discharging request power value in each operation mode made by a charging/discharging power setting unit shown in FIG. 21.

FIG. 25 is a table showing setting formulas for a circulation power value in each operation mode made by a power circulation control unit shown in FIG. 21.

FIG. 31(a) and FIG. 31(b) show diagrams of waveforms of electric currents of switching elements under the phases of currents shown in FIG. 30.

FIG. 32 is a table for describing carrier phase control in the PB mode in each operating condition of DC power supplies.

DESCRIPTION OF EMBODIMENTS

First Embodiment

Circuit Configuration of Power Converter

Figure 3A:
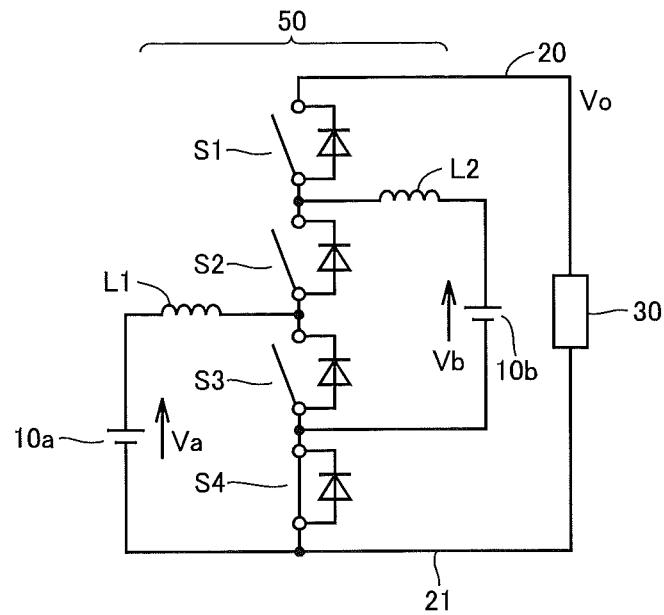
FIG. 3(a) and FIG. 3(b) show circuit diagrams describing a first circuit operation in a PB mode.

FIG. 1 is a circuit diagram showing a configuration of a power supply system of an electric-powered vehicle according to a first embodiment of the present invention.

Referring to FIG. 1, a power supply system 5 includes a plurality of DC power supplies 10a and 10b, a load 30, and a power converter 50.

In the present embodiment, DC power supplies 10a and 10b are each implemented by a secondary battery, such as a lithium-ion secondary battery or a nickel-metal hydride battery, or a DC voltage source element having excellent output characteristics, such as an electric double layer capacitor or a lithium-ion capacitor. DC power supplies 10a and 10b correspond to "a first DC power supply" and "a second DC power supply", respectively.

Power converter 50 is connected across DC power supplies 10a, 10b and an electric power line 20. Power converter 50 controls a DC voltage on electric power line 20 (hereinafter also referred to as an output voltage VH) connected to load 30 in accordance with a voltage command value VH*. That is, electric power line 20 is provided in common for DC power supplies 10a and 10b.

Load 30 operates upon receipt of output voltage VH of power converter 50. Voltage command value VH* is set at a voltage suitable for the operation of load 30. Voltage command value VH* is preferably set to be variable in accordance with the operating condition of load 30.

Power supply system 5 of the present embodiment is applied to an electrical system of an electric-powered vehicle. Furthermore, load 30 is configured to have a mechanism for generating electric power for charging DC power supplies 10a, 10b during traveling or a stop of the electric-powered vehicle (hereinafter also referred to as a "power generation mechanism"). With the power generation mechanism, electric power for charging DC power supplies 10a, 10b can be actively generated during vehicle traveling or during a vehicle stop, different from regenerative power generation at the time of vehicle deceleration that depends on the traveling situation. Therefore, in power supply system 5, charging/discharging control (hereinafter referred to as "SOC control") for properly adjusting SOC of DC power supplies 10a, 10b can be executed by generating electric power for charging DC power supplies 10a, 10b by the power generation mechanism. It is noted that a specific exemplary configuration of load 30 will be described later in detail.

Power converter 50 includes switching elements S1 to S4 as well as reactors L1 and L2. In the present embodiment, for the switching elements, IGBTs (Insulated Gate Bipolar Transistors), power MOS (Metal Oxide Semiconductor) transistors, power bipolar transistors, or the like can be used. For switching elements S1 to S4, antiparallel diodes D1 to D4 are arranged, respectively. On/off of switching elements S1 to S4 can be controlled in response to control signals SG1 to SG4, respectively. That is, switching elements S1 to S4 are respectively turned on when control signals SG1 to SG4 are at a high level (hereinafter referred to as an H level), and are turned off when they are at a low level (hereinafter referred to as an L level).

Switching element S1 is electrically connected across electric power line 20 and a node N1. Reactor L2 is connected across node N1 and a positive electrode terminal of DC power supply 10b. Switching element S2 is electrically connected across nodes N1 and N2. Reactor L1 is connected across node N2 and a positive electrode terminal of DC power supply 10a.

Switching element S3 is electrically connected across nodes N2 and N3. Node N3 is electrically connected to a negative electrode terminal of DC power supply 10b. Switching element S4 is electrically connected across node N3 and a ground line 21. Ground line 21 is electrically connected to load 30 and a negative electrode terminal of DC power supply 10a.

As understood from FIG. 1, power converter 50 is configured to include a boost chopper circuit in correspondence with each of DC power supplies 10a and 10b. That is, for DC power supply 10a, a bidirectional current first boost chopper circuit is formed in which switching elements S1 and S2 serve as upper arm elements and switching elements S3 and S4 serve as lower arm elements. Similarly, for DC power supply 10b, a bidirectional current second boost chopper circuit is formed in which switching elements S1 and S4 serve as upper arm elements and switching elements S2 and S3 serve as lower arm elements.

Switching elements S1 to S4 are included in both of a power conversion path formed across DC power supply 10a and electric power line 20 by the first boost chopper circuit and a power conversion path formed across DC power supply 10b and electric power line 20 by the second boost chopper circuit.

Control device 40 is implemented by, for example, an electronic control unit (ECU) including a CPU (Central Processing Unit) and a memory neither shown, and is configured to perform arithmetic processing through use of a detection value of each sensor based on maps and programs stored in that memory. Alternatively, at least part of control device 40 may be configured to execute predetermined numeric/logic operation processing by hardware, such as an electronic circuit.

Control device 40 generates control signals SG1 to SG4 for controlling on/off of switching elements S1 to S4, respectively, in order to control output voltage VH to load 30. It is noted that although not shown in FIG. 1, detectors (voltage sensors, current sensors) for the voltage (hereinafter referred to as Va) and electric current (hereinafter referred to as Ia) of DC power supply 10a, the voltage (hereinafter referred to as Vb) and electric current (hereinafter referred to as Ib) of DC power supply 10b, as well as output voltage VH are provided. Furthermore, detectors (temperature sensors) for the temperatures (hereinafter referred to as Ta and Tb) of DC power supplies 10a and 10b are also preferably provided. The outputs of these detectors are given to control device 40.

In the configuration of FIG. 1, switching elements S1 to S4 correspond to "a first switching element" to "a fourth switching element", respectively, and reactors L1 and L2 correspond to "a first reactor" and "a second reactor", respectively.

(Operation Mode in Power Converter)

Power converter 50 has a plurality of operation modes different in the mode of DC power conversion between DC power supplies 10a, 10b and electric power line 20.

FIG. 2 shows a plurality of operation modes possessed by power converter 50.

Referring to FIG. 2, the operation modes are roughly divided into a "boosting mode (B)" of boosting output voltage(s) of DC power supply 10a and/or DC power supply 10b following periodic on/off control of switching elements S1 to S4 and a "direct connection mode (D)" of electrically connecting DC power supply 10a and/or DC power supply 10b to electric power line 20 with switching elements S1 to S4 kept on/off.

The boosting mode includes a "parallel boosting mode (hereinafter referred to as a PB mode)" in which power converter 50 carries out parallel DC/DC conversion between DC power supplies 10a, 10b and electric power line 20 and a "series boosting mode (hereinafter referred to as an SB mode)" in which power converter 50 carries out DC/DC conversion between DC power supplies 10a and 10b connected in series and electric power line 20. The PB mode corresponds to the "parallel connection mode" in PTD 2 in which DC/DC conversion is carried out with DC power supplies 10a and 10b connected in parallel. The SB mode corresponds to the "series connection mode" in PTD 2.

The boosting mode further includes an "independent mode with DC power supply 10a (hereinafter referred to as an aB mode)" of carrying out DC/DC conversion between only DC power supply 10a and electric power line 20 and an "independent mode with DC power supply 10b (hereinafter referred to as a bB mode)" of carrying out DC/DC conversion between only DC power supply 10b and electric power line 20.

In the aB mode, DC power supply 10b is unused while being maintained in the state electrically disconnected from electric power line 20 as long as output voltage VH is controlled to be higher than voltage Vb of DC power supply 10b. Similarly, in the bB mode, DC power supply 10a is unused while being maintained in the state electrically disconnected from electric power line 20 as long as output voltage VH is controlled to be higher than voltage Va of DC power supply 10a.

In each of the PB mode, SB mode, aB mode, and bB mode included in the boosting mode, output voltage VH of electric power line 20 is controlled in accordance with voltage command value VH*. Control of switching elements S1 to S4 in each of these modes will be described later.

The direct connection mode includes a "parallel direct connection mode (hereinafter referred to as a PD mode)" of maintaining the state in which DC power supplies 10a and 10b are connected in parallel with electric power line 20 and a "series direct connection mode (hereinafter referred to as an SD mode)" of maintaining the state in which DC power supplies 10a and 10b are connected in series with electric power line 20.

In the PD mode, switching elements S1, S2 and S4 are kept on, while switching element S3 is kept off. Accordingly, output voltage VH becomes equivalent to voltages Va, Vb of DC power supplies 10a, 10 (strictly, a higher one of Va and Vb). Since the voltage difference between Va and Vb will produce a short-circuit current at DC power supplies 10a and 10b, the PD mode can be applied limitedly when the voltage difference is small.

In the SD mode, switching elements S2 and S4 are kept off, while switching elements S1 and S3 are kept on. Accordingly, output voltage VH becomes equivalent to the sum of voltages Va and Vb of DC power supplies 10a and 10b (VH=Va+Vb).

Further, the direct connection mode includes a "direct connection mode of DC power supply 10a (hereinafter referred to as an aD mode)" of electrically connecting only DC power supply 10a to electric power line 20 and a "direct connection mode of DC power supply 10b (hereinafter referred to as a bD mode)" of electrically connecting only DC power supply 10b to electric power line 20.

In the aD mode, switching elements S1 and S2 are kept on, while switching elements S3 and S4 are kept off. Accordingly, DC power supply 10b is brought into the state disconnected from electric power line 20, and output voltage VH becomes equivalent to voltage Va of DC power supply 10a (VH=Va). In the aD mode, DC power supply 10b is unused while being maintained in the state electrically disconnected from electric power line 20. It is noted that if the aD mode is applied when Vb>Va holds, a short-circuit current will flow from DC power supply 10b to 10a by way of switching element S2. Thus, Va>Vb is a necessary condition for applying the aD mode.

Similarly, in the bD mode, switching elements S1 and S4 are kept on, while switching elements S2 and S3 are kept off. Accordingly, DC power supply 10a is brought into the state disconnected from electric power line 20, and output voltage VH becomes equivalent to voltage Vb of DC power supply 10b (VH=Vb). In the bD mode, DC power supply 10a is unused while being maintained in the state electrically disconnected from electric power line 20. It is noted that when the bD mode is applied when Va>Vb holds, a short-circuit current will flow from DC power supply 10a to 10b by way of diode D2. Thus, Vb>Va is a necessary condition for applying the bD mode.

In each of the PD mode, SD mode, aD mode, and bD mode included in the direct connection mode, output voltage VH of electric power line 20 is determined depending on voltages Va and Vb of DC power supplies 10a and 10b, and therefore, cannot be directly controlled. Thus, in each mode included in the direct connection mode, output voltage VH can no longer be set at a voltage suitable for the operation of load 30, so that power loss of load 30 may be increased.

On the other hand, in the direct connection mode, power loss of power converter 50 is significantly suppressed because switching elements S1 to S4 are not turned on/off. Therefore, depending on the operating condition of load 30, there is a possibility that power loss of power supply system 5 as a whole can be suppressed because the amount of decrease in power loss of power converter 50 becomes larger than the amount of increase in power loss of load 30 by applying the direct connection mode.

Figure 3B:
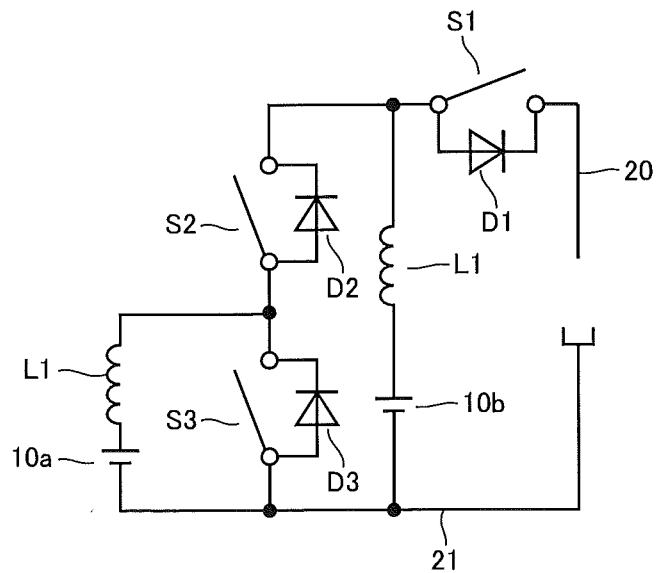

In FIG. 3, the PB mode corresponds to a "first mode", and the SB mode corresponds to a "second mode." The SD mode corresponds to a "third mode." The aB mode and bB mode correspond to a "fourth mode." The aD mode and bD mode correspond to a "fifth mode."

In power converter 50 according to the present embodiment, any operation mode is selected from among the plurality of operation modes shown in FIG. 3 in accordance with the operating conditions of DC power supplies 10a, 10b and/or load 30.

(Circuit Operation in Each Operation Mode)

Next, a circuit operation of power converter 50 in each operation mode will be described. First, a circuit operation in the PB mode of carrying out parallel DC/DC conversion between DC power supplies 10a and 10b and electric power line 20 will be described with reference to FIGS. 3 to 6.

(Circuit Operation in PB Mode)

Figure 4A:
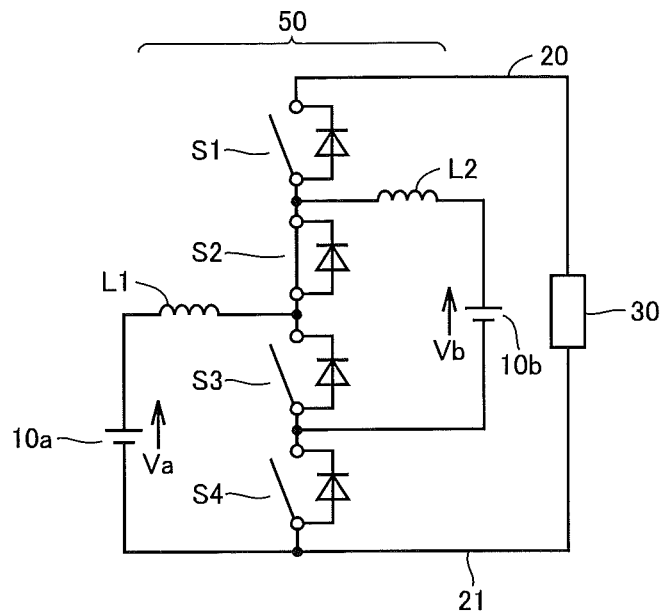
FIG. 4(a) and FIG. 4(b) show circuit diagrams describing a second circuit operation in the PB mode.
Figure 4B:
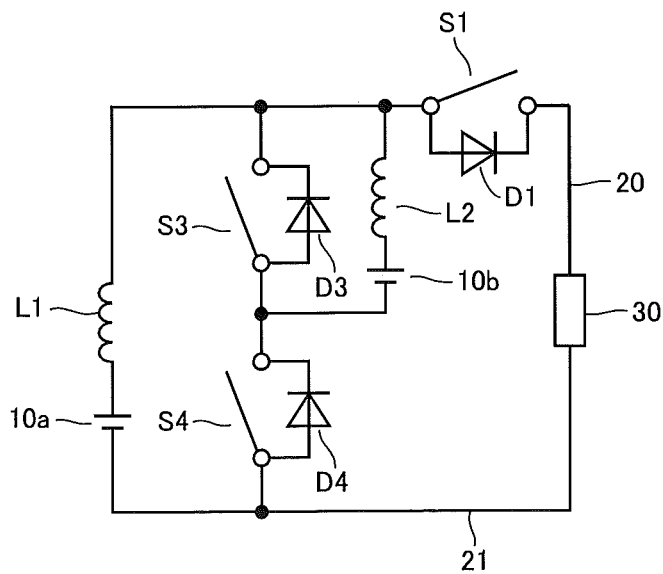

As shown in FIGS. 3 and 4, by turning on switching element S4 or S2, it is possible to connect DC power supplies 10a and 10b in parallel with electric power line 20. Here, in the parallel connection mode, the equivalent circuit will differ depending on which is higher between voltage Va of DC power supply 10a and voltage Vb of DC power supply 10b.

As shown at (a) of FIG. 3, when Vb>Va holds, by turning on switching element S4, DC power supplies 10a and 10b are connected in parallel through switching elements S2 and S3. The equivalent circuit at this time is as shown at (b) of FIG. 3.

Referring to (b) of FIG. 3, between DC power supply 10a and electric power line 20, by on/off control of switching element S3, the on- and off-periods of the lower arm element can be formed alternately. Similarly, between DC power supply 10b and electric power line 20, by common on/off control of switching elements S2 and S3, the on- and off-periods of the lower arm element of the boost chopper circuit can be formed alternately. Switching element S1 operates as a switch for controlling regeneration from load 30.

On the other hand, as shown at (a) of FIG. 4, when Va>Vb holds, by turning on switching element S2, DC power supplies 10a and 10b are connected in parallel through switching elements S3 and S4. The equivalent circuit at this time is as shown at (b) of FIG. 4.

Referring to (b) of FIG. 4, between DC power supply 10b and electric power line 20, by on/off control of switching element S3, the on- and off-periods of the lower arm element can be formed alternately. Similarly, between DC power supply 10a and electric power line 20, by common on/off control of switching elements S3 and S4, the on- and off-periods of the lower arm element of the boost chopper circuit can be formed alternately. Switching element S1 operates as a switch for controlling regeneration from load 30.

Next, referring to FIGS. 5 and 6, the boost operation in the PB mode of power converter 50 will be described in detail.

Figure 5A:
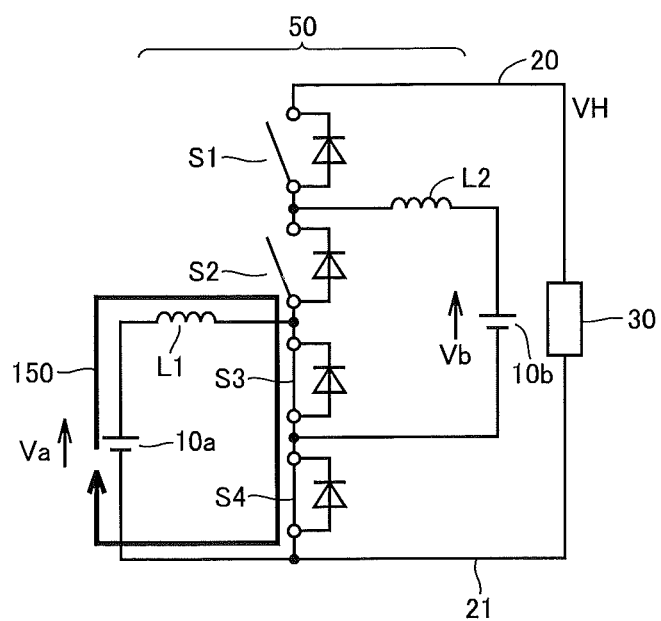
FIG. 5(a) and FIG. 5(b) show circuit diagrams describing DC/DC conversion (boost operation) for a first DC power supply in the PB mode.
Figure 5B:
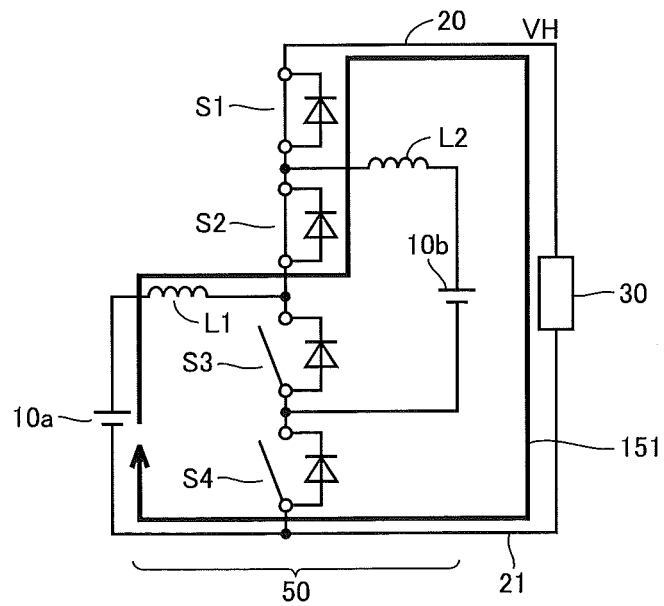

FIG. 5 shows DC/DC conversion (boost operation) for DC power supply 10a in the PB mode.

Referring to (a) of FIG. 5, by turning on the pair of switching elements S3 and S4 and turning off the pair of switching elements S1 and S2, an electric current path 150 for storing energy in reactor L1 is formed. Thus, a state in which the lower arm element of the boost chopper circuit is on is obtained.

In contrast, referring to (b) of FIG. 5, by turning off the pair of switching elements S3 and S4 and turning on the pair of switching elements S1 and S2, an electric current path 151 for outputting the energy stored in reactor L1 together with the energy of DC power supply 10a is formed. Thus, a state in which the upper arm element of the boost chopper circuit is on is obtained.

By alternately repeating the first period in which the pair of switching elements S3 and S4 is on and at least one of switching elements S1 and S2 is off and the second period in which the pair of switching elements S1 and S2 is on and at least one of switching elements S3 and S4 is off, electric current path 150 at (a) of FIG. 5 and electric current path 151 at (b) of FIG. 5 are formed alternately.

As a result, a boost chopper circuit having the pair of switching elements S1 and S2 equivalently serving as the upper arm element and the pair of switching elements S3 and S4 equivalently serving as the lower arm element is formed for DC power supply 10a. In the DC/DC converting operation shown in FIG. 7, there is no electric current circulation path to DC power supply 10b and, therefore, DC power supplies 10a and 10b do not interfere with each other. Specifically, electric power input/output to/from DC power supplies 10a and 10b can be controlled independently.

In such DC/DC conversion, the relation expressed by Expression (1) below holds between voltage Va of DC power supply 10a and output voltage VH of electric power line 20. In Expression (1), Da represents the duty ratio of the period in which the pair of switching elements S3 and S4 is on.

$$VH=1/(1-Da)\cdot Va \qquad (1)$$

Figure 6A:
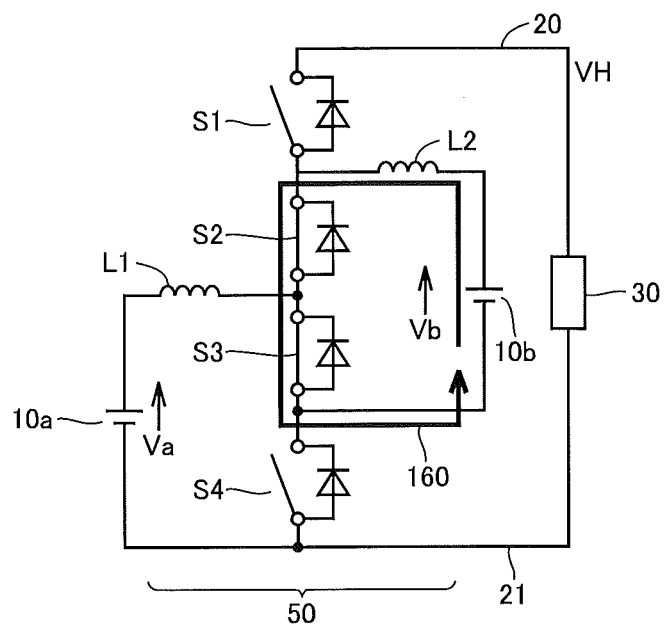
FIG. 6(a) and FIG. 6(b) show circuit diagrams describing DC/DC conversion (boost operation) for a second DC power supply in the PB mode.
Figure 6B:
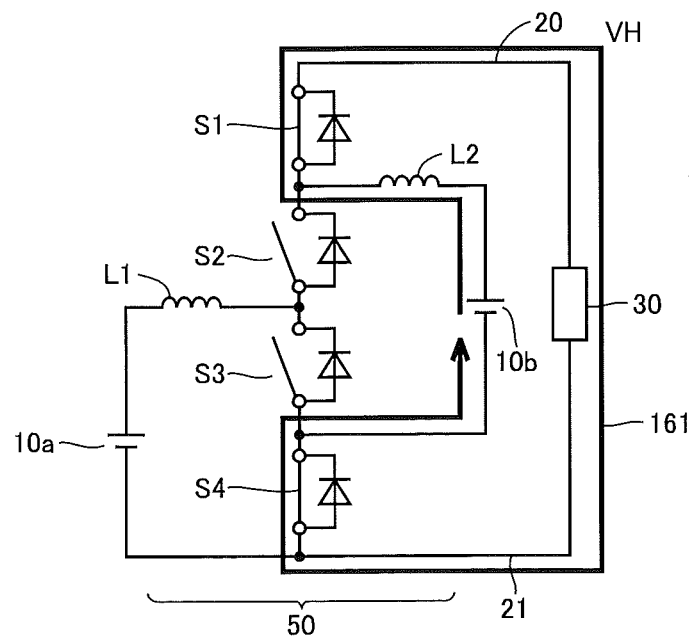

FIG. 6 shows DC/DC conversion (boost operation) for DC power supply 10b in the PB mode.

Referring to (a) of FIG. 6, by turning on the pair of switching elements S2 and S3 and turning off the pair of switching elements S1 and S4, an electric current path 160 for storing energy in reactor L2 is formed. Thus, a state in which the lower arm element of the boost chopper circuit is on is obtained.

In contrast, referring to (b) of FIG. 6, by turning off the pair of switching elements S2 and S3 and turning on the pair of switching elements S1 and S4, an electric current path 161 for outputting the energy of reactor L2 together with the energy of DC power supply 10b is formed. Thus, a state in which the upper arm element of the boost chopper circuit is on is obtained.

By alternately repeating the first period in which the pair of switching elements S2 and S3 is on and at least one of switching elements S1 and S4 is off and the second period in which the pair of switching elements S1 and S4 is on and at least one of switching elements S2 and S3 is off, electric current path 160 at (a) of FIG. 6 and electric current path 161 at (b) of FIG. 6 are formed alternately.

As a result, a boost chopper circuit having the pair of switching elements S1 and S4 equivalently serving as the upper arm element and the pair of switching elements S2 and S3 equivalently serving as the lower arm element is formed for DC power supply 10b. In the DC/DC converting operation shown in FIG. 8, there is no electric current circulation path including DC power supply 10a and, therefore, DC power supplies 10a and 10b do not interfere with each other. Specifically, electric power input/output to/from DC power supplies 10a and 10b can be controlled independently.

In such DC/DC conversion, the relation expressed by Expression (2) below holds between voltage Vb of DC power supply 10b and output voltage VH of electric power line 20. In Expression (2), Db represents the duty ratio of the period in which the pair of switching elements S2 and S3 is on.

$$VH=1/(1-Db)\cdot Vb \qquad (2)$$

Figures 7, 8:
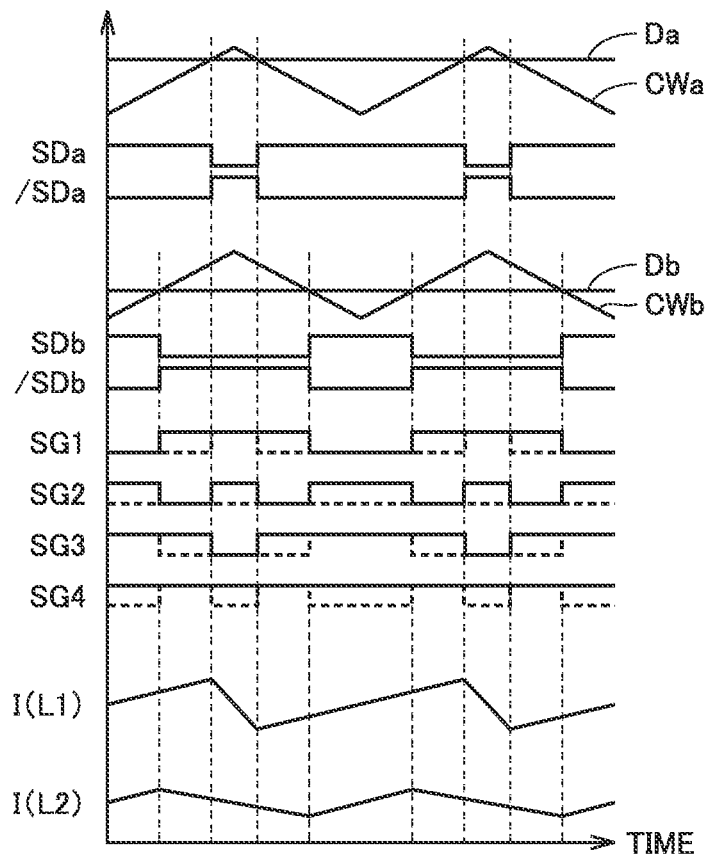
FIG. 7 is a waveform diagram showing an example of control operation for switching elements of the power converter in the PB mode.
FIG. 8 is a table for describing logical calculation expressions for setting a control signal for each switching element in the PB mode.

FIG. 7 shows a diagram of waveforms for describing an exemplary operation for controlling switching elements in the PB mode. FIG. 7 shows an example when a carrier wave CWa used in PWM control for DC power supply 10a and a carrier wave CWb used in PWM control for DC power supply 10b have the same frequency and are in phase.

Referring to FIG. 7, in the PB mode, for example, the output of one of DC power supplies 10a and 10b can be subjected to feedback control (voltage control) so as to compensate for a voltage deviation ΔVH of output voltage VH (ΔVH=VH*−VH) and the output of the other one of DC power supplies 10a and 10b can be subjected to feedback control (electric current control) so as to compensate for an electric current deviation from an electric current command value for electric current Ia or Ib, as described in PTD 3. On this occasion, a command value for electric current control (Ia* or Ib*) can be set so as to control electric power of the corresponding DC power supply.

As an example, in the present embodiment, when the output of DC power supply 10b is subjected to voltage control while the output of DC power supply 10a is subjected to electric current control, duty ratio Da is calculated based on an electric current deviation ΔIa (ΔIa=Ia*−Ia), while duty ratio Db is calculated based on voltage deviation ΔVH (ΔVH=VH*−VH).

A control pulse signal SDa is generated based on voltage comparison between duty ratio Da for controlling the output of DC power supply 10a and carrier wave CWa. Similarly, a control pulse signal SDb is generated based on comparison between duty ratio Db for controlling the output of DC power supply 10b and carrier wave CWb. Control pulse signals /SDa and /SDb are inversion signals of control pulse signals SDa and SDb, respectively.

As shown in FIG. 8, control signals SG1 to SG4 are set based on the logical calculation of control pulse signals SDa (/SDa) and SDb (/SDb).

Switching element S1 forms the upper arm element in each of the boost chopper circuits shown in FIGS. 5 and 6. Accordingly, control signal SG1 for controlling on/off of switching element S1 is generated in accordance with the logical sum of control pulse signals /SDa and /SDb. As a result, on/off of switching element S1 is controlled so as to achieve both of the function of the upper arm element of the boost chopper circuit (DC power supply 10a) shown in FIG. 5 and that of the upper arm element of the boost chopper circuit (DC power supply 10b) shown in FIG. 6.

Switching element S2 forms the upper arm element in the boost chopper circuit shown in FIG. 5, and the lower arm element in the boost chopper circuit shown in FIG. 6. Therefore, control signal SG2 for controlling on/off of switching element S2 is generated in accordance with the logical sum of control pulse signals /SDa and SDb. Accordingly, on/off of switching element S2 is controlled so as to achieve both of the function of the upper arm element of the boost chopper circuit (DC power supply 10a) shown in FIG. 5 and that of the lower arm element of the boost chopper circuit (DC power supply 10b) shown in FIG. 6.

Similarly, control signal SG3 for switching element S3 is generated in accordance with the logical sum of control pulse signals SDa and SDb. Accordingly, on/off of switching element S3 is controlled so as to achieve both of the function of the lower arm element of the boost chopper circuit (DC power supply 10a) shown in FIG. 5 and that of the lower arm element of the boost chopper circuit (DC power supply 10b) shown in FIG. 6.

In addition, control signal SG4 for switching element S4 is generated in accordance with the logical sum of control pulse signals SDa and /SDb. Accordingly, on/off of switching element S4 is controlled so as to achieve both of the function of the lower arm element of the boost chopper circuit (DC power supply 10a) shown in FIG. 5 and that of the upper arm element of the boost chopper circuit (DC power supply 10b) shown in FIG. 6.

In the PB mode, because control signals SG2 and SG4 are set at complementary levels, switching elements S2 and S4 are complementarily turned on/off. Accordingly, the operation when Vb>Va holds shown in FIG. 3 and the operation when Va>Vb holds shown in FIG. 4 are naturally switched. In addition, it is possible to perform DC power conversion in accordance with duty ratios Da and Db for DC power supplies 10a and 10b by complementarily turning switching elements S1 and S3 on/off.

Referring again to FIG. 7, control signals SG1 to SG4 are generated based on control pulse signals SDa (/SDa) and SDb (/SDb) in accordance with the logical operational expressions shown in FIG. 8. By turning switching elements S1 to S4 on/off in accordance with control signals SG1 to SG4, an electric current I(L1) flowing through reactor L1 and an electric current I(L2) flowing through reactor L2 are controlled. Electric current I(L1) corresponds to electric current Ia of DC power supply 10a, and electric current I(L2) corresponds to electric current Ib of DC power supply 10b.

In this manner, in the PB mode, upon execution of DC/DC conversion of inputting/outputting DC power in parallel between DC power supplies 10a, 10b and electric power line 20, output voltage VH can be controlled to assume voltage command value VH*. Furthermore, in accordance with the electric current command value for a DC power supply to be subjected to electric current control, electric power input/output to/from that DC power supply can be controlled.

In the PB mode, electric power covering shortage caused by input/output power to/from a DC power supply subjected to electric current control with respect to electric power input/output to/from load 30 (hereinafter also referred to as load power PL) will be input/output to/from a DC power supply subjected to voltage control. Accordingly, by setting the electric current command value in electric current control, the power distribution ratio between the DC power supplies can be controlled indirectly. In addition, by setting the electric current command value, an operation of allowing output power from one DC power supply to be charged into the other DC power supply is also possible. Hereinbelow, electric power values of electric power Pa, electric power Pb, total electric power PH that DC power supplies 10a and 10b as a whole input/output to/from electric power line 20 (i.e., PH=Pa+Pb), as well as load power PL will be expressed by positive values during discharging of respective DC power supplies 10a and 10b as well as during a powering operation of load 30, and will be expressed by negative values during charging of respective DC power supplies 10a and 10b as well as during a regenerative operation of load 30.

(Circuit Operation in aB Mode and bB Mode)

The circuit operations in the boosting modes (aB mode and bB mode) in which only one of DC power supplies 10a and 10b is used are common to the circuit operations shown in FIGS. 5 and 6.

In the aB mode, by the switching operation shown at (a) and (b) of FIG. 5, bidirectional DC/DC conversion is executed between DC power supply 10a and electric power line 20 (load 30) without using DC power supply 10b. Therefore, in the aB mode, switching elements S1 to S4 are controlled in accordance with control pulse signal SDa based on duty ratio Da for controlling the output of DC power supply 10a.

Specifically, on/off of switching elements S3 and S4 constituting the lower arm element of the boost chopper circuit shown at (a) and (b) of FIG. 5 is controlled in common in accordance with control pulse signal SDa. Similarly, on/off of switching elements S1 and S2 constituting the upper arm element of the boost chopper circuit is controlled in common in accordance with control pulse signal /SDa.

Similarly, in the bB mode, by the switching operation shown at (a) and (b) of FIG. 6, bidirectional DC/DC conversion is executed between DC power supply 10b and electric power line 20 (load 30) without using DC power supply 10a. Therefore, in the bB mode, switching elements S1 to S4 are controlled in accordance with control pulse signal SDb based on duty ratio Db for controlling the output of DC power supply 10b.

Specifically, on/off of switching elements S2 and S3 constituting the lower arm element of the boost chopper circuit shown at (a) and (b) of FIG. 6 is controlled in common in accordance with control pulse signal SDb. Similarly, on/off of switching elements S1 and S4 constituting the upper arm element of the boost chopper circuit is controlled in common in accordance with control pulse signal /SDb.

(Circuit Operation in Direct Connection Mode)

It is appreciated that, in the direct connection mode, any one of the PD mode, SD mode, aD mode, and bD mode is achieved by keeping switching elements S1 to S4 on/off in accordance with FIG. 3.

(Circuit Operation in SB Mode)

Next, circuit operations in the SB mode will be described with reference to FIGS. 9 and 10.

Figure 9A:
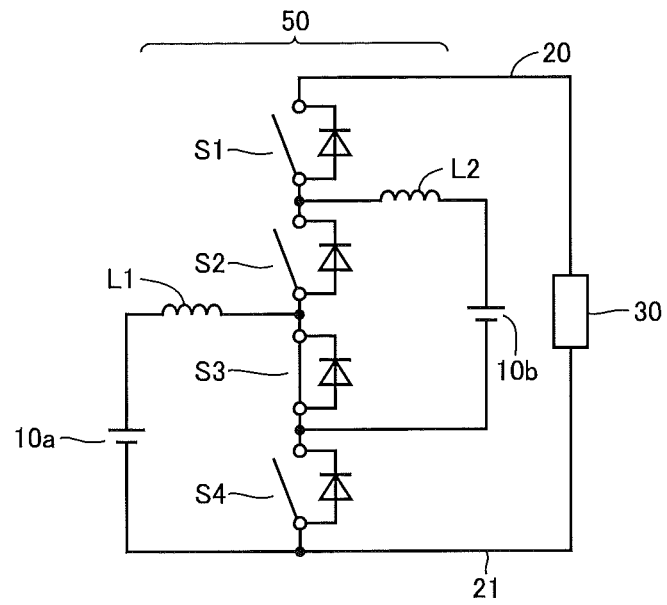
FIG. 9(a) and FIG. 9(b) show circuit diagrams describing a circuit operation in an SB mode.
Figure 9B:
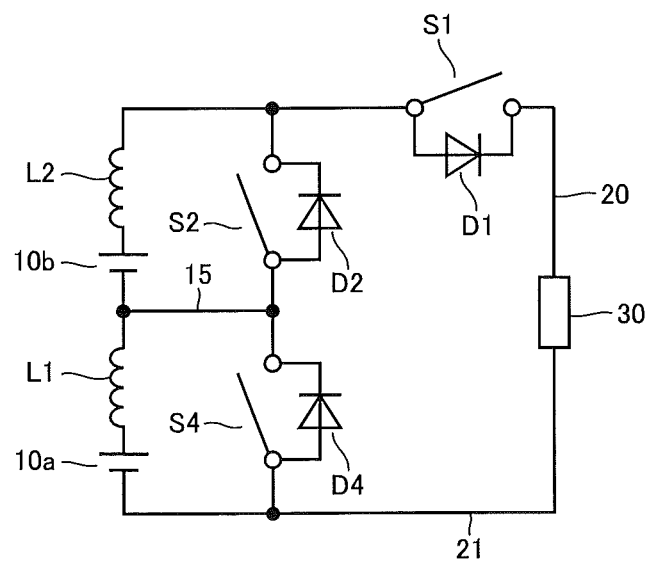

As shown at (a) of FIG. 9, by keeping switching element S3 on, DC power supplies 10a and 10b can be connected in series with electric power line 20. The equivalent circuit at this time is as shown at (b) of FIG. 9.

Referring to (b) of FIG. 9, in the SB mode, between DC power supplies 10a and 10b connected in series and electric power line 20, the on- and off-periods of the lower arm element of the boost chopper circuit can be formed alternately by commonly controlling on/off of switching elements S2 and S4. Switching element S1, which is turned on in the off-period of switching elements S2 and S4, operates as a switch for controlling regeneration from load 30. Further, switching element S3 kept on equivalently forms a line 15 connecting reactor L1 to switching element S4.

Next, referring to FIG. 10, the DC/DC conversion (boost operation) in the SB mode will be described.

Figure 10A:
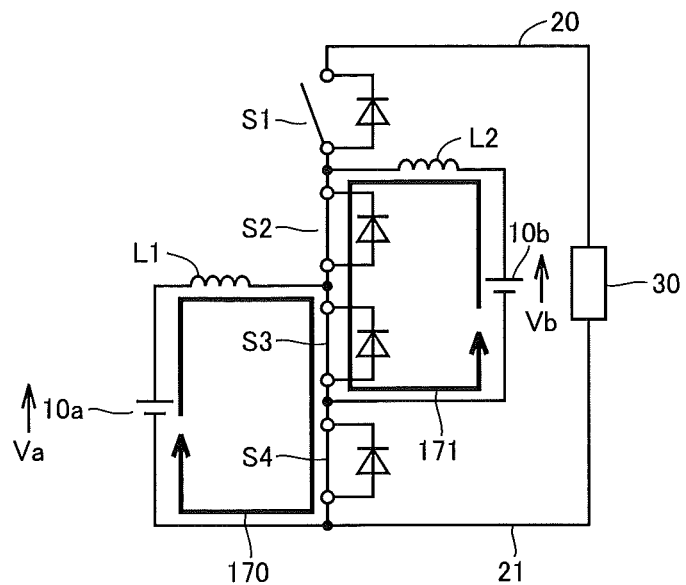
FIG. 10(a) and FIG. 10(b) show circuit diagrams describing DC/DC conversion (boost operation) in the SB mode.
Figure 10B:
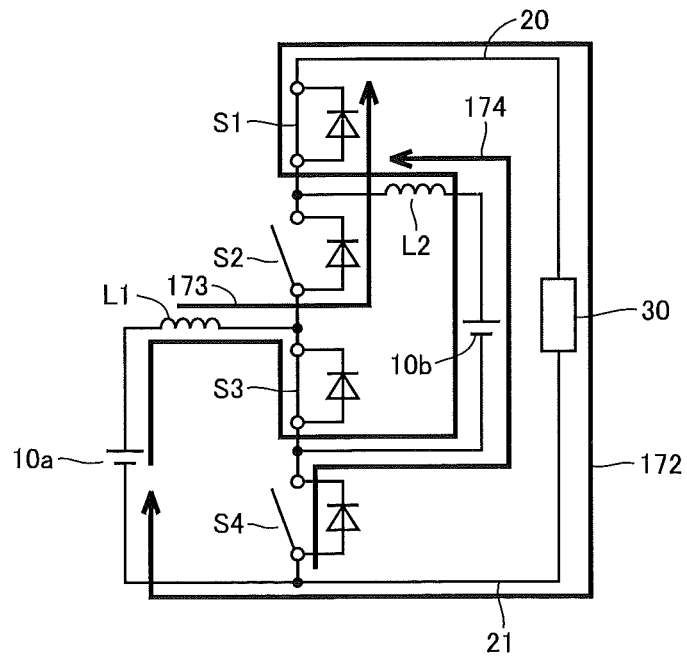

Referring to (a) of FIG. 10, while switching element S3 is kept on for connecting DC power supplies 10a and 10b in series, the pair of switching elements S2 and S4 is turned on and switching element S1 is turned off. Accordingly, electric current paths 170 and 171 for storing energy in reactors L1 and L2 are formed. As a result, for series-connected DC power supplies 10a and 10b, a state in which the lower arm element of the boost chopper circuit is on is obtained.

In contrast, referring to (b) of FIG. 10, while switching element S3 is kept on, the pair of switching elements S2 and S4 is turned off and switching element S1 is turned on, in contrast to (a) of FIG. 10. Accordingly, an electric current path 172 is formed. Through electric current path 172, the sum of energy from DC power supplies 10a and 10b connected in series and energy stored in reactors L1 and L2 is output to electric power line 20. As a result, for series-connected DC power supplies 10a and 10b, a state in which the upper arm element of the boost chopper circuit is on is obtained.

With switching element S3 kept on, by alternately repeating the first period in which the pair of switching elements S2 and S4 is on and switching element S1 is off and the second period in which switching element S1 is on and switching elements S2 and S4 are off, electric current paths 170 and 171 at (a) of FIG. 10 and electric current path 172 at (b) of FIG. 10 are formed alternately.

In the DC/DC conversion in the SB mode, the relation expressed by Expression (3) below holds among voltage Va of DC power supply 10a, voltage Vb of DC power supply 10b and output voltage VH of electric power line 20. In Expression (3), Dc represents the duty ratio of the first period in which the pair of switching elements S2 and S4 is on.

$$VH=1/(1-Dc)\cdot(Va+Vb) \quad (3)$$

It is noted, however, that if Va and Vb are different or if reactors L1 and L2 have different inductances, reactors L1 and L2 come to have different electric current values at the end of the operation shown at (a) of FIG. 10. Therefore, immediately after the transition to the operation shown at (b) of FIG. 10, if the electric current of reactor L1 is larger, a difference current flows through an electric current path 173. If the electric current of reactor L2 is larger, a difference current flows through an electric current path 174.

Figures 11, 12:
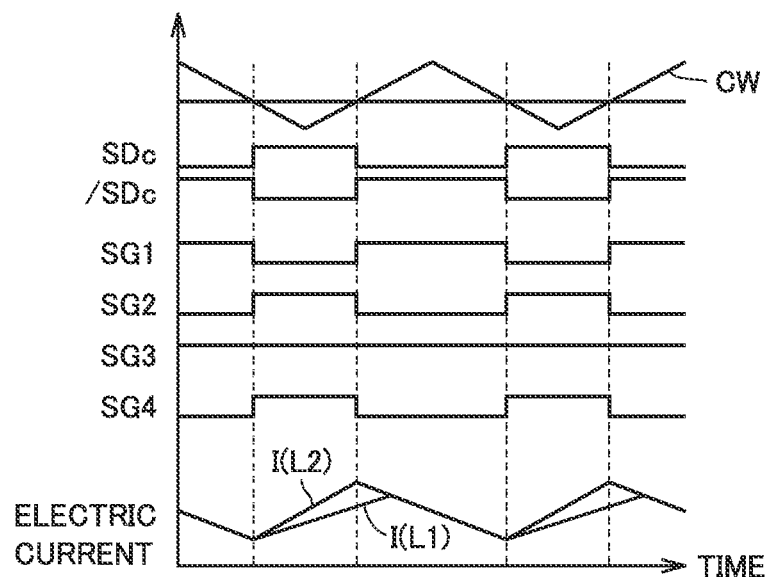
FIG. 11 is a waveform diagram showing an example of control operation for switching elements of the power converter in the SB mode.
FIG. 12 is a table for describing logical calculation expressions for setting a control signal for each switching element in the SB mode.

FIG. 11 shows a waveform diagram for describing an exemplary operation for controlling the switching elements in the SB mode.

In the SB mode, as described in PTD 2, duty ratio Dc in Expression (3) is calculated so as to compensate for voltage deviation $\Delta VH$ of output voltage VH ($\Delta VH=VH^*-VH$). Then, a control pulse signal SDc is generated based on voltage comparison between a carrier wave CW and duty ratio Dc. A control pulse signal /SDc is an inversion signal of control pulse signal SDc. In the SB mode, DC/DC conversion between the DC voltage (Va+Vb) and output voltage VH is executed by the boost chopper circuit shown in FIG. 10.

As shown in FIG. 12, control signals SG1 to SG4 can be set based on a logical operation of control pulse signal SDc (/SDc).

Control pulse signal SDc is set as control signals SG2 and SG4 for the pair of switching elements S2 and S4 constituting the lower arm element of the boost chopper circuit. Similarly, control signal SG1 for switching element S1 constituting the upper arm element of the boost chopper circuit is obtained by control pulse signal /SDc. As a result, the period in which the pair of switching elements S2 and S4 constituting the lower arm element is on and the period in which switching element S1 constituting the upper arm element is on are provided complementarily.

In the SB mode, bidirectional DC/DC conversion is executed between DC power supplies 10a and 10b in the series-connected state and electric power line 20 (load 30).

Therefore, electric power Pa of DC power supply 10a and electric power Pb of DC power supply 10b cannot be directly controlled. That is, the ratio between electric power Pa and electric power Pb of DC power supplies 10a and 10b is automatically determined depending on the ratio between voltages Va and Vb in accordance with Expression (4) below. It is noted that electric power is supplied to load 30 in accordance with the sum of input/output power (Pa+Pb) to/from DC power supplies 10a and 10b, similarly to the PB mode.

$$Pa:Pb=Va:Vb \qquad (4)$$

Referring again to FIG. 3, power distribution ratio k between DC power supplies 10a and 10b is defined by the ratio of electric power Pa of DC power supply 10a to total electric power PH (PH=Pa+Pb) (k=Pa/PH). As shown in the rightmost column of FIG. 3, power distribution ratio k varies among operation modes.

In the PB mode, power distribution between DC power supplies 10a and 10b relative to total electric power PH can be controlled as described above. That is, in the PB mode, power distribution ratio k can be set at any value within the range of 0 to 1.0 by controlling the switching elements. Therefore, it is understood that SOC of DC power supplies 10a, 10b can be controlled independently in the PB mode.

In each of the aB mode, bB mode, aD mode, and bD mode, only one of DC power supplies 10a, 10b is used. That is, power distribution ratio k is fixed at 0 or 1.0. As described above, since load 30 is configured to have the power generation mechanism in the present embodiment, SOC control accompanied by charging/discharging of DC power supply 10a and/or DC power supply 10b in use is possible by controlling the power generation mechanism.

In the SB mode and the SD mode, DC power supplies 10a and 10b are connected in series. Thus, electric power Pa and electric power Pb are determined uniquely depending on voltages Va and Vb in accordance with Expression (4) above. In the SB mode and the SD mode, DC power supplies 10a, 10b have a common electric current (Ia=Ib). Thus, SOC of DC power supplies 10a and 10b cannot be controlled independently.

In the PD mode, DC power supplies 10a and 10b are connected in parallel with electric power line 20. Therefore, power distribution ratio k is determined uniquely depending on internal resistances of DC power supplies 10a and 10b. Thus, output power Pa and output power Pb of respective DC power supplies 10a and 10b cannot be controlled independently. Specifically, k=Rb/(Ra+Rb) holds where Ra indicates the internal resistance of DC power supply 10a and Rb indicates the internal resistance of DC power supply 10b. Therefore, in the PD mode, electric currents in respective DC power supplies 10a and 10b cannot be controlled. Therefore, in the PD mode, SOC of DC power supplies 10a and 10b cannot be controlled independently, similarly to the SB mode and the SD mode.

(Exemplary Configuration of Load)

Next, an exemplary configuration of the load of power supply system 5 applied to an electric-powered vehicle will be described. Since energy stored in DC power supplies 10a, 10b is used for vehicle traveling in the electric-powered vehicle, it is important to appropriately control SOC of DC power supplies 10a, 10b during vehicle traveling.

Figure 13:
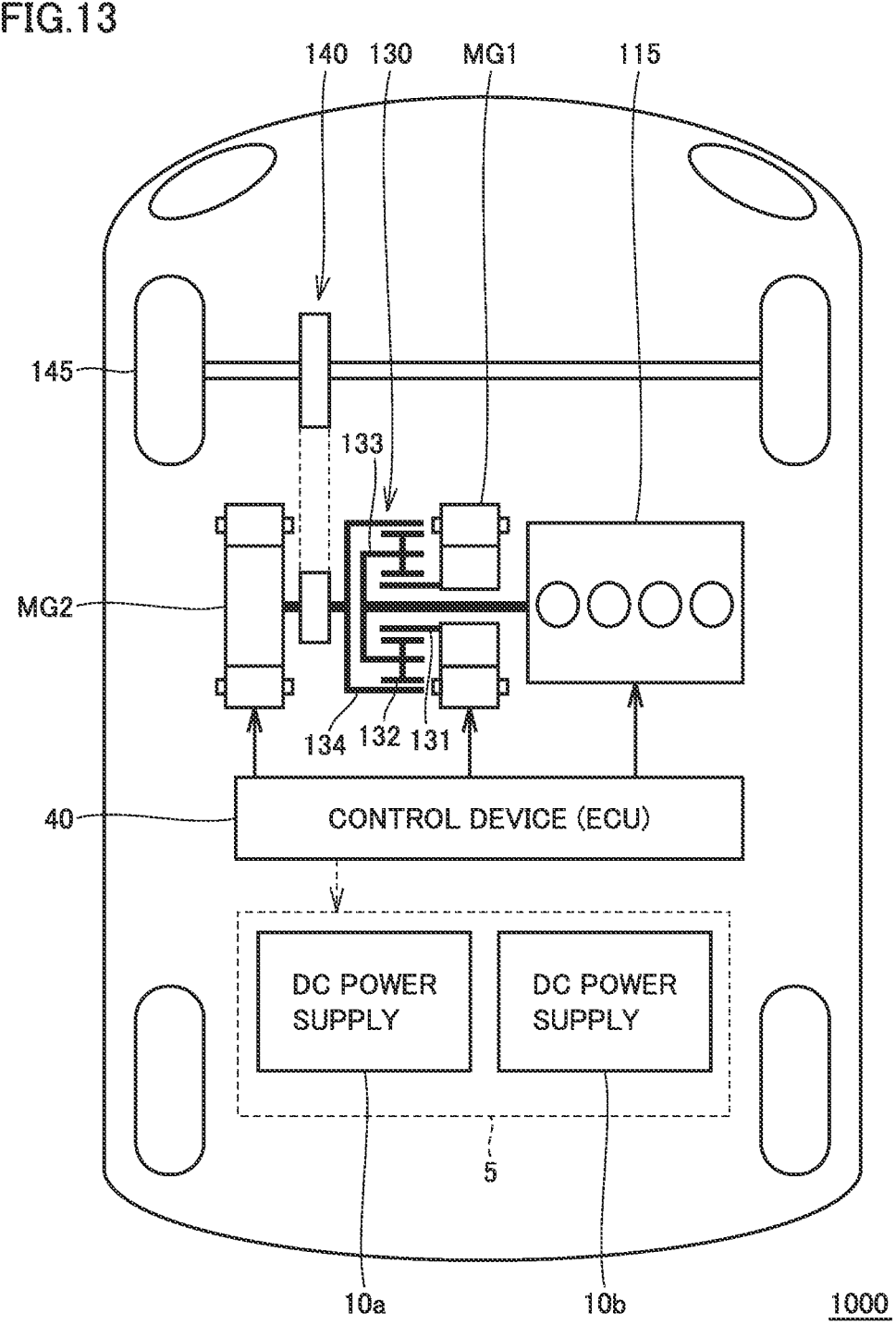
FIG. 13 is a block diagram showing a schematic configuration of a powertrain of a hybrid vehicle shown as an example of an electric-powered vehicle to which the power supply system according to the present embodiment is applied.

FIG. 13 is a block diagram showing a schematic configuration of a powertrain of a hybrid vehicle shown as an example of an electric-powered vehicle to which power supply system 5 according to the present embodiment is applied.

Referring to FIG. 13, the powertrain of hybrid vehicle 1000 includes an engine 115, a first motor-generator (hereinafter also briefly referred to as "MG1"), a second motor-generator (hereinafter also briefly referred to as "MG2"), a power split device 130, and a reduction gear 140. Engine 115, MG1 and MG2 are controlled by control device 40. Furthermore, DC power supplies 10a, 10b included in power supply system 5 are mounted on hybrid vehicle 1000.

It is noted that in the present embodiment, the control device of hybrid vehicle 1000 in FIG. 13 is also denoted as control device 40 in common with FIG. 1. That is, although the present embodiment comprehensively describes control device 40 as a common functional block, a plurality of ECUs obtained by dividing the function of control device 40 can be arranged on an actual machine.

Hybrid vehicle 1000 shown in FIG. 13 travels using driving force from at least one of engine 115 and MG2. Engine 115, MG1 and MG2 are connected via power split device 130. Motive power generated by engine 115 is split into two paths by power split device 130. One path of the two paths is a path for driving drive wheel 145 through reduction gear 140. The other path is a path for driving MG1 to generate electric power.

Engine 115 outputs motive power through use of a hydrocarbon-based fuel such as gasoline or light oil. Engine 115 is stopped or activated in accordance with a command from control device 40. After the engine is activated, engine control, such as fuel injection control, ignition control, or intake air volume control, is executed such that engine 115 operates at an operating point (torque and speed) determined by control device 40. Engine 115 is provided with various sensors for detecting the operating condition of engine 115 including the crank angle of a crankshaft not shown, engine speed and the like. Outputs of these sensors are transferred to control device 40 as required.

MG1 and MG2 are each implemented representatively by a three-phase AC rotating electric machine. MG1 generated electric power with motive power of engine 115 split by power split device 130. The electric power generated by MG1 is properly used in accordance with the traveling condition of the vehicle and SOC of DC power supplies 10a, 10b.

When MG1 functions as a power generator, MG1 generates negative torque. Here, negative torque means torque that serves as a load for engine 115. When MG1 functions as an electric motor upon receipt of electric power, MG1 generates positive torque. Here, positive torque means torque that does not serve as a load for engine 115, namely, torque that assists in rotation of engine 115. It is noted that the same also applies to MG2. Representatively, MG1 outputs positive torque for motoring engine 115 at the time of activation of engine 115.

MG2 generates torque with electric power of at least one of electric power from power supply system 5 and electric power generated by MG1. The torque of MG2 is transferred to drive wheel 145 through reduction gear 140. Accordingly, MG2 assists engine 115, and causes the vehicle to travel using the driving force from MG2.

During regenerative braking of hybrid vehicle 1000, MG2 is driven by drive wheel 145 through reduction gear 140 to operate as a power generator. Accordingly, MG2 operates as a regeneration brake that converts braking energy into electric power.

Power split device 130 is configured with a planetary gear including a sun gear 131, a pinion gear 132, a carrier 133, and a ring gear 134. Pinion gear 132 engages with sun gear 131 and ring gear 134. Carrier 133 rotatably supports pinion gear 132. Sun gear 131 is coupled to a rotary shaft of MG1. Carrier 133 is coupled to the output shaft of engine 100. Ring gear 134 is coupled to a rotary shaft of MG2 and to reduction gear 140. Power split device 130 is shown as an embodiment of a "differential gear." That is, sun gear 131 and ring gear 134 respectively correspond to a "first rotation element", a "second rotation element" and a "third rotation element" that can be rotated relative to one another.

Figure 14:
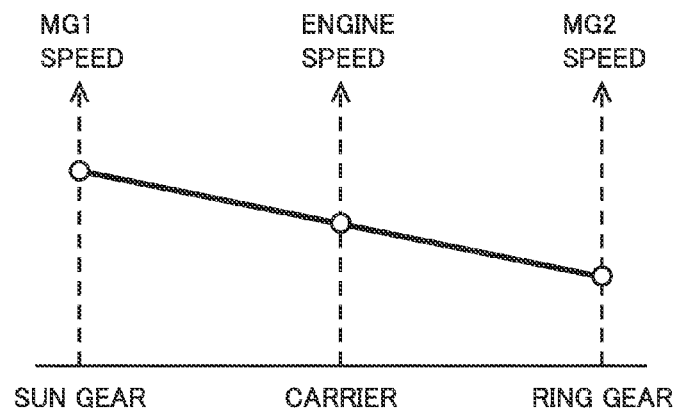
FIG. 14 is a nomographic chart in the hybrid vehicle shown in FIG. 13.

Engine 115, MG1 and MG2 are coupled through power split device 130 constituting the differential gear, and hence the rotation speeds of engine 115, MG1 and MG2 have a relation in which they are linearly connected to one another in a nomographic chart as shown in FIG. 14. It is noted that MG2 may be connected to ring gear 134 through the reduction gear or a transmission.

Hybrid vehicle 1000 basically travels only using driving force produced by MG2 with engine 115 stopped in a driving range where efficiency of engine 115 is bad at the time of start, during traveling at a low speed, or the like. During normal traveling, power split device 130 splits motive power of engine 115 into two paths while engine 115 is operated in a highly efficient range. Motive power transmitted to one of the paths drives drive wheel 145. Motive power transmitted to the other path drives MG1 to generate electric power. The electric power generated by MG1 is directly used as electric power for driving MG2. At this time, MG2 outputs torque using the electric power generated by MG1, thereby assisting in driving of drive wheel 80.

During high-speed traveling, driving force can be added to drive wheel 145 by further supplying electric power from DC power supplies 10a, 10b to MG2 to increase torque of MG2.

On the other hand, during deceleration, MG2 following drive wheel 145 functions as a generator to generate electric power through regenerative braking. Electric power recovered in regenerative braking can be used for charging of DC power supplies 10a, 10b. It is noted that regenerative braking as used herein includes braking accompanied by regenerative power generation in the case where a driver driving the hybrid vehicle has performed a foot brake operation, and decelerating the vehicle (or stopping acceleration) while carrying out regenerative power generation by releasing an accelerator pedal during traveling although the foot brake is not operated.

It is noted that when DC power supplies 10a, 10b request charging in accordance with SOC control, at least part of electric power generated by MG1 can be used for charging DC power supplies 10a, 10b by increasing the output from engine 115 in accordance with the charging request. When DC power supplies 10a, 10b request discharging in accordance with SOC control, electric power supply from DC power supplies 10a, 10b can be promoted by restricting the output from engine 115 in accordance with the discharging request.

Figure 15:
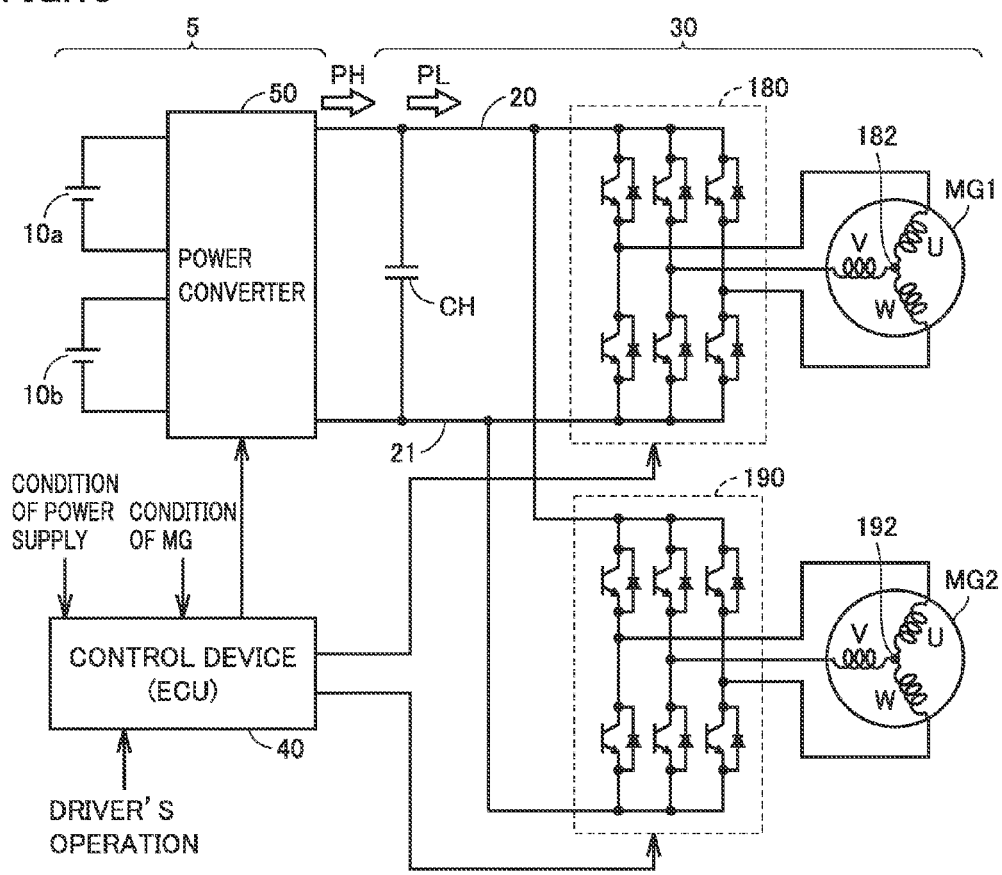
FIG. 15 is a block diagram showing a configuration of an electrical system of the hybrid vehicle shown in FIG. 13.

FIG. 15 shows a configuration of an electrical system of hybrid vehicle 1000 shown in FIG. 13. Power supply system 5 according to the present embodiment is included in this electrical system.

Referring to FIG. 15, hybrid vehicle 1000 is provided with a first inverter 180 for controlling driving of MG1 and a second inverter 190 for controlling driving of MG2.

Each of first inverter 180 and the second inverter is formed of a commonly-used three-phase inverter, and includes a U-phase arm, a V-phase arm and a W-phase arm that are connected in parallel. Each of the U-phase arm, the V-phase arm and the W-phase arm has two switching elements (an upper arm element and a lower arm element) connected in series. An antiparallel diode is connected to each switching element.

Each of MG1 and MG2 has a U-phase coil, a V-phase coil and a W-phase coil coupled in a star connection as a stator winding. Each phase coil of MG1 has one end mutually connected at a neutral point 182. Each phase coil of MG1 has the other end connected to a connection point between the switching elements of each phase arm of first inverter 180. Similarly, each phase coil of MG2 has one end mutually connected at a neutral point 192. Each phase coil has the other end connected to a connection point between the switching elements of each phase arm of second inverter 190.

The DC side of first inverter 180 is connected to electric power line 20 and ground line 21 to which output voltage VH from power supply system 5 is transferred. First inverter 180 controls the electric current or voltage at each phase coil of MG1 by controlling on/off of the switching elements in accordance with control signals from control device 40. First inverter 180 can execute bidirectional power conversion of a power conversion operation of converting output voltage VH (DC voltage) from power supply system 5 into an AC voltage for supply to MG1 and a power conversion operation of converting AC power generated by MG1 into DC power for supply to electric power line 20.

The DC side of second inverter 190 is connected to electric power line 20 and ground line 21 in common to first inverter 180. Second inverter 190 controls the electric current or voltage at each phase coil of MG2 by controlling on/off of the switching elements in accordance with control signals from control device 40. Second inverter 190 can execute bidirectional power conversion of a power conversion operation of converting output voltage VH (DC voltage) from power supply system 5 into an AC voltage for supply to MG2 and a power conversion operation of converting AC power generated by MG2 into DC power for supply to electric power line 20.

MG1 and MG2 are provided with a rotational angle sensor and a current sensor neither shown. Control device 40 controls the power conversion performed by first inverter 180 and second inverter 190 such that MG1 and MG2 operate in accordance with operation commands (representatively, torque command values) set for producing outputs required for vehicle traveling (vehicle driving power, charging/discharging power or the like). For example, for each of MG1 and MG2 output torque is controlled by current feedback.

In this way, in hybrid vehicle 1000 illustrated in FIGS. 13 to 15, first inverter 180, second inverter 190, MG1 and MG2 are included in load 30 of power supply system 5 according to the present embodiment. That is, driving electric power for MG1 and MG2 can be supplied by DC power supplies 10a, 10b. Furthermore, since MG1 can generate electric power by the output from engine 115 during vehicle traveling, electric power for charging DC power supply 10a and/or DC power supply 10b can be generated by controlling the outputs from engine 115 and MG1.

In this way, power supply system 5 according to the present embodiment is configured such that the powertrain of hybrid vehicle 1000 (electric-powered vehicle) configured to include the motor-generators for generating vehicle driving force serve as a load. That is, in hybrid vehicle 1000 illustrated, engine 115 and MG1 can constitute the "power generation mechanism." That is, MG1 is shown as an embodiment of the "second motor-generator" configured to generate electric power by using the output from the engine.

MG2 corresponds to an embodiment of the "first motor-generator." It is noted that, as will be described later, the configuration of the powertrain, including the power generation mechanism, serving as the load of the power supply system according to the present embodiment, is not limited to the illustrations of FIGS. 13 and 15.

Figure 16:
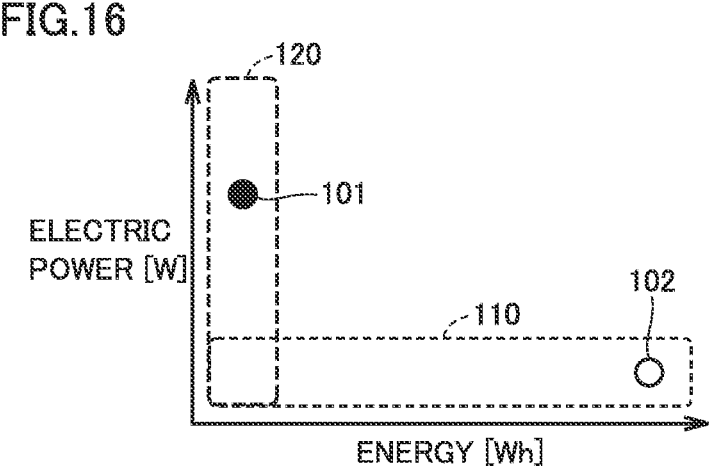
FIG. 16 is a conceptual view for describing a preferable exemplary configuration of DC power supplies in the electric-powered vehicle (hybrid vehicle).

FIG. 16 is a conceptual view for describing a preferable exemplary configuration of DC power supplies in the electric-powered vehicle. FIG. 16 shows a conceptual view for describing an example of properties of DC power supplies 10a and 10b when implemented by power supplies of different types.

Referring to FIG. 16, properties of each of the DC power supplies are shown by a so-called Ragone plot in which energy is plotted on the horizontal axis and electric power is plotted on the vertical axis.

In general, output power and stored energy of a DC power supply have a trade-off relationship. Therefore, a high output is difficult to obtain with a high-capacity type battery, while stored energy is difficult to increase with a high-output type battery.

Therefore, preferably, one of DC power supplies 10a and 10b is implemented by a so-called high-capacity type power supply having high stored energy, and the other one of them is implemented by a so-called high-output type power supply providing high output power. Then, energy stored in the high-capacity type power supply is used as a constant supply for a long time, and the high-output type power supply can be used as a buffer to output a deficiency caused by the high-capacity type power supply.

In the present embodiment, DC power supply 10a is implemented by a high-capacity type power supply, while DC power supply 10b is implemented by a high-output type power supply. Therefore, an active region 110 of DC power supply 10a has a narrower range of electric power that can be output than an active region 120 of DC power supply 10b. On the other hand, active region 120 has a narrower range of energy that can be stored than active region 110.

At an operating point 101 of load 30, high power is requested for a short time. For example, in an electric-powered vehicle, operating point 101 corresponds to abrupt acceleration caused by a user's accelerator operation. In contrast to this, at an operating point 102 of load 30, relatively low power is requested for a long time. For example, in an electric-powered vehicle, operating point 102 corresponds to continuous high-speed steady traveling.

To operating point 101, the output from high-output type DC power supply 10b can mainly be applied. On the other hand, to operating point 102, the output from high-capacity type DC power supply 10a can mainly be applied. Accordingly, in an electric-powered vehicle, the traveling distance with electrical energy can be extended through use of energy stored in the high-capacity type battery for a long time, and acceleration performance in correspondence with a user's accelerator operation can be ensured promptly.

In this manner, by combining DC power supplies of different types and capacitances, stored energy can be used effectively in the whole system taking advantage of characteristics of the respective DC power supplies. Hereinafter, in the present embodiment, an example in which DC power supply 10a is implemented by a secondary battery and DC power supply 10b is implemented by a capacitor will be described. That is, the following description will be provided assuming that the capacity of DC power supply 10a (full charge capacity) is higher than the capacity of DC power supply 10b. However, the combination of DC power supplies 10a and 10b is not limited to this example, but can be implemented by DC power supplies (power storage devices) of the same type and/or the same capacitance.

(Selection of Operation Mode and SOC Control)

Referring again to FIG. 15, it is necessary that output voltage VH from power supply system 5 be set to be more than or equal to a certain voltage in accordance with the operating condition of load 30. For example, in hybrid vehicle 1000, output voltage VH corresponding to DC link-side voltages of inverters 180 and 190 need to be more than or equal to an induced voltage produced in coil windings of MG1 and MG2.

Furthermore, in torque control of MG1, MG2, the phases of currents when same torque is output vary with the DC link voltages (output voltage VH) of inverters 180, 190. The ratio of output torque to the amplitude of electric current in MG1, MG2, namely, motor efficiency, varies in accordance with the phases of currents. Therefore, when torque command values for MG1, MG2 are set, optimum phases of currents in which efficiency in MG1, MG2 is maximized, that is, power losses in MG1, MG2 are minimized, as well as output voltage VH for achieving these optimum phases of currents can be determined in correspondence with the torque command values.

Taking these elements into consideration, a load request voltage VHrq with respect to output voltage VH can be set in accordance with the operating condition of load 30 (e.g., the torque and rotation speeds of MG1, MG2). Taking the induced voltages produced in MG1, MG2 into consideration as described above, VH needs to at least fall within the range where VH≥VHrq holds. Particularly, when setting output voltage VH for achieving the above-described optimum phases of currents at load request voltage VHrq, the losses in MG1, MG2 can be suppressed by setting VH* at VHrq.

Referring again to FIG. 3, in power converter 50 according to the present embodiment, any operation mode is selected from among the plurality of operation modes shown in FIG. 3 in accordance with the operating conditions of DC power supplies 10a, 10b and/or load 30. For example, an operation mode in which the loss of power supply system 5 as a whole is minimized is selected from a group of operation modes that can cope with the range where VH≥VHrq holds, in accordance with the operating condition of load 30 (MG1, MG2).

In the case where it is more efficient to use only either one of the DC power supplies, such as when there is a difference in temperature between DC power supplies 10a and 10b, power supply system 5 can be improved in efficiency by providing modes of using only one of DC power supplies 10a and 10b (aB mode, bB mode, aD mode, and bD mode) as described above.

Generally, in the range where VHreq≥Va+Vb holds, the boosting ratio in power converter 50 can be reduced by applying the SB mode. Thus, the power loss of power converter 50 can be suppressed. In the SB mode, however, SOC of DC power supplies 10a and 10b cannot be controlled independently since electric currents Ia and Ib are common to each other.

Figure 17:
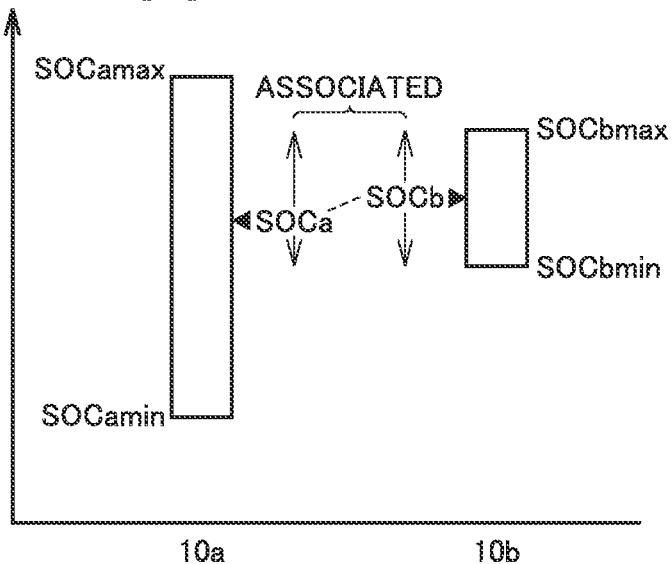
FIG. 17 is a conceptual view for describing SOC behavior of each DC power supply in the SB mode.

FIG. 17 is a conceptual view for describing SOC behaviors of DC power supplies 10a and 10b in the SB mode. The vertical axis of FIG. 17 shall indicate the amount of energy stored in each DC power supply.

In FIG. 17, in high-capacity DC power supply 10a, the amount of charging/discharging from SOC at present (SOCa) to a lower limit SOC (SOCamin) and an upper limit SOC (SOCamax) is relatively large. It is noted that the upper limit SOC and the lower limit SOC shall correspond to the control upper limit value and the control lower limit value in SOC control. That is, there shall be margins left for the SOC upper limit value or the SOC lower limit value according to the specifications at which DC power supplies 10a, 10b will actually result in overdischarge or overcharge.

On the other hand, the capacity of high-output type DC power supply 10b is smaller than that of DC power supply 10a. Therefore, in DC power supply 10b, the amount of charging/discharging from SOC at present (SOCb) to the lower limit SOC (SOCbmin) and the upper limit SOC (SOCbmax) is relatively small.

In the SB mode where the charging/discharging currents of DC power supplies 10a, 10b are identical, SOCa and SOCb vary in association with each other. Therefore, SOCa and SOCb cannot be controlled independently in the SB mode. That is, for example, in such a case where there is a request to increase SOCa and a request to decrease SOCb, it is difficult to realize the both requests.

Therefore, in small-capacity DC power supply 10b, in the case where PL>0 holds with SOCb having reached the lower limit SOC (SOCbmin) or in the case where PL<0 holds with SOCb having reached the upper limit SOC (SOCbmax), it is difficult to select the SB mode continuously even if there is a margin for SOC of high-capacity DC power supply 10a. This phenomenon is also common to the SD mode.

Figure 18:
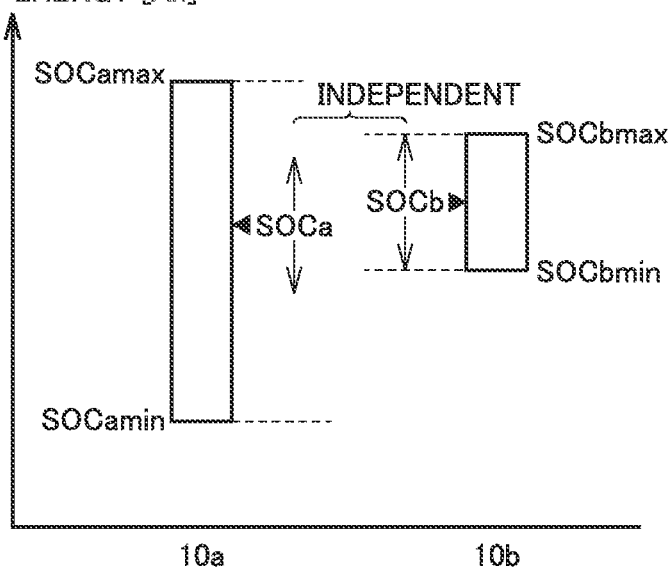
FIG. 18 is a conceptual view for describing SOC behavior of each DC power supply in the PB mode.

FIG. 18 is a conceptual view for describing SOC behaviors of DC power supplies 10a, 10b in the PB mode.

When FIG. 18 is compared with FIG. 17, outputs from DC power supplies 10a, 10b can be controlled individually in the PB mode. Thus, currents Ia and Ib are not common to each other. As such, SOCa and SOCb can be controlled independently. Therefore, flexibility in SOC control in the PB mode is higher than in the SB mode.

Figure 19:
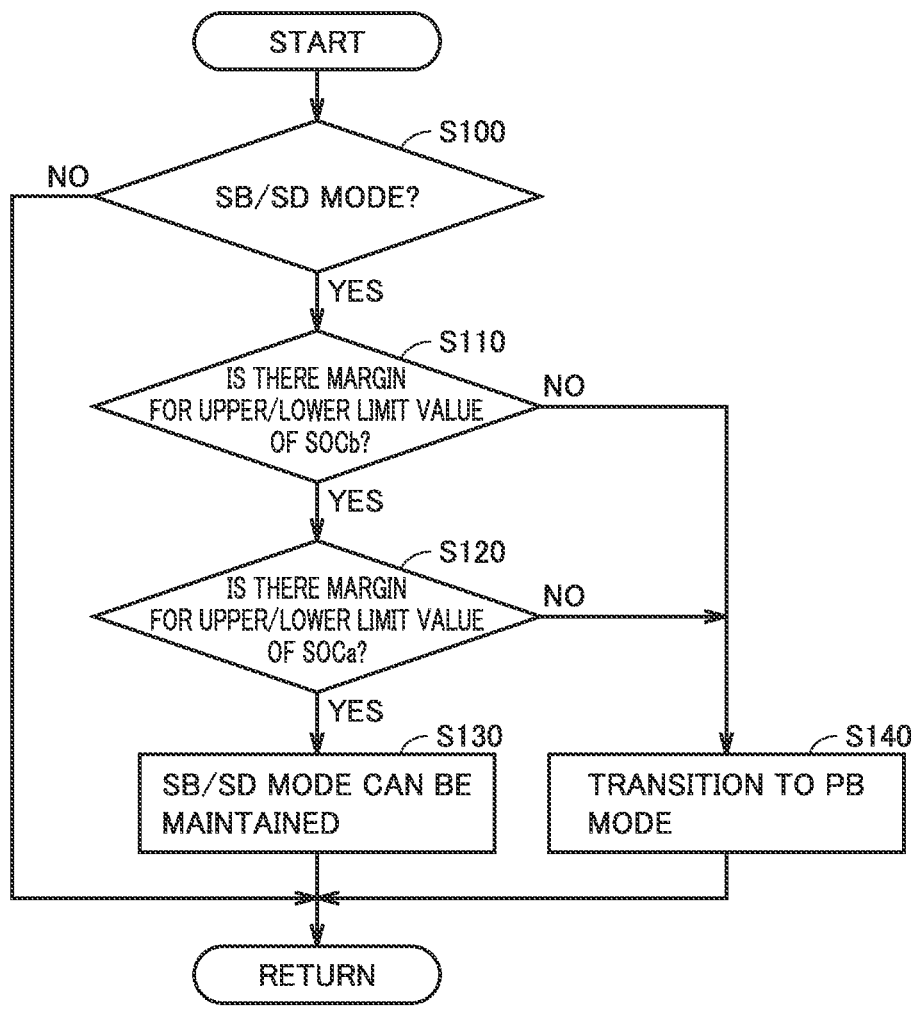
FIG. 19 is a flowchart for describing control processing for selecting an operation mode of the power converter in terms of SOC control.

Therefore, in power supply system 5 according to the present embodiment, it is preferable to control the operation modes of power converter 50 in accordance with the flowchart shown in FIG. 19 in terms of SOC control.

Referring to FIG. 19, control device 40 executes processing in the following steps S110 to S140 when the SB mode or the SD mode has been selected (when determined as YES in step S100).

Control device 40 determines in step S110 whether or not a SOC present value (SOCb) of DC power supply 10b has a sufficient margin relative to the upper limit SOC (SOCbmax) and the lower limit SOC (SOCbmin). For example, when (SOCb−SOCbmin) and (SOCbmax−SOCb) are larger than a given determined value Smth, it is determined as YES in step S110, and otherwise, it is determined as NO.

Similarly, control device 40 determines in step S120 whether or not a SOC present value (SOCa) of DC power supply 10a has a sufficient margin relative to the upper limit SOC (SOCamax) and the lower limit SOC (SOCamin). For example, when (SOCa−SOCamin) and (SOCamax−SOCa) are larger than given determined value Smth, it is determined as YES in step S120, and otherwise, it is determined as NO.

When determined as YES both in steps S110 and S120, control device 40 advances the process to step S130, and determines that the SB mode or the SD mode can be maintained. Accordingly, when the SB mode or the SD mode is selected giving priority to the efficiency of power supply system 5, selection of that operation mode can be maintained.

On the other hand, when determined as NO at least in either step S110 or S120, control device 40 advances the process to step S140, and forces the operation mode to transition to the PB mode. Accordingly, even if selection of the SD mode or the SB mode is preferable in terms of efficiency, the PB mode is forcedly selected when SOCa or SOCb approaches the SOC upper limit or the SOC lower limit. By applying the PB mode, SOC approached the SOC upper limit or the SOC lower limit can be recovered quickly to an appropriate level by performing SOC control independently for DC power supplies 10a and 10b.

(Charging/Discharging Control for DC Power Supplies in Each Operation Mode)

Next, charging/discharging control for DC power supplies 10a, 10b in each operation mode will be described.

Figure 20:
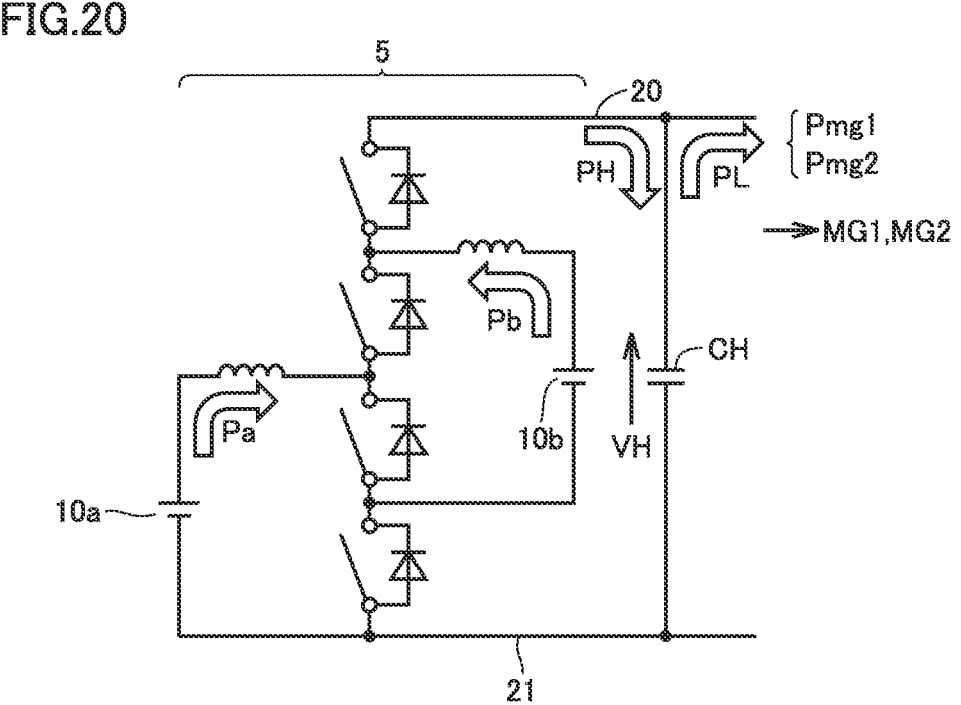
FIG. 20 is a conceptual view for describing an electric power flow in the power supply system applied to the hybrid vehicle.

FIG. 20 is a conceptual view for describing an electric power flow in power supply system 5 applied to hybrid vehicle 1000 shown in FIGS. 13 to 15.

Referring to FIG. 20, total electric power PH input/output from power supply system 5 is indicated as PH=Pa+Pb. It is noted that, as to MG1 and MG2 electrically connected to electric power line 20 as load 30 (FIG. 1) in hybrid vehicle 1000, input/output power of MG1 shall be denoted as Pmg1, and input/output power of MG2 shall be denoted as Pmg2. As to electric power Pmg1 and electric power Pmg2, electric power values during power consumption of MG1 and MG2 shall be indicated by positive values, and power values during power generation shall be indicated by negative values.

Load power PL output from power supply system 5 and input to load 30 is indicated as PL=Pmg1+Pmg2. In the state where total electric power PH is larger than load power PL (PH>PL), output voltage VH rises. On the other hand, in the state where PH<PL holds, output voltage VH decreases. Therefore, in output control of power converter 50, command value PH* for total electric power PH (hereinafter also referred to as a total power command value PH*) can be set in accordance with command value PL* for load power in accordance with operation commands for MG1 and MG2 provided that it is not necessary to vary output voltage VH. For example, PH* can be set at PL*.

Denoting the torque command values for MG1, MG2 as Tqcom1, Tqcom2 and rotation speeds as Nmg1, Nmg2, respectively, PL* is expressed by Expression (5) below.

$$PL^* = Tqcom1 \cdot Nmg1 + Tqcom2 \cdot Nmg2 \tag{5}$$

Hybrid vehicle 1000 can generate electric power by means of MG1 using the output from engine 115. Therefore, it is possible to charge DC power supplies 10a, 10b upon ensuring driving power by causing engine 115 to output power larger than driving power for vehicle traveling. In this case, operation commands for MG1 and MG2 are generated such that PL*<0 holds.

As described above, in the PB mode, since power distribution ratio k can be freely set within the range of 0 to 1.0, charging power for DC power supply 10a (Pa=PH*·k) and charging power for DC power supply 10b (Pb=PH*·Pa*) can be controlled by setting power command value Pa* for DC power supply 10a to be equal to PH*·k (PH*=PL*).

Therefore, in the power supply system of an electric-powered vehicle according to the present embodiment, an operation command for the load configured to have the power generation mechanism is set in accordance with power management for ensuring vehicle driving force for the electric-powered vehicle upon avoiding overcharge and overdischarge of DC power supplies 10a, 10b.

Figure 21:
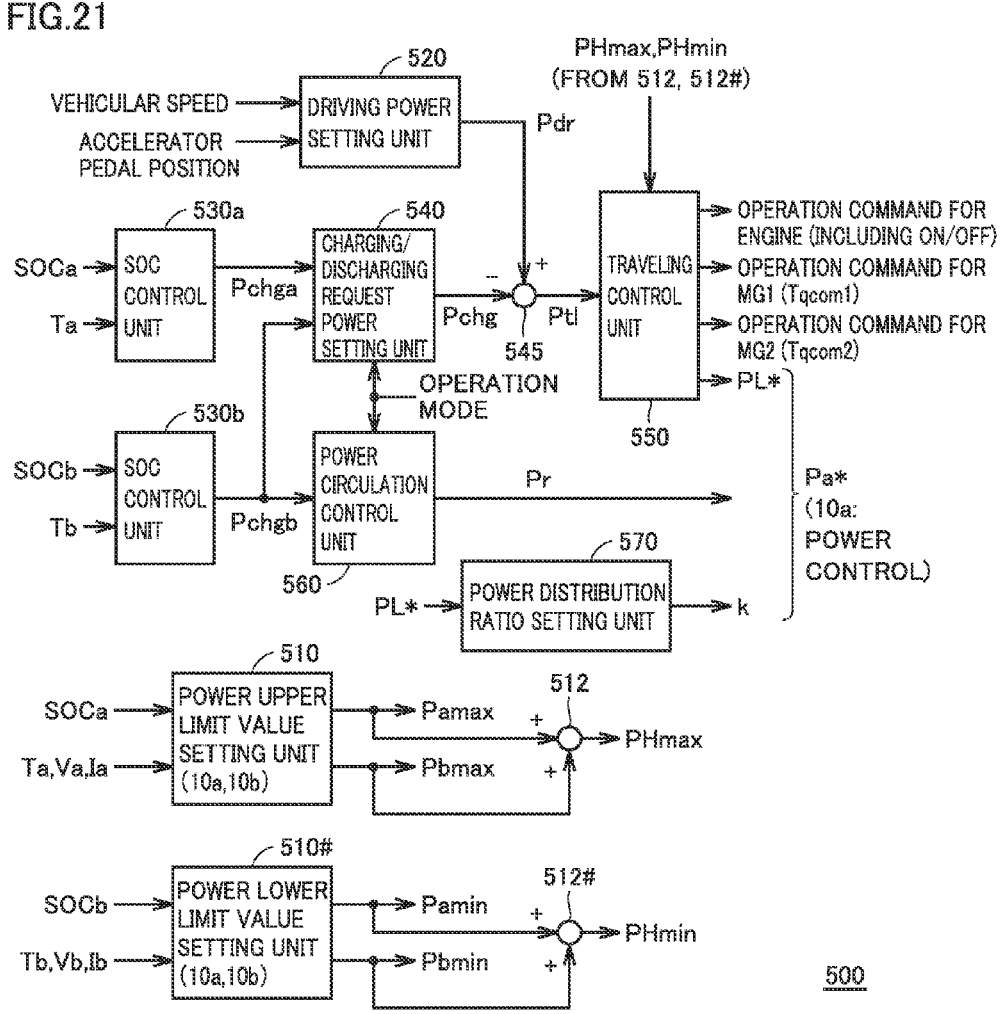
FIG. 21 is a functional block diagram for describing a control configuration for power management in the power supply system of the electric-powered vehicle according to the present embodiment.

FIG. 21 is a functional block diagram for describing a control configuration for power management in the power supply system of the electric-powered vehicle according to the present embodiment. It is noted that the function of each functional block depicted in the functional block diagrams including FIG. 21 shall be achieved by software processing performed by control device 40, and/or hardware processing performed by operations of an electronic circuit.

Referring to FIG. 21, a power management unit 500 has a power upper limit value setting unit 510, a power lower limit value setting unit 510#, arithmetic units 512, 512#, 545, a driving power setting unit 520, SOC control units 530a, 530b, a charging/discharging request power setting unit 540, and a traveling control unit 550. The function of a "charging/discharging control unit" is achieved by SOC control units 530a, 530b and charging/discharging request power setting unit 540. Furthermore, the function of an "operation command generation unit" is achieved by traveling control unit 550.

Power upper limit value setting unit 510 sets power upper limit values Pamax and Pbmax based on the condition of DC power supplies 10a and 10b. Each power upper limit value indicates the upper limit value of discharging electric power, and is set at 0 or a positive value. When a power upper limit value is set at 0, it means that discharging from a corresponding DC power supply is prohibited.

For example, power upper limit value Pamax can be set based on SOCa and temperature Ta of DC power supply 10a. Furthermore, power upper limit value Pamax may be corrected so as to restrict discharging power relative to the set value based on SOCa and Ta when discharging power (Va·Ia) of DC power supply 10a exceeds the steady upper limit value, when discharging current (Ia) exceeds the upper limit value, or when voltage (Va) drops because of discharging to fall below the lower limit value. Power upper limit value Pbmax can also be set based on the condition of DC power supply 10b (SOCb, Tb, Ib, and Vb), similarly to Pamax.

Power lower limit value setting unit 510# sets power lower limit values Pamin and Pbmin based on the condition of DC power supplies 10a and 10b. Each power lower limit value indicates the upper limit value of charging electric power, and is set at 0 or a negative value. When a power lower limit value is set at 0, it means that charging of a corresponding DC power supply is prohibited.

For example, power lower limit value Pamin is set based on SOCa and temperature Ta of DC power supply 10a. Furthermore, power lower limit value Pamin may be corrected so as to restrict charging power relative to the set value based on SOCa and Ta when charging power (Va·Ia) of DC power supply 10a exceeds the steady upper limit value, when charging current (Ia) exceeds the upper limit value, or when voltage (Va) rises because of charging to exceed the upper limit value. Power lower limit value Pbmin can also be set based on the condition of DC power supply 10b (SOCb, Tb, Ib, and Vb), similarly to Pamin.

Arithmetic unit 512 sets power upper limit value PHmax for DC power supplies 10a, 10b as a whole (total power upper limit value PHmax) in accordance with power upper limit values Pamax, Pbmax. Arithmetic unit 512# sets power lower limit value PHmin for DC power supplies 10a, 10b as a whole (total power lower limit value PHmin) in accordance with power lower limit values Pamin, Pbmin. Therefore, total power upper limit value PHmax and total power lower limit value PHmin are expressed by Expression s (6) and (7) below.

$$PHmax = Pamax + Pbmax \quad (6)$$

$$PHmin = Pamin + Pbmin \quad (7)$$

Driving power setting unit 520 sets driving power Pdr necessary for vehicle traveling in accordance with the traveling condition of hybrid vehicle 1000 and a user operation. Representatively, a map (not shown) is previously created in which the relationship of accelerator pedal position ACC and vehicular speed V with requested driving force Tr* has previously been determined. When accelerator pedal position ACC and vehicular speed V are detected, driving power setting unit 520 can calculate requested driving force Tr* by referring to the map.

When requested driving force Tr* is calculated, driving power setting unit 520 can set driving power Pdr in accordance with Expression (9) below. In Expression (8), Nr indicates the rotation speeds of a driving shaft and Loss is the loss term.

$$Pdr = Tr^* \cdot Nr + \text{Loss} \quad (8)$$

Figure 22:
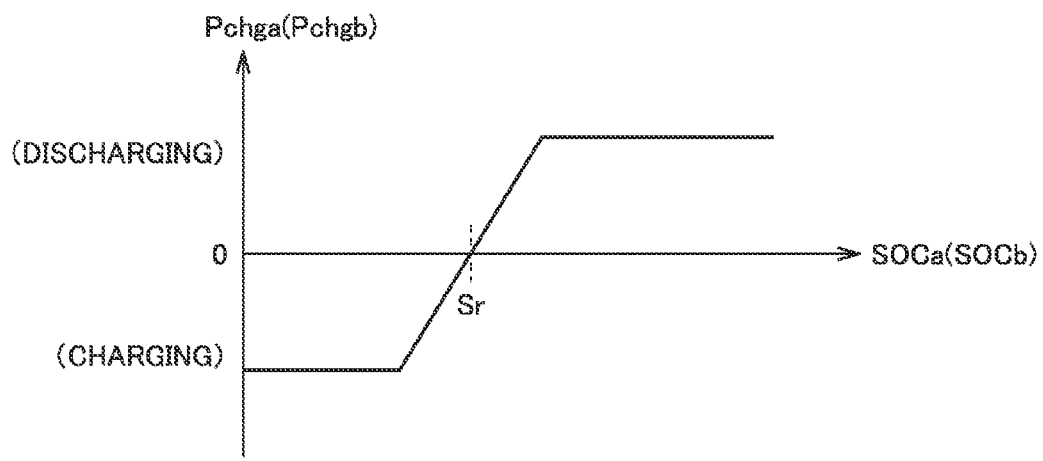
FIG. 22 is a conceptual view for describing setting of the charging request power of each DC power supply.

SOC control unit 530a sets charging request power Pchga based on the comparison between SOCa of DC power supply 10a and a SOC control target. For example, when control central value Sr of SOC has been set as shown in FIG. 22, SOC control unit 530a makes a setting such that Pchga>0 holds for requesting discharging in a range where SOCa>Sr holds, and makes a setting such that Pchga<0 holds for requesting charging in a range where SOCa<Sr holds. Alternatively, it is also possible to configure SOC control unit 530a such that Pchga is set at 0 when SOCa is in a certain range including control central value Sr, and such that Pchga>0 holds when SOCa deviates from the range to the higher side and Pchga<0 holds when SOCa deviates from the range to the lower side.

SOC control unit 530b sets charging request power Pchgb based on the comparison between SOCb of DC power supply 10b and the SOC control target, similarly to SOC control unit 530a.

It is noted that temperatures Ta, Tb of DC power supplies 10a, 10b may be further reflected in the setting of charging request power Pchga, Pchgb. For example, at the time of high temperature, it is preferable to set charging request power Pchga, Pchgb such that charging power is restricted relative to that at the time of normal temperature.

Charging/discharging request power setting unit 540 sets charging/discharging request power value Pchg based on charging request power Pchga, Pchgb set by SOC control units 530a, 530b, and the operation mode of power converter 50. In the case of attempting to charge DC power supplies 10a, 10b with electric power from load 30 for SOC control, charging/discharging request power value Pchg is set at a negative value. On the other hand, in the case of attempting to promote discharging from DC power supplies 10a, 10b, charging/discharging request power value Pchg is set at a positive value.

Arithmetic unit 545 calculates total request power Ptl based on driving power Pdr set by driving power setting unit 520 and charging/discharging request power value Pchg set by charging/discharging request power setting unit 540 (Ptl=Pdr−Pchg). Traveling control unit 550 sets operation commands for engine 115 and MG1, MG2 based on total request power Ptl received from arithmetic unit 545. It is noted that, even during a vehicle stop, electric power for charging DC power supply 10a and/or DC power supply 10b can be generated by setting total request power Ptl in accordance with charging/discharging request power value Pchg.

Traveling control unit 550 determines whether or not engine 115 needs to be operated by comparing total request power Ptl with a predetermined threshold value Pth. Specifically, when Ptl≤Pth holds (at the time of a low power output), engine 115 is stopped in order to avoid engine 115 from operating in a low efficiency range. In this case, fuel injection in engine 115 is stopped, while the torque command value for MG2 is set such that necessary driving power Pdr is obtained by the output torque of MG2.

On the other hand, traveling control unit 550 operates engine 115 when Ptl>Pth holds. Even if Pdr≤Pth holds, when a setting has been made such that Pchg<0 holds, which in turn causes the relation Ptl>Pth to hold, engine 115 is operated in order to generate charging power for DC power supplies 10a, 10b. When engine 115 is operated, request power Pe of engine 115 is set to be equal to Pdr−Pchg (i.e., Pe=Ptl).

Furthermore, traveling control unit 550 determines the operating point of engine 115 based on engine request power Pe.

Figure 23:
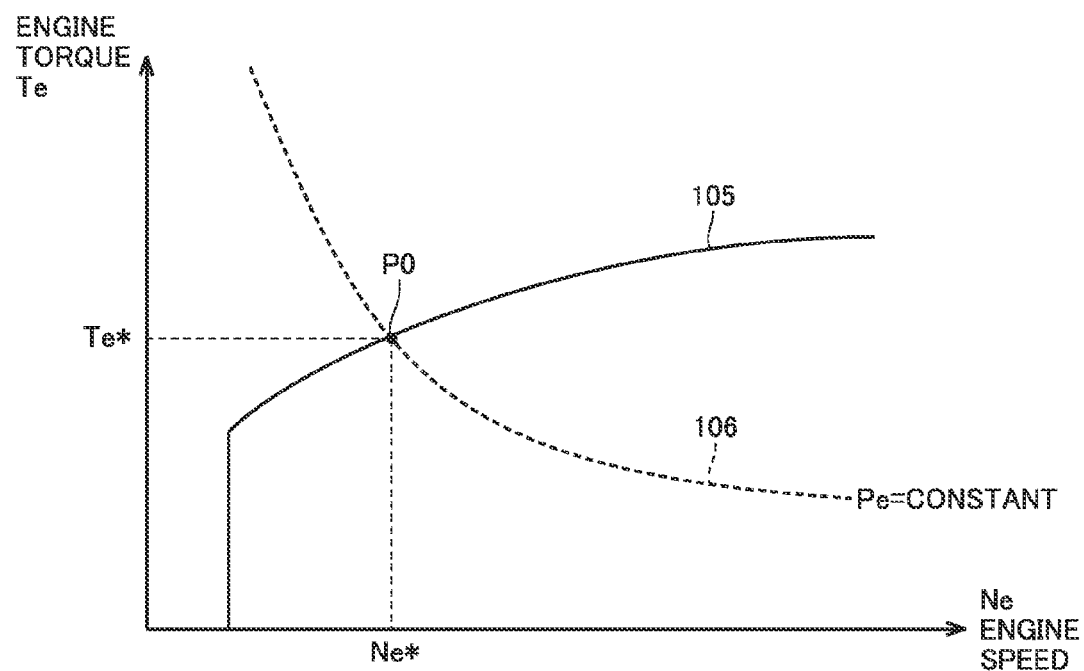
FIG. 23 is a conceptual view for describing setting of an engine operating point made by a traveling control unit shown in FIG. 21.

FIG. 23 is a conceptual view for describing setting of an engine operating point.

Referring to FIG. 23, an engine operating point is defined by the combination of engine speed Ne and engine torque Te. The product of engine speed Ne and engine torque Te corresponds to engine output power.

An operation line 105 is previously determined as a set of engine operating points at which engine 115 can be operated with high efficiency. Operation line 105 corresponds to an optimal fuel efficiency line for restricting fuel consumption when the same power is output.

As shown in FIG. 23, traveling control unit 550 determines an intersection PO between predetermined operation line 105 and an equal power line 106 corresponding to engine request power Pe calculated, as an engine operating point (target speed Ne* and target torque Te*).

Furthermore, the output torque of MG1 is determined so as to control the engine speed to be target speed Ne* by means of the output torque of MG1 mechanically coupled to engine 115 with power split device 130 shown in FIG. 13.

Traveling control unit 550 calculates driving torque (direct torque) Tep mechanically transferred to the driving shaft when engine 115 is operated in accordance with the engine operating point determined. For example, direct torque Tep is calculated from the gear ratio of power split device 130 and the torque command value for MG1.

Furthermore, traveling control unit 550 calculates the output torque of MG2 so as to compensate for excess or deficiency of direct torque Tep with respect to requested driving force Tr* (i.e. Tr*−Tep). That is, denoting output torque of MG2 as Tm2, Expression (9) below will hold. It is noted that Tm2* is torque that acts on the driving shaft by means of the output from MG2. The torque command value for MG2 is set in accordance with Tm2*.

$$Tr^* = Tep + Tm2^* \quad (9)$$

Referring again to FIG. 21, traveling control unit 550 basically sets the operation command for engine 115 (ON/OFF command and control of Ne, Te) and operation commands for MG1, MG2 (torque command values Tqcom1, Tqcom2) in accordance with the above-described control processing.

Furthermore, traveling control unit 550 restricts at least one of Tqcom1, Tqcom2 and Pe such that load power PL* (see Expression (5)) in accordance with the operation commands set in this way (torque command values Tqcom1, Tqcom2) falls within the range of PHmin to PHmax.

Accordingly, traveling control unit 550 produces operation commands for engine 115 and MG1, MG2 such that PHmin≤PL*≤PHmax holds. As a result, traveling of hybrid vehicle 1000 is controlled such that electric power necessary for SOC control of DC power supplies 10a, 10b is generated by the output from engine 115. That is, when charging/discharging request power value Pchg<0 holds, that is, when DC power supplies 10a, 10b are charged, a setting can be made such that load power PL<0 holds (PL=Pchg).

On the other hand, when charging/discharging request power value Pchg>0 holds, that is, discharging from DC power supplies 10a, 10b is to be promoted, a setting can be made such that total electric power PH>0 holds by restricting the engine output power relative to original driving power Pdr (PH=Pchg). Accordingly, load power PL for obtaining driving power Pdr is ensured in association with discharging from DC power supplies 10a, 10b.

In this way, the operation command for load 30 having the power generation mechanism is set reflecting charging/discharging request power value Pchg for SOC control. Accordingly, it is understood that load power PL is controlled such that DC power supplies 10a, 10b as a whole are charged/discharged in accordance with charging/discharging request power value Pchg.

Charging/discharging request power setting unit 540 switches the setting of charging/discharging request power value Pchg in accordance with the operation mode of power converter 50 in order to reflect the difference in the manner of charging/discharging of DC power supplies 10a, 10b among the operation modes.

FIG. 24 shows setting formulas for charging/discharging request power value Pchg in each operation mode made by charging/discharging power setting unit 540.

Referring to FIG. 24, in the PB mode in which SOC of DC power supplies 10a, 10b can be controlled independently (see FIG. 18), the sum of charging request power Pchga and charging request power Pchgb can be reflected in load power PL. Therefore, Pchg is set to be equal to Pchga+Pchgb. Accordingly, in the PB mode, SOC control for maintaining each of SOCa and SOCb at the SOC control target (the control target center or the control target range) can be executed.

On the other hand, in the SB mode in which charging/discharging currents of DC power supplies 10a, 10b are in common to each other, SOCa and SOCb vary in association with each other. Accordingly, as described with reference to FIG. 17, when SOCb of small-capacity DC power supply 10b reaches the upper limit SOC or the lower limit SOC, it may become impossible to continue the SB mode which is advantageous in terms of efficiency.

Therefore, in the SB mode, charging request power Pchgb for small-capacity DC power supply 10b is set at charging/discharging request power value Pchg of DC power supplies 10a, 10b as a whole (Pchg=Pchgb). Accordingly, SOC control can be executed so as to maintain SOCb at the SOC control target. Thus, the situation in which the SB mode can no longer be applied due to the SOC restrictions can be avoided. That is, by applying the SB mode to the utmost in the state where the SB mode is advantageous in terms of efficiency, it is possible to restrict the loss of power supply system 5 to improve the energy efficiency of the hybrid vehicle.

In the aD mode and the aB mode in which only DC power supply 10a is used, SOCa can be controlled to approach the SOC control target by setting charging request power Pchga for DC power supply 10a at charging/discharging request power value Pchg for DC power supplies 10a, 10b as a whole (Pchg=Pchga).

Similarly, in the bD mode and the bB mode in which only DC power supply 10b is used, SOCb can be controlled to approach the SOC control target by setting charging request power Pchgb for DC power supply 10b at charging/discharging request power value Pchg for DC power supplies 10a, 10b as a whole (Pchg=Pchgb).

In the PD mode in which electric power distribution between DC power supplies 10a and 10b is determined by the internal resistance ratio, it is difficult to control both of SOCa and SOCb. Therefore, in the PD mode, it is preferable to stop SOC control. As such, Pchg is set at 0 in the PD mode.

In this way, by setting charging/discharging request power value Pchg for SOC control in correspondence with the operation mode of power converter 50, deviations of SOCa and SOCb from the SOC control target can be suppressed in each operation mode. As a result, selection of the operation mode can be prevented from being limited by the SOC restrictions. Thus, the loss of power supply system 5 can be suppressed by selecting the operation mode giving priority to system efficiency.

Referring again to FIG. 21, power management unit 500 further includes a power circulation control unit 560 and a power distribution ratio setting unit 570.

As also shown in FIG. 3, electric power of each of DC power supplies 10a, 10b can be controlled independently in the PB mode. In the PB mode, power command value Pa* for DC power supply 10a which is subject to current control (electric power control) can be set.

Power circulation control unit 560 sets a circulation power value Pr. Circulation power value Pr is set for achieving SOC control of small-capacity DC power supply 10b by shifting the electric power balance between DC power supplies 10a and 10b, or by producing electric power circulation. When circulation power value Pr is set at a positive value, electric power Pa is shifted in the positive direction, while electric power Pb is shifted in the negative direction. Therefore, when charging of DC power supply 10b is to be promoted, Pr is set at a positive value larger than 0.

In contrast, when circulation power value Pr is set at a negative value, electric power Pa is shifted in the negative direction, while electric power Pb is shifted in the positive direction. Therefore, when discharging of DC power supply 10b is to be promoted, Pr is set at a negative value smaller than 0. When there is no necessity to promote charging/discharging of DC power supply 10b, Pr is set at 0.

FIG. 25 shows setting formulas for circulation power value Pr in each operation mode made by power circulation control unit 560.

Referring to FIG. 25, in the PB mode in which electric power of both of DC power supplies 10a, 10b can be controlled, power circulation control unit 560 sets charging request power Pchgb for DC power supply 10b multiplied by "−1", as circulation power value Pr (Pr=−Pchgb). Accordingly, when charging of DC power supply 10b is requested, charging of DC power supply 10b can be promoted by shifting electric power Pa in the positive direction. In contrast, when discharging from DC power supply 10b is required, electric power Pa can be shifted in the negative direction to promote discharging from DC power supply 10b. On the other hand, in the remaining operation modes in which electric power of both of DC power supplies 10a, 10b cannot be controlled, Pr is set at 0.

It is noted that although in the present embodiment circulation power value Pr is set for SOC control of small-capacity DC power supply 10b, it is also possible in principle to set circulation power value Pr for SOC control of DC power supply 10a. In this case, Pr can be set at a positive value larger than 0 in the case where discharging from DC power supply 10a is to be promoted, while Pr can be set at a negative value smaller than 0 in the case where charging of DC power supply 10b is to be promoted.

Power distribution ratio setting unit 570 sets power distribution ratio k at least in the PB mode. For example, power distribution ratio setting unit 570 sets power distribution ratio k such that the power loss of power supply system 5 is minimized, in accordance with total power command value PH*. It is noted that in the first embodiment, total power command value PH* can be set to be equivalent to load power PL* in accordance with the operation command set by traveling control unit 550 (PH*=PL*).

The power loss of power supply system 5 is expressed by the sum of the loss of power converter 50 and the losses of DC power supplies 10a, 10b. When the ratio between Pa and Pb changes relative to identical total electric power PH (PH=Pa+Pb), the losses of power converter 50 and DC power supplies 10a, 10b also vary with changes in electric currents Ia and Ib. It is understood that particularly in the case where DC power supplies 10a and 10b have different internal resistances, the losses change significantly depending on the combination of electric power Pa and electric power Pb (i.e., power distribution ratio k) even relative to identical total electric power PH. The loss of power converter 50 also changes depending on the balance between electric currents Ia and Ib.

Therefore, the distribution (power distribution ratio k) between electric power Pa and electric power Pb that minimizes the power loss of power supply system 5 relative to total power command value PH* can be previously obtained by actual machine experiments or simulations. As a result, a map that determines power distribution ratio k in terms of efficiency of power supply system 5 can be previously created for total power command value PH*.

With reference to the map, power distribution ratio setting unit 570 can set power distribution ratio k for increasing the efficiency of power supply system 5 in correspondence with load power PL* in accordance with the operation command set by traveling control unit 550.

As a result, power command value Pa* for DC power supply 10a subjected to current control can be set in accordance with Expression (10) below.

$$Pa^* = PL^* \cdot k + Pr \qquad (10)$$

Accordingly, in the PB mode, electric power Pa of DC power supply 10a and electric power Pb of DC power supply 10b expressed as (PL−Pa) can be controlled in accordance with power distribution ratio k for increasing efficiency. Furthermore, SOC control of small-capacity DC power supply 10b can be accelerated further by correcting power command value Pa* by power circulation control unit 560 in accordance with charging request power Pchgb for SOC control of DC power supply 10b. Moreover, since charging/discharging request power value Pchg in accordance with the sum of charging request power Pchga and charging request power Pchgb is reflected in load power PL as described above, SOC control can be executed so as to bring SOCa close to the SOC control target through electric power control in accordance with power distribution ratio k.

Since each of electric power Pa and electric power Pb of DC power supplies 10a, 10b cannot be controlled in any operation mode other than the PB mode, SOC of DC power supplies 10a, 10b will be controlled through output voltage control (VH control) performed by power converter 50 such that SOCa and SOCb do not deviate from the SOC control target, by setting charging/discharging request power value Pchg in accordance with the operation mode as described above.

As described above, in the power supply system of an electric-powered vehicle according to the present embodiment, in the configuration in which electric power for charging the DC power supplies can be supplied from the load configured to have a power generation mechanism, the charging/discharging request power for the load from the DC power supplies as a whole can be set appropriately in correspondence with the operation mode of the power converter. Accordingly, SOC of each DC power supply can be prevented from deviating from the SOC control target to reach the SOC upper limit or the SOC lower limit in each operation mode. As a result, selection of the operation mode can be prevented from being limited by the SOC restrictions. Thus, the loss of power supply system 5 can be suppressed by operation mode selection giving priority to system efficiency, which can increase energy efficiency of the electric-powered vehicle.

Particularly in the SB mode and SD mode in which the respective DC power supplies change in SOC in association with each other while efficiency is high, it is possible to prevent SOC of the small-capacity DC power supply from reaching the SOC upper limit or the SOC lower limit so that the operation mode cannot be applied continuously. Therefore, by ensuring the opportunity of selecting the SD mode or the SB mode in terms of efficiency, the loss of power supply system 5 can be suppressed, and the energy efficiency of the electric-powered vehicle can be improved.

By selecting an operation mode such that the PB mode is applied forcedly when SOC of either DC power supply reaches the SOC upper limit or the SOC lower limit, each DC power supply can be protected from overcharge and overdischarge.

Variation of First Embodiment

In a variation of the first embodiment, phase control of carrier waves (hereinafter referred to as carrier phase control) in pulse width modulation control in the PB mode and the SB mode where both of DC power supplies 10a and 10b are used will be described.

Figure 26:
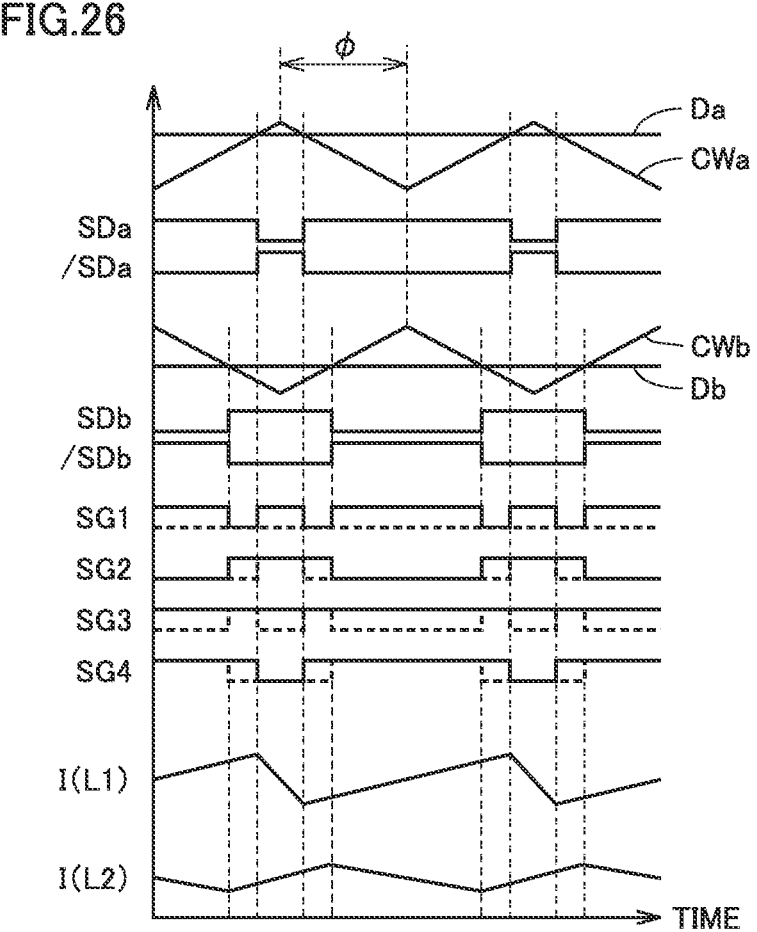
FIG. 26 is a diagram of waveforms showing an exemplary control operation in the PB mode when carrier phase control by power converter control according to a variation of the first embodiment of the present invention is applied.

FIG. 26 shows an exemplary control operation in the PB mode when a phase difference is provided intentionally between carrier waves CWa and CWb.

Referring to FIG. 26, carrier wave CWa and carrier wave CWb have the same frequency with a phase difference $\phi$ provided therebetween. In the example of FIG. 26, phase difference $\phi$ is 180 degrees.

Similarly to the case when $\phi=0$ as shown in FIG. 7, control pulse signal SDa is generated based on the comparison between carrier wave CWa and duty ratio Da, while control pulse signal SDb is generated based on the comparison between carrier wave CWb and duty ratio Db.

Duty ratios Da and Db shown in FIG. 26 have the same values as those shown in FIG. 7. Accordingly, control pulse signal SDa shown in FIG. 26 has the same length of H-level period as control pulse signal SDa shown in FIG. 7, despite different phases between these signals. Similarly, control pulse signal SDb shown in FIG. 26 has the same length of H-level period as control pulse signal SDb shown in FIG. 7, despite different phases between these signals.

Accordingly, it is possible to achieve control signals SG1 to SG4 shown in FIG. 26 with waveforms different from those of control signals SG1 to SG4 shown in FIG. 7 by providing phase difference $\phi$ between carrier waves CWa and CWb. From the comparison between FIGS. 7 and 26, it is understood that the phase relationship (phases of currents) between electric currents I(L1) and I(L2) changes by changing phase difference $\phi$ between carrier waves CWa and CWb.

Meanwhile, it is understood that an average value of electric currents I(L1) and I(L2) is equivalent in FIGS. 7 and 26, with respect to the same duty ratios Da and Db. That is, the outputs of DC power supplies 10a and 10b are controlled by duty ratios Da and Db, and not affected by changes in phase difference $\phi$ between carrier waves CWa and CWb.

Therefore, in the variation of the first embodiment, in the PB mode, reduction in switching losses of switching elements S1 to S4 is achieved by carrier phase control for appropriately adjusting phase difference $\phi$ between carrier waves CWa and CWb.

Hereinbelow, as a typical example, a description will be made on control in a state where both of DC power supplies 10a and 10b are in the powering condition, namely in a state where electric current I(L1)>0 and electric current I(L2)>0 hold.

Figure 27:
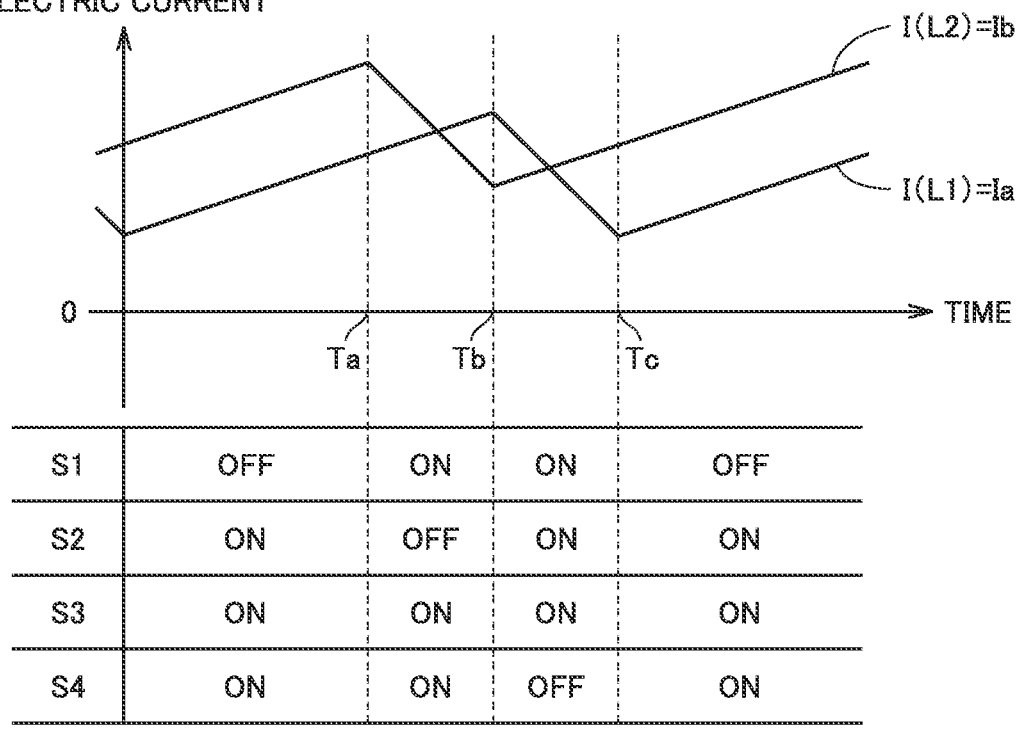
FIG. 27 is a diagram of waveforms describing phases of currents resulting from carrier phase control in the PB mode.

FIG. 27 is a diagram of waveforms describing phases of currents resulting from carrier phase control in the PB mode in power converter 50.

Referring to FIG. 27, since switching elements S2 to S4 are on until time Ta, the lower arm element of the boost chopper circuit is on for both of DC power supplies 10a and 10b. Thus, both of electric currents I(L1) and I(L2) rise.

By turning off switching element S2 at time Ta, the lower arm element of the boost chopper circuit for DC power supply 10b is turned off. Thus, electric current I(L2) starts falling. While switching element S2 is turned off, switching element S1 is turned on.

After time Ta, the lower arm element of the boost chopper circuit for DC power supply 10a is on, while the lower arm element of the boost chopper circuit for DC power supply 10b is off. That is, electric current I(L2) falls while electric current I(L1) rises. In this instance, the electric current path in power converter 50 is as shown at (a) of FIG. 28.

Figure 28A:
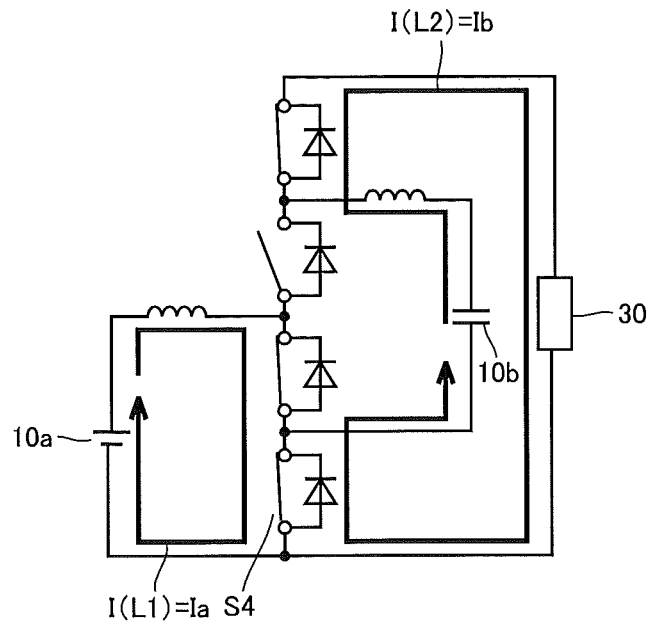
FIG. 28(a) and FIG. 28(b) show circuit diagrams describing electric current paths in predetermined periods shown in FIG. 27.
Figure 28B:
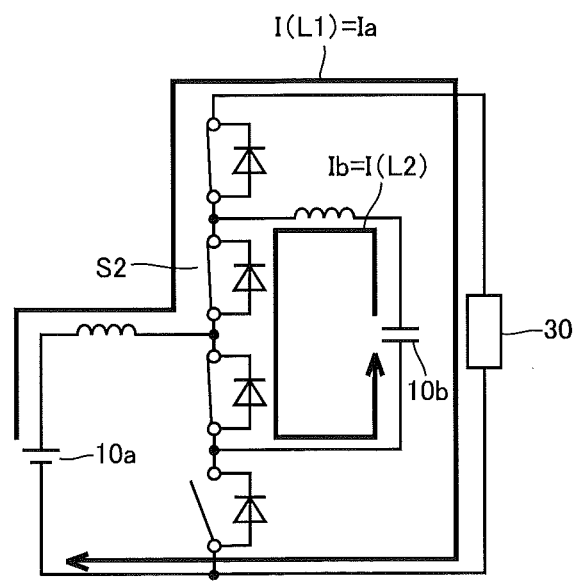

As understood from (a) of FIG. 28, after time Ta, a differential current between electric currents I(L1) and I(L2) flows through switching element S4. That is, the electric current flowing through switching element S4 decreases.

Referring to FIG. 27 again, when switching element S4 is turned off after time Ta, the lower arm element of the boost chopper circuit for DC power supply 10a is turned off. Thus, electric current I(L1) starts falling. When switching element S2 is turned on, the lower arm element of the boost chopper circuit for DC power supply 10b is turned on. Thus, electric current I(L2) starts rising again. That is, the electric current path in power converter 50 changes from the state at (a) of FIG. 28 into the state at (b) of FIG. 28. In the state shown at (b) of FIG. 28, the differential current between electric currents I(L1) and I(L2) flows through switching element S2. Thus, the electric current flowing through switching element S2 decreases.

By turning off switching element S4 in the state shown at (a) of FIG. 28, it is possible to reduce an electric current during the turn-off period of switching element S4, namely, the switching loss. In addition, by turning on switching element S2 in the state shown at (b) of FIG. 28, it is possible to reduce an electric current during the turn-on period of switching element S2, namely, the switching loss.

Therefore, the phases of currents, namely, phase difference $\phi$ between carrier waves CWa and CWb is adjusted such that the falling start timing of electric current I(L1) (local maximum) and the rising start timing of electric current I(L2) (local minimum) coincide with each other.

Accordingly, at time Tb shown in FIG. 27, switching element S2 is turned on, while switching element S4 is turned off.

Referring to FIG. 27 again, at time Tc, switching element S1 is turned off, while switching element S4 is turned on. Thus, the lower arm element of the boost chopper circuit for each of DC power supplies 10a and 10b is turned on. Accordingly, the abovementioned state prior to time Ta is reproduced, so that both of electric currents I(L1) and I(L2) rise.

Figure 29A:
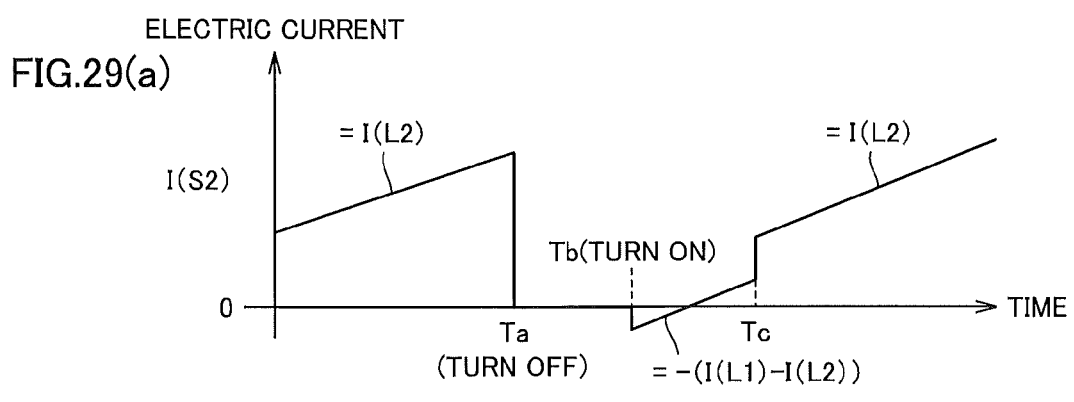
FIG. 29(a) and FIG. 29(b) show diagrams of waveforms of electric currents of switching elements under the phases of currents shown in FIG. 27.
Figure 29B:
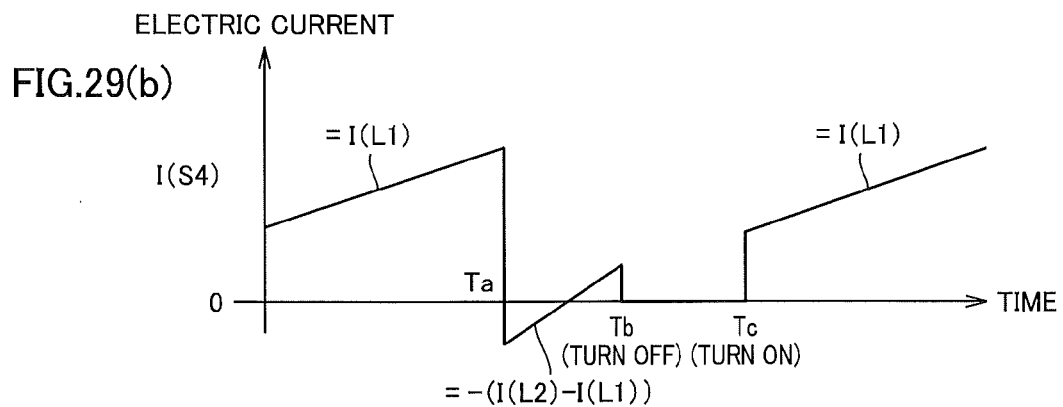

FIG. 29 shows waveforms of electric currents of switching elements S2 and S4 under the phases of currents shown in FIG. 27. FIG. 29 shows at (a) a waveform of electric current I(S2) of switching element S2. FIG. 29 shows at (b) a waveform of electric current I(S4) of switching element S4.

Referring to (a) of FIG. 29, electric current I(S2) satisfies the relation of I(S2)=I(L2) during the periods before time Ta and after time Tc. Since switching element S2 is off during the period from time Ta to Tb, I(S2)=0 holds. During the period from time Tb to Tc, I(S2)=−(I(L1)−I(L2)) holds, as shown at (b) of FIG. 28.

Referring to (b) of FIG. 29, electric current I(S4) satisfies the relation of I(S4)=I(L1) during the periods before time Ta and after time Tc. During the period from time Ta to Tb, I(S4)=−(I(L2)−I(L1)) holds, as shown at (a) of FIG. 28. Since switching element S4 is off during the period from time Tb to Tc, I(S4)=0 holds.

Figure 30:
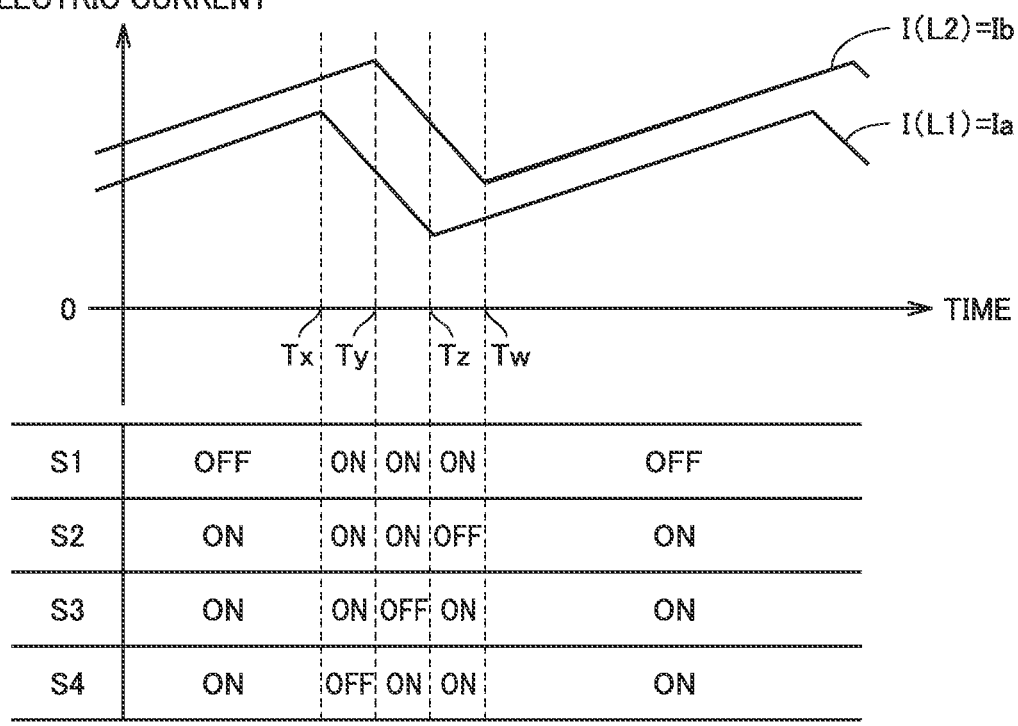
FIG. 30 is a diagram of waveforms showing phases of currents when a phase difference between carrier waves is equal to zero.

FIG. 30 shows phases of currents when phase difference ϕ between the carrier waves is set at zero under the duty ratios equivalent to those shown in FIG. 27, for comparison with FIG. 27.

Referring to FIG. 30, when phase difference ϕ between carrier waves CWa and CWb is equal to zero, electric currents I(L1) and I(L2) are different in the rising/falling timings (Tx, Ty, Tz, and Tw).

Specifically, prior to time Tx, when switching element S1 is off while switching elements S2 to S4 are on, both of electric currents I(L1) and I(L2) rise. Then, when switching element S4 is turned off at time Tx, electric current I(L1) starts falling. Switching element S1 is turned on, when switching element S4 is turned off.

Then, when switching element S3 is turned off at time Ty, electric current I(L2) starts falling. Switching element S4 is turned on when switching element S3 is turned off. Accordingly, both of electric currents I(L1) and I(L2) fall.

At time Tz, switching element S2 is turned off, while switching element S3 is turned on. Accordingly, the lower arm element of the boost chopper circuit is turned on for DC power supply 10a. Thus, electric current I(L1) rises again. At time Tw, switching element S1 is turned off, while switching element S2 is turned on. Accordingly, the state prior to time Tx is reproduced, so that both of electric currents I(L1) and I(L2) rise.

FIG. 31 shows waveforms of electric currents of switching elements S2 and S4 under the phases of currents shown in FIG. 30. FIG. 31 shows at (a) a waveform of electric current I(S2) of switching element S2. FIG. 31 shows at (b) a waveform of electric current I(S4) of switching element S4.

Referring to (a) of FIG. 31, electric current I(S2) satisfies the relation of I(S2)=I(L2) during the periods before time Tx and after time Tw. During the period from time Tx to Ty, an electric current path similar to that shown at (b) of FIG. 28 is formed, so that I(S2)=−(I(L1)−I(L2)) holds. During the period from time Ty to Tz, switching element S2 operates as the upper arm element for DC power supply 10a, so that I(S2)=−I(L1) holds. During the period from time Ty to Tz in which both of electric currents I(L1) and I(L2) fall, switching element S2 operates as the upper arm element for DC power supply 10a, so that I(S2)=−I(L1) holds. During the period from time Tz to Tw, switching element S2 is off, so that I(S2)=0 holds.

Referring to (b) of FIG. 31, electric current I(S4) satisfies the relation of I(S4)=I(L1) during the periods before time Tx and after time Tw. During the period from time Tx to Ty, switching element S4 is off, so that I(S4)=0 holds. During the period from time Ty to Tz in which both of electric currents I(L1) and I(L2) fall, switching element S4 operates as the upper arm element for DC power supply 10b, so that I(S4)=−I(L2) holds. During the period from time Tz to Tw, an electric current path similar to that shown at (a) of FIG. 28 is formed, so that I(S2)=−(I(L2)−I(L1)) holds.

From the comparison of electric current I(S2) generated at time Tb shown at (a) of FIG. 31 with electric current I(S2) generated at time Tw shown at (a) of FIG. 31, it is understood that the turn-on electric current of switching element S2, that is, the switching loss during turn-on period, is reduced by adjusting phase difference ϕ for achieving the phases of currents shown in FIG. 29. From the comparison of electric current I(S2) during the period from time Tb to Tc shown at (a) of FIG. 29 with electric current I(S2) during the period from time Ty to Tz shown at (a) of FIG. 31, it is understood that the conduction loss of switching element S2 is also reduced.

Similarly, from the comparison of electric current I(S4) at time Tb shown at (b) of FIG. 29 with electric current I(S4) at time Tx shown at (b) of FIG. 31, it is understood that the turn-off electric current of switching element S4, that is, the switching loss during turn-off period, is reduced by adjusting phase difference ϕ for achieving the phases of currents shown in FIG. 27. From the comparison of electric current I(S4) during the period from time Ta to Tb shown at (b) of FIG. 29 with electric current I(S4) during the period from time Ty to Tz shown at (a) of FIG. 31, it is understood that the conduction loss of switching element S4 is also reduced.

In this manner, by providing phase difference ϕ between carrier waves CWa and CWb, it is possible to reduce the losses in switching elements S1 to S4. For example, as shown in FIG. 27, when both of DC power supplies 10a and 10b are in the powering condition, the losses in switching elements S1 to S4 are suppressed by setting phase difference ϕ such that the falling start timing (local maximum) of electric current I(L1) and the rising start timing (local minimum) of electric current I(L2) coincide with each other, that is, such that the turn-on timing of switching element S2 and the turn-off timing of switching element S4 coincide with each other.

As a result, DC power conversion between DC power supplies 10a, 10b and electric power line 20 (load 30) can be executed with high efficiency. With such a phase difference ϕ, the falling timing (or rising timing) of control pulse signal SDa and the rising timing (or falling timing) of control pulse signal SDb coincide with each other. In other words, it is necessary to adjust phase difference ϕ such that a pulse transition timing agrees between control pulse signals SDa and SDb. It is noted that the transition timing indicates the timing when the H/L level of pulse is switched.

As also understood from FIGS. 7 and 26, control pulse signals SDa and SDb vary in accordance with duty ratios Da and Db. Accordingly, it is understood that phase difference ϕ with which the phases of currents shown in FIG. 27 can be achieved, namely, phase difference ϕ resulting from carrier phase control, is also determined in accordance with duty ratios Da and Db. Therefore, it is possible to previously obtain the relationship between duty ratios Da, Db and phase difference ϕ resulting from carrier phase control, and previously store in control device 40 the relationship as a map (hereinafter also referred to as a "phase difference map") or a function (hereinafter also referred to as a "phase difference calculation formula").

In the PWM control for electric current control of DC power supplies 10a, 10b in the PB mode, phase difference ϕ for the carrier phase control can be calculated based on calculated duty ratios Da and Db. Then, by generating carrier waves CWa and CWb so as to have calculated phase difference ϕ, highly efficient DC/DC conversion can be achieved with losses in switching element S1 to S4 suppressed.

Although the state where both DC power supplies 10a and 10b are in the powering condition has been described with reference to FIGS. 27 to 31, similar carrier phase control can be executed in other conditions.

FIG. 32 is a table for describing the carrier phase control according to the first embodiment of the present invention in each operating condition of the DC power supplies.

Referring to FIG. 32, in condition A, both of DC power supplies 10a and 10b are in the powering condition described above. As shown in FIG. 27, phase difference ϕ between the carrier waves is adjusted to achieve the phases of currents such that the falling timing (local maximum) of electric current I(L1) and the rising timing (local minimum) of electric current I(L2) coincide with each other at Tb shown in the drawing. Accordingly, it is possible to reduce the turn-on loss of switching element S2 and the turn-off loss of switching element S4 at Tb. Moreover, as described above, it is possible to reduce the conduction loss of switching element S4 during the period from Ta to Tb and the conduction loss of switching element S2 during the period from Tb to Tc.

In condition B, both of DC power supplies 10a and 10b are in the regenerative condition. In this condition, phase difference ϕ between the carrier waves is adjusted to achieve the phases of currents such that the rising timing (local minimum) of electric current I(L1) and the falling timing (local maximum) of electric current I(L2) coincide with each other at Tb shown in the drawing. Accordingly, it is possible to reduce the turn-on loss of switching element S4 and the turn-off loss of switching element S2 at Tb. Moreover, as described above, it is possible to reduce the conduction loss of switching element S2 during the period from Ta to Tb and the conduction loss of switching element S4 during the period from Tb to Tc.

In condition C, DC power supply 10a is in the regenerative condition, while DC power supply 10b is in the powering condition. In this condition, phase difference ϕ between the carrier waves is adjusted to achieve the phases of currents such that the falling timing (local maximum) of electric current I(L1) and the falling timing (local maximum) of electric current I(L2) coincide with each other at Ta shown in the drawing. Accordingly, it is possible to reduce the turn-on loss of switching element S3 and the turn-off loss of switching element S1 at Ta. Moreover, as described above, it is possible to reduce the conduction loss of switching element S1 during the period from Ta to Tb and the conduction loss of switching element S3 during the period from Tc to Ta.

In condition D, DC power supply 10a is in the powering condition, while DC power supply 10b is in the regenerative condition. In this condition, phase difference ϕ between the carrier waves is adjusted to achieve the phases of currents such that the rising timing of electric current I(L1) and the rising timing of electric current I(L2) coincide with each other at Tc shown in the drawing. Accordingly, it is possible to reduce the turn-on loss of switching element S1 and the turn-off loss of switching element S3 at Tc. Moreover, as described above, it is possible to reduce the conduction loss of switching element S1 during the period from Tb to Tc and the conduction loss of switching element S3 during the period from Tc to Ta.

As described above, phase difference ϕ for reducing the losses in switching elements S1 to S4 varies depending on the combination of powering/regenerative conditions of DC power supplies 10a and 10b. Therefore, it is preferred to set the abovementioned phase difference map or phase difference calculation formula for each of the combinations of powering/regenerative conditions (conditions A to D in FIG. 32).

As described above, according to the variation of the first embodiment, the above-described carrier phase control can be combined in DC/DC conversion in the PB mode for controlling output voltage VH to be voltage command value VH*. Accordingly, highly efficient DC/DC conversion with losses in switching elements S1 to S4 reduced can be executed, taking full advantage of the effect that electric currents of respective DC power supplies 10a and 10b counteract each other in DC/DC conversion as shown in FIGS. 5 and 6.

Next, carrier phase control in the SB mode will be described.

Figure 33:
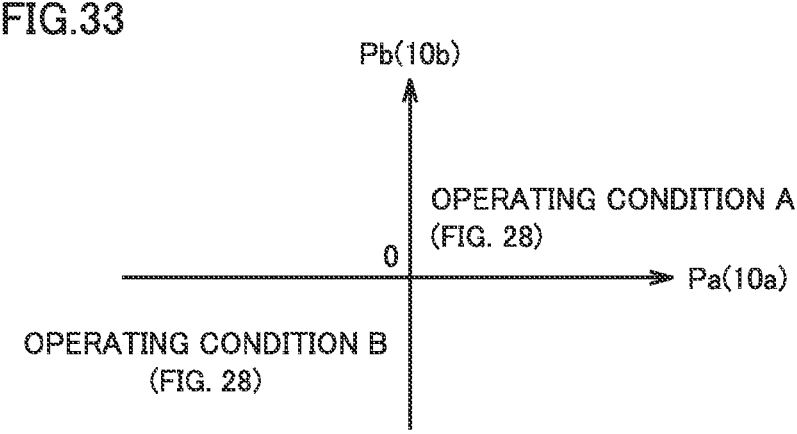
FIG. 33 shows a diagram describing conditions of two DC power supplies in the SB mode.

As shown in FIG. 33, in the SB mode, DC power supplies 10a and 10b are connected to each other in series. Therefore, there only exists either of the condition where both of DC power supplies 10a and 10b are in the powering condition (condition A in FIG. 32) and the condition where both of DC power supplies 10a and 10b are in the regenerative condition (condition B in FIG. 32).

Therefore, in the control operation in the SB mode, phase difference ϕ between the carrier waves is set such that the turn-on of switching element S2 and the turn-off of switching element S4 coincide with each other, or such that the turn-on of switching element S4 and the turn-off of switching element S2 coincide with each other, as shown in conditions A and B in FIG. 32.

That is, by setting phase difference ϕ between carrier waves CWa and CWb such that the falling timing of control pulse signal SDa and the rising timing of control pulse signal SDb coincide with each other or such that the rising timing of control pulse signal SDa and the falling timing of control pulse signal SDb coincide with each other, the phases of currents shown in conditions A and B in FIG. 32 will be achieved.

Duty ratios Da and Db on this occasion will be considered. By modifying Expression (1), Da is expressed by Expression (11) below.

$$Da=(VH-Va)/VH \quad (11)$$

Similarly, by modifying Expression (2), Db is expressed by Expression (12) below.

$$Db=(VH-Vb)/VH \quad (12)$$

As shown in FIG. 8, control signal SG3 in the PB mode is generated based on the logical sum of control pulse signals SDa and SDb. Therefore, it is understood that, when phase difference ϕ is set such that the falling (or rising) timing of control pulse signal SDa and the rising (or falling) timing of control pulse signal SDb coincide with each other and when VH>(Va+Vb) holds, the ratio of H level period of control signal SG3 in the PB mode is more than 1.0. That is, when VH>(Va+Vb) holds, control signal SG3 is kept at the H level also by the PWM control with duty ratios Da and Db common to the PB mode.

Figure 34:
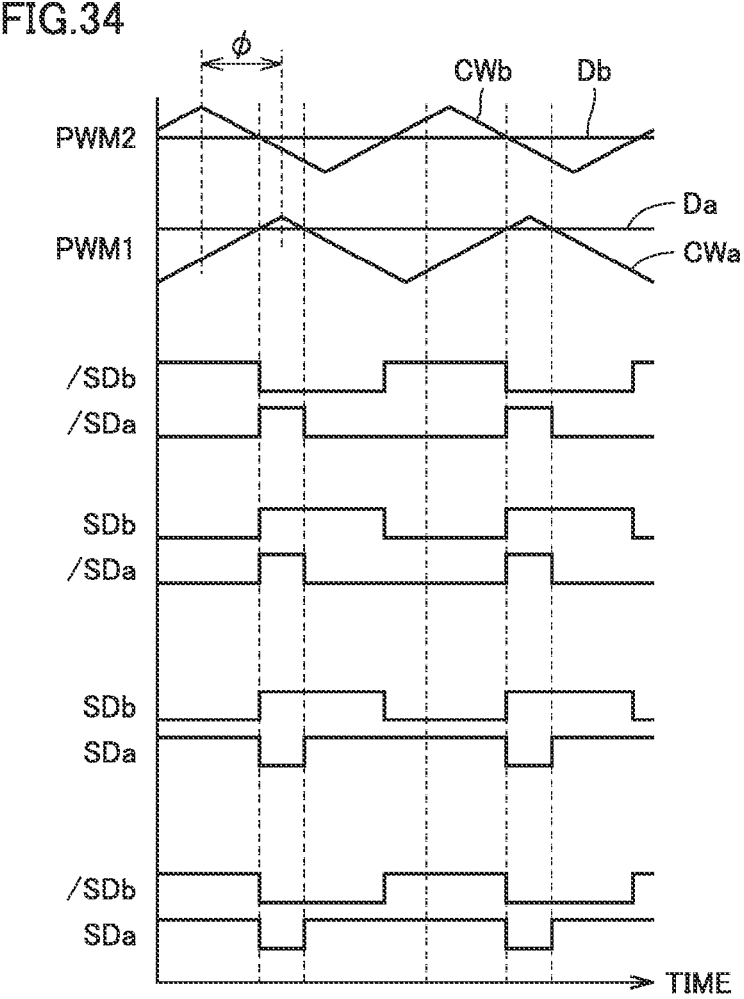
FIG. 34 is a diagram of waveforms showing control pulse signals in the SB mode when carrier phase control is applied.

FIG. 34 shows a diagram of waveforms showing control pulse signals in the SB mode when carrier phase control is applied.

As shown in FIG. 34, control signal SG1 in the PB mode is generated based on the logical sum of control pulse signals /SDa and /SDb. When phase difference φ is set as described above, the rising timing of control pulse signal /SDa and the rising timing of control pulse signal /SDb coincide with each other. Therefore, the duty ratio of control signal SG1 is expressed as DSG1=(1−Da)+(1−Db). That is, DSG1 is expressed by Expression (13) below.

$$DSG1=(Va+Vb)/VH \quad (13)$$

Meanwhile, duly ratio Dc is expressed by Expression (14) below by modifying Expression (3).

$$Dc=1-(Va+Vb)/VH \quad (14)$$

Therefore, when SG1=/SGc holds in accordance with the logical calculation in the SB mode in FIG. 35, duty ratio DSG1 of control signal SG1 is expressed by Expression (15) below.

$$DSG1=1-Dc=(Va+Vb)/VH \quad (15)$$

As described above, when phase difference φ is set in accordance with the above-described carrier phase control, it is possible to generate signals with a duty ratio equal to that of control pulse signal /SDc based on duty ratio Dc by performing logical calculation based on control pulse signals SDa and SDb with duty ratios Da and Db, specifically, the logical sum of /SDa and /SDb. That is, it is possible to generate control signal SG1 in the SB mode based on control pulse signals SDa and SDb.

Figures 35, 36:
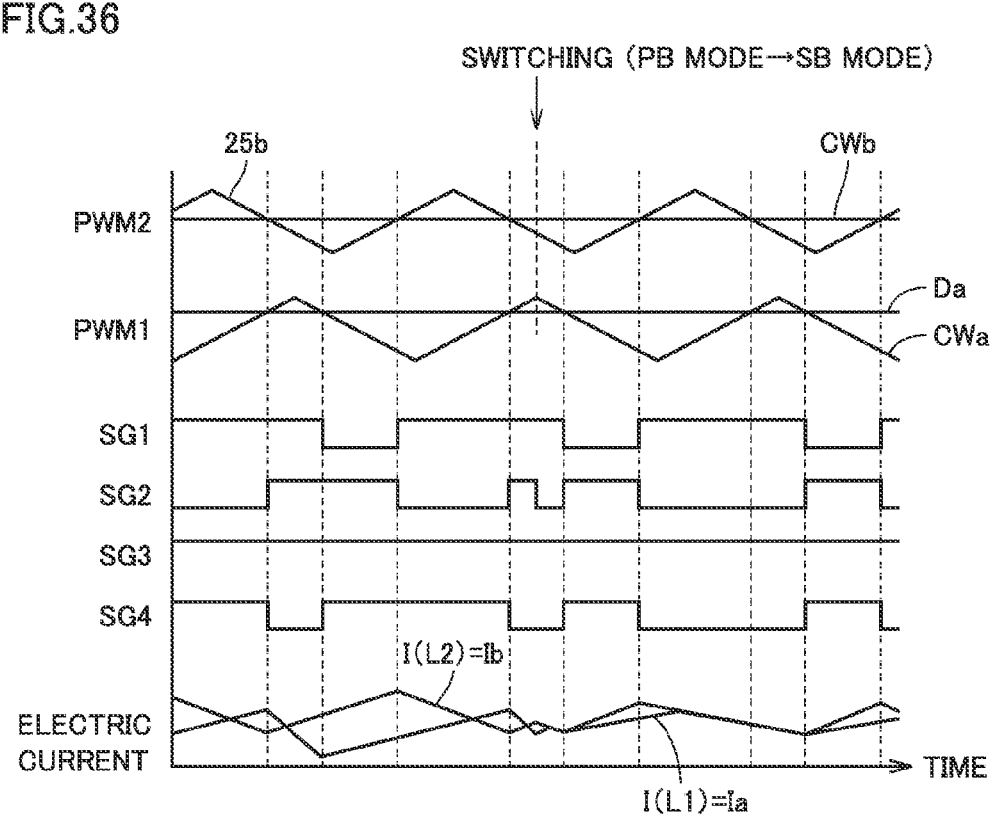
FIG. 35 is a table for describing settings of control signals in the SB mode.
FIG. 36 is a waveform diagram showing an example of operation in the PB mode and the SB mode in power converter control according to the variation of the present first embodiment.

As shown in FIG. 35, control signals SG2 and SG4 in the SB mode are inversion signals of control signal SG1. The result of logical calculation of not (/SDb or /SDa) is the logical product of SDa and SDb (SDb and SDa). Therefore, it is also possible to generate control signals SG2 and SG4 which should be set in accordance with control pulse signal SDc, based on the logical calculation of control pulse signals SDa and SDb.

As described above, the carrier phase control is applied in the SB mode to set phase difference φ such that the pulse transition timing agrees between control pulse signal SDa (/SDa) and control pulse signal SDb (/SDb). By generating carrier waves CWa and CWb so as to have such phase difference φ, control signals SG1 to SG4 which should be set based on duty ratio Dc in the SB mode can be generated from control pulse signals SDa and SDb based on duty ratios Da and Db, as shown in FIG. 35.

Specifically, as described above, control signal SG3 becomes a signal kept at the H level by the logical sum of control pulse signals SDa and SDb. Besides, control signal SG1 can be generated by the logical sum of control pulse signals /SDa and/SDb so as to have an equivalent duty to that in the PWM control based on duty ratio Dc. Control signals SG2 and SG4 set complementarily to control signal SG1 in the SB mode can also be generated based on the logical product of control pulse signals SDa and SDb.

It is noted that phase difference φ in the SB mode can also be calculated based on duty ratios Da and Db calculated in the SB mode, in accordance with previously-set phase difference map storing the relationship between duty ratios Da, Db and phase difference φ, or phase difference calculation formulas, similarly to the carrier phase control in the PB mode.

FIG. 36 shows a waveform diagram showing an example of operation in the PB mode and the SB mode in power converter control according to the variation of the present first embodiment.

Referring to FIG. 36, a command for switching from the PB mode to the SB mode is issued at a peak of carrier wave CWa. Before the issuance of the switching command, control signals SG1 to SG4 are generated based on duty ratios Da and Db calculated by current control of each of DC power supplies 10a and 10b.

When the switching command is issued, control signals SG1 to SG4 in the SB mode can be generated immediately based on control pulse signals SDa and SDb at that time point in accordance with the logical calculation expressions shown in FIG. 35, without newly calculating duty ratio Dc.

Therefore, control signals SG1 to SG4 in the SB mode can be generated using duty ratios Da and Db in common to the other operation modes belonging to the boosting mode including the PB mode. Particularly when switching the operation modes, switching processing between the PB mode and the SB mode can be executed without causing delay in control.

Second Embodiment

In a second embodiment, descriptions will be made on power converter control for controlling the outputs of DC power supplies 10a and 10b in accordance with total power command value PH* described in the first embodiment. In the power converter control according to the second embodiment, the output from each of DC power supplies 10a, 10b is controlled in accordance with power command values Pa* and Pb* through output voltage control (VH control). Thus, in the PB mode in which SOC control is executed in each of DC power supplies 10a, 10b, a suitable control operation logic can be provided.

As will become apparent from the following description, one of the characteristics of power converter control according to the second embodiment lies in that a common control calculation is applied to each operation mode of power converter 50.

Referring again to FIG. 20, a basic concept of power converter control according to the present second embodiment will be described.

Smoothing capacitor CH connected to electric power line 20 is charged/discharged with (PH−PL) obtained by subtracting load power PL from total electric power PH. Output voltage VH equivalent to the voltage across smoothing capacitor CH can be controlled by increasing/decreasing total electric power PH.

Therefore, in the power converter control according to the second embodiment, total power command value PH* is set in accordance with voltage deviation ΔVH of output voltage VH from voltage command value VH*. Furthermore, by distributing total power command value PH* between output power Pa and output power Pb, the output of each of DC power supplies 10a and 10b is subjected to power control (current control).

(Control Operation in PB Mode)

First, among the plurality of operation modes (FIG. 3) of power converter 50, power converter control in the PB mode in which each of electric power Pa and electric power Pb of DC power supplies 10a, 10b can be controlled will be described.

Figure 37:
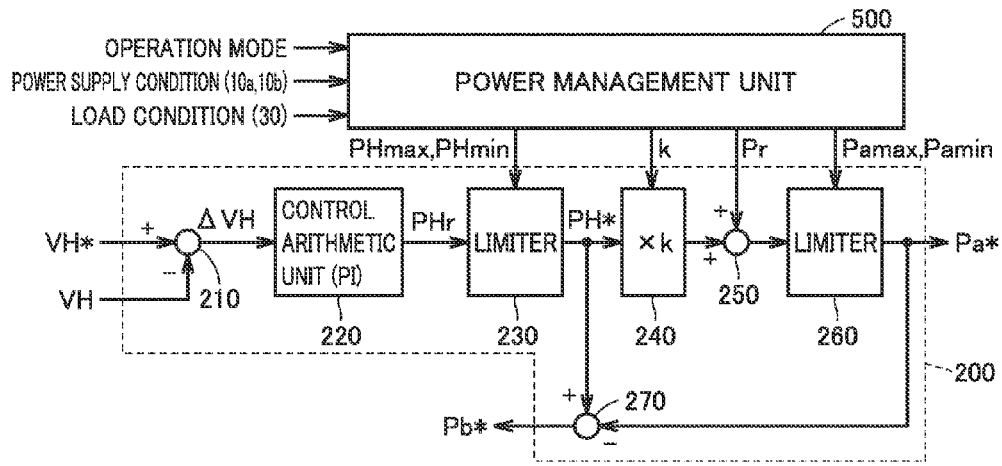
FIG. 37 is a first block diagram for describing power converter control according to a present second embodiment.
Figure 38:
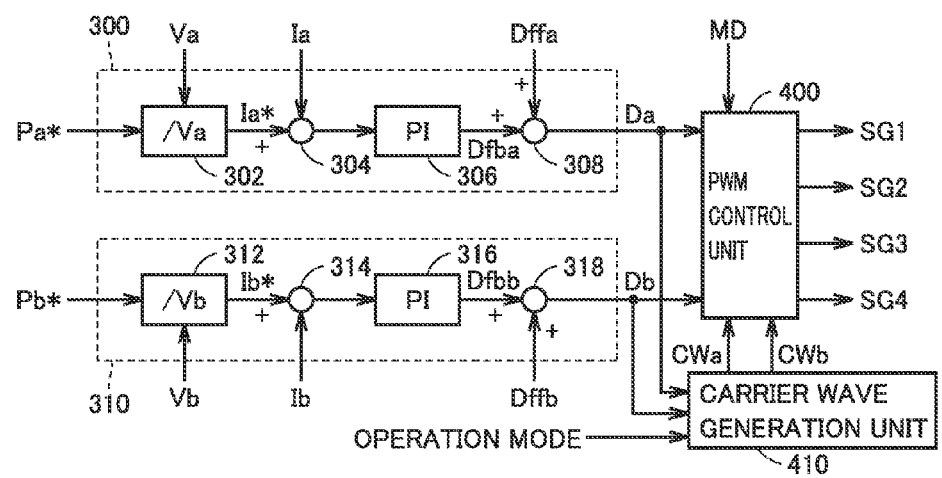
FIG. 38 is a second block diagram for describing the power converter control according to the present second embodiment.

FIGS. 37 and 38 are block diagrams for describing power converter control according to the second embodiment. FIG. 37 shows a configuration for a control calculation for setting a power command value for each DC power supply, and FIG. 38 shows a configuration for a control calculation for controlling the output of each DC power supply in accordance with the set power command value.

Referring to FIG. 37, power management unit 500 is configured similarly to that shown in FIG. 21. Power management unit 500 outputs power upper limit values PHmax, Pamax, power lower limit values PHmin, Pamin, power distribution ratio k, and circulation power value Pr to voltage control unit 200.

Voltage control unit 200 sets power command values Pa* and Pb* for DC power supplies 10a and 10b, based on the voltage deviation of output voltage VH. Voltage control unit 200 has a deviation arithmetic unit 210, a control arithmetic unit 220, a limiter 230, a power distribution unit 240, a circulation power addition unit 250, a limiter 260, and a subtraction unit 270. In the configuration of FIG. 37, the function of a "control arithmetic unit" is implemented by deviation arithmetic unit 210 and control arithmetic unit 220, and the function of a "power command value arithmetic unit" is implemented by power distribution unit 240 and subtraction unit 270. Furthermore, limiter 230 corresponds to a "second protection unit", and the limiter 260 corresponds to a "first protection unit." Power distribution ratio setting unit 570 (FIG. 21) corresponds to a "power distribution ratio setting unit."

Deviation arithmetic unit 210 calculates voltage deviation ΔVH (ΔVH=VH*−VH) in accordance with the difference between voltage command value VH* and a detected value of output voltage VH. Control arithmetic unit 220 calculates total electric power PHr required for voltage control, based on voltage deviation ΔVH. For example, control arithmetic unit 220 sets PHr by a PI operation in accordance with Expression (16) below.

$$PHr = Kp \cdot \Delta VH + \Sigma(Ki \cdot \Delta VH) \quad (16)$$

In Expression (16), Kp is a proportional control gain, and Ki is an integral control gain. A capacitance value of smoothing capacitor CH is also reflected in these control gains. By setting total electric power PHr in accordance with Expression (16), feedback control for reducing voltage deviation ΔVH can be achieved. It is also possible to set total electric power PHr requested in accordance with Expression (17) reflecting load power PL* estimated in accordance with the operating condition of load 30 and the operation command. Then, output voltage VH can be controlled in such a manner as to provide feedforward of power consumption in load 30.

$$PHr = Kp \cdot \Delta VH + \Sigma(Ki \cdot \Delta VH) + PL^* \quad (17)$$

In this way, in the power conversion control according to the second embodiment, total power command value PH* is defined in voltage control unit 200 in a lower level than power management unit 500. In the second embodiment, total power command value PH* in determining the power distribution ratio by power management unit 500 shall be set in accordance with load power PL* (PH*=PL*).

Limiter 230 limits power command value PH* so as to fall within the range of PHmax to PHmin set by power management unit 500. If PHr>PHmax holds, limiter 230 sets PH* at PHmax. Similarly, when PHr<PHmim holds, limiter 230 sets PH* at PHmin. When PHmax≥PHr≥PHmin holds, PH* is set at PHr as it is. Total electric power command value PH* is thereby settled.

Power distribution unit 240 calculates electric power k·PH* for which DC power supply 10a is responsible, based on total electric power command value PH* and power distribution ratio k received from power management unit 500. Circulation power addition unit 250 adds k·Pa* calculated by power distribution unit 240 and circulation power value Pr set by power circulation control unit 560 in power management unit 500 to thereby calculate electric power Par required of DC power supply 10a (Par=k·Pa*+Pr).

Limiter 260 limits power command value Pa* for DC power supply 10a so as to fall within the range of Pamax to Pamin set by power management unit 500. If Par>Pamax holds, limiter 260 modifies Pa* to be Pamax. Similarly, when PHa<Pamim holds, limiter 260 modifies Pa* to be Pamin. When Pamax≥Par≥Pamin holds, Pa* is set at Par as it is. Power command value Pa* for DC power supply 10a is thereby settled.

Subtraction unit 270 subtracts power command value Pa* from total electric power command value PH*, thereby setting power command value Pb* for DC power supply 10b (Pb*=PH*−Pa*).

Figures 39, 40:
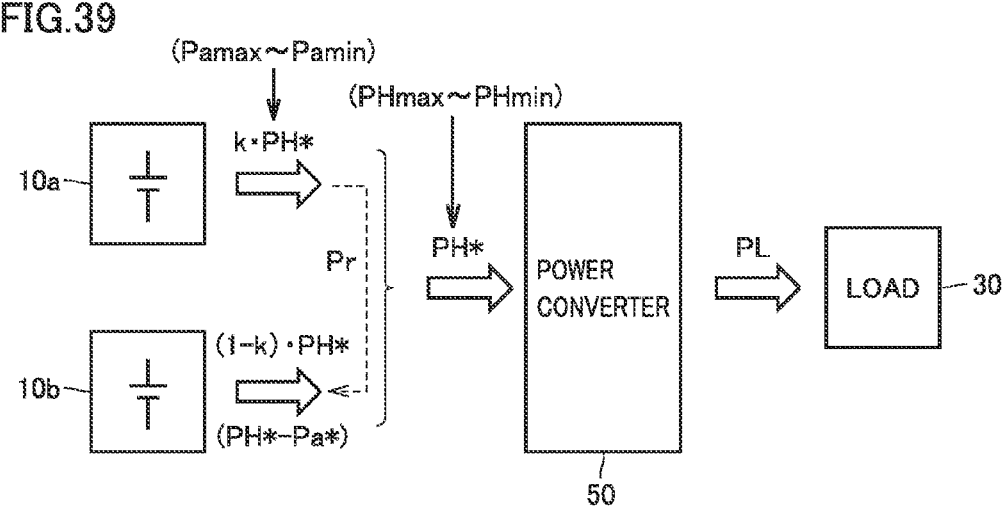
FIG. 39 is a conceptual view for describing a power flow in a power supply system in the PB mode by means of the power converter control according to the second embodiment.
FIG. 40 is a table describing settings of control signals and control data in each operation mode belonging to a boosting mode.

FIG. 39 is a conceptual view for describing a power flow in the power supply system in the PB mode by means of the power converter control according to the second embodiment.

Referring to FIG. 39, total electric power command value PH* necessary for controlling output voltage VH to be voltage command value VH* is distributed between power command values Pa* and Pb* in accordance with power distribution ratio k. That is, setting is basically made such that Pa*=k·PH and Pb*=(1−k)·PH* hold. Accordingly, upon controlling the power distribution between DC power supplies 10a and 10b, electric power in accordance with total electric power command value PH* for controlling output voltage VH can be input/output to/from electric power line 20.

Furthermore, by setting circulation power value Pr, DC power supplies 10a and 10b can be charged/discharged forcedly. By making a setting such that Pr>0 holds, output power of DC power supply 10a can be increased to promote charging of DC power supply 10b. In contrast, by making a setting such that Pr<0 holds, output power of DC power supply 10a can be reduced to promote discharging from DC power supply 10b.

Since power command value Pa* is reliably limited to fall within the range of Pamax to Pamin by limiter 260, DC power supply 10a can be protected from overpower. That is, overcharge and overdischarge of DC power supply 10a can be prevented.

By limiting load power PL by power management unit 500 (traveling control unit 550) to fall within the range of PHmin to PHmax, while reliably limiting total electric power command value PH* by limiter 230 to fall within the range of PHmax to PHmin, DC power supply 10b can also be protected from overpower.

Referring to FIG. 38, control device 40 includes current control units 300, 310 for controlling the outputs from DC power supplies 10a and 10b in accordance with power command values Pa* and Pb*, a PWM control unit 400, and a carrier wave generation unit 410.

Current control unit 300 has a current command generation unit 302, a deviation arithmetic unit 304, a control arithmetic unit 306, and an FF addition unit 308.

Current command generation unit 302 sets a current command value Ia* for DC power supply 10a based on power command value Pa* and a detected value of voltage Va (Ia*=Pa*/Va). Deviation arithmetic unit 304 calculates current deviation ΔIa in accordance with the difference between current command value Ia* and a detected value of electric current Ia (ΔIa=Ia*−Ia). Control arithmetic unit 306 calculates a control amount Dfba for current feedback control based on current deviation ΔIa. For example, control arithmetic unit 306 calculates control amount Dfba by a PI operation in accordance with Expression (18) below.

$$Dfba = Kp \cdot \Delta Ia + /(Ki \cdot \Delta Ia) \tag{18}$$

In Expression (18), Kp is a proportional control gain, and Ki is an integral control gain. These control gains are set independently of Expression (16).

On the other hand, an FF control amount Dffa for voltage feedforward control is set in accordance with Expression (19) in line with Da=(VH−Va)/VH obtained by solving Expression (1) for Da.

$$Dffa = (VH^* - Va)/VH^* \tag{19}$$

FF addition unit 308 adds an FB control amount Dfba and FF control amount Dffa, thereby calculating duty ratio Da for power control of DC power supply 10a. Duty ratio Da corresponds to the duty ratio of a period during which the lower arm element (switching elements S3 and S4) of the boost chopper circuit (FIG. 5) is turned on when performing DC/DC conversion between voltage Va of DC power supply 10a and output voltage VH, similarly to Expression (1).

Similarly, current control unit 310 corresponding to DC power supply 10b has a current command generation unit 312, a deviation arithmetic unit 314, a control arithmetic unit 316, and an FF addition unit 318.

Current command generation unit 312 sets a current command value Ib* for DC power supply 10b based on power command value Pb* and a detected value of voltage Vb (Ib*=Pb*/Vb). Deviation arithmetic unit 314 calculates a current deviation ΔIb (ΔIb=Ib*−Ib) in accordance with the difference between current command value Ib* and a detected value of electric current Ib. Control arithmetic unit 316 calculates a control amount Dfbb for current feedback control based on current deviation ΔIb. For example, control arithmetic unit 316 calculates control amount Dfbb by a PI operation in accordance with Expression (20) below.

$$Dfbb = Kp \cdot \Delta Ib + /(Ki \cdot \Delta Ib) \tag{20}$$

In Expression (20), Kp is a proportional control gain, and Ki is an integral control gain. These control gains are set independently of Expressions (16) and (18).

On the other hand, an FF control amount Dffb for voltage feedforward control is set in accordance with Expression (21) in line with Db=(VH−Vb)/VH obtained by solving Expression (2) for Db. In Expression (21), voltage command value VH* may be a detected value of output voltage VH.

$$Dffb = (VH^* - Vb)/VH^* \tag{21}$$

FF addition unit 318 adds FB control amount Dfbb and FF control amount Dffb, thereby calculating duty ratio Db for power control of DC power supply 10b. Duty ratio Db corresponds to the duty ratio of a period during which the lower arm element (switching elements S2 and S3) of the boost chopper circuit (FIG. 6) is turned on, similarly to Expression (2).

PWM control unit 400 generates control signals SG1 to SG4 for switching elements S1 to S4 by pulse width modulation control based on duty ratios Da and Db set by current control units 300 and 310 as well as carrier waves CWa and CWb received from carrier wave generation unit 410. Since the pulse width modulation control and generation of control signals SG1 to SG4 performed by PWM control unit 400 are executed similarly to those described with reference to FIGS. 7 and 8, detailed description thereof will not be repeated. Carrier wave generation unit 410 preferably generates carrier waves CWa and CWb by applying the carrier phase control described in the variation of the first embodiment.

In the configuration of FIG. 38, current control units 300 and 310 correspond to a "current control unit." Particularly, current control unit 300 corresponds to a "first current control unit", and current control unit 310 corresponds to a "second current control unit." PWM control unit 400 corresponds to a "pulse width modulation unit."

With the power converter control according to the second embodiment as described above, in DC/DC conversion in the PB mode, the voltage deviation of output voltage VH is converted into power command values to perform current control on the outputs of respective DC power supplies 10a and 10b, so that output voltage VH can be controlled to be voltage command value VH*. It is particularly understood that the power converter control according to the second embodiment is suitable for the combination with power management (FIG. 21) reflecting the SOC control described in the first embodiment since the power command value for each of DC power supplies 10a, 10b is set in accordance with power distribution ratio k.

(Control Operation in Other Boosting Modes)

As shown in FIG. 3, the boosting mode in which output voltage VH is controlled to be voltage command value VH* includes the aB mode, the bB mode and the SB mode, in addition to the PB mode. For the aB mode, the bB mode and the SB mode, output voltage VH is also controlled to be voltage command value VH* sharing the control configuration in accordance with FIGS. 37 and 38.

FIG. 40 is a table describing settings of control signals and control data in each operation mode belonging to the boosting mode.

Referring to FIG. 40, the control configurations shown in FIGS. 37 and 38 are shared by the respective operation modes in the boosting mode. The difference between the operation modes is handled by changing power distribution ratio k, a DC power supply for which current feedback control is to be executed, and the operation logic of control signals SG1 to SG4.

As already described, in the PB mode, power distribution ratio k can be set freely within the range where 0≤k≤1.0 holds, and circulation power value Pr can also be set at any value on a control basis. As described above, in the PB mode, electric currents Ia and Ib of both of DC power supplies 10a and 10b are controlled in accordance with current command values Ia* and Ib* set based on the power command value for controlling output voltage VH.

In the aB mode, bidirectional DC/DC conversion is executed between DC power supply 10a and electric power line 20 (load 30) by the boost chopper circuit formed by switching elements S1 to S4 by the switching operation shown at (a) and (b) of FIG. 5, without using DC power supply 10b. Therefore, in the aB mode, switching elements S1 to S4 are controlled in accordance with control pulse signal SDa based on duty ratio Da for controlling the output from DC power supply 10a. Specifically, on/off of switching elements S3 and S4 constituting the lower arm element of the boost chopper circuit shown at (a) and (b) of FIG. 5 is controlled in common in accordance with control pulse signal SDa. Similarly, on/off of switching elements S1 and S2 constituting the upper arm element of the boost chopper circuit is controlled in common in accordance with control pulse signal /SDa.

Referring to FIGS. 40 and 37, also in the aB mode, total electric power command value PH* is set by deviation arithmetic unit 210, control arithmetic unit 220 and limiter 230 based on voltage deviation ΔVH of output voltage VH, similarly to the PB mode. Since DC power supply 10b is not used, power upper limit value PHmax and power lower limit value PHmin supplied to limiter 230 can be set to be equivalent to power upper limit value Pamax and power lower limit value Pamin of DC power supply 10a. Accordingly, in the aB mode, the operation command value for load 30 is generated limitedly within the range where Pamin≤PL*≤Pamax holds.

Since DC power supply 10b is not used in the aB mode (to avoid charging/discharging), circulation power value Pr is fixed at 0. Furthermore, by fixing power distribution ratio k at 1.0, power command value Pa* is set at PH*, while power command value Pb* is set at 0. On this occasion, it is also possible to protect power command value Pa* by limiter 260 from falling outside the range of Pamax to Pamin, that is, to protect DC power supply 10a such that overpower is not produced therein. Therefore, in the aB mode, it is also possible to cause one of limiters 230 and 260 not to operate.

Furthermore, in the configuration of FIG. 38, the current feedback control is executed only for DC power supply 10a. That is, similarly to the PB mode, current control unit 300 calculates duty ratio Da by the feedback control indicated by Expression (18) based on the current deviation between current command value Ia* set in accordance with power command value Pa* and a detected value of electric current Ia as well as the feedforward control indicated by Expression (19) based on the voltage ratio (Da=Dfba+Dfba).

On the other hand, since control pulse signal SDb is unnecessary in the aB mode as described above, the operation of current control unit 310 can be stopped. That is, the calculation of duty ratio Db is stopped.

Figure 41:
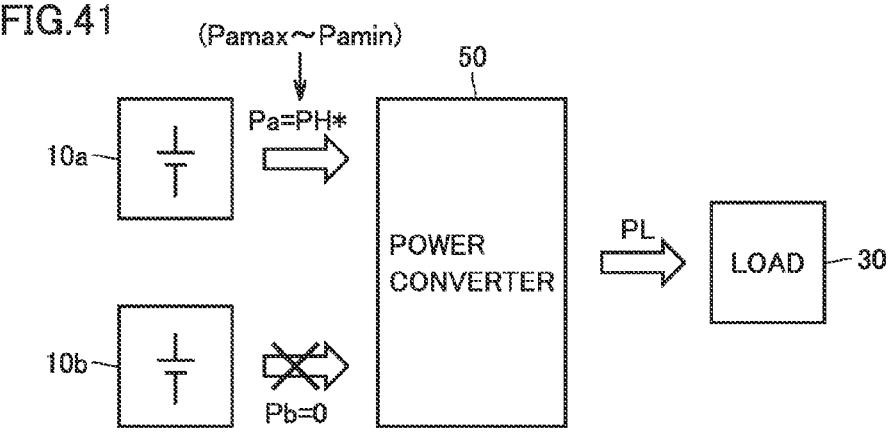
FIG. 41 is a conceptual view for describing a power flow in the power supply system in an aB mode achieved by the power converter control according to the second embodiment.

FIG. 41 shows a conceptual view for describing a power flow in the power supply system in the aB mode.

Referring to FIG. 41, in the aB mode, power command value PH* for controlling output voltage VH to be voltage command value VH* is entirely distributed to DC power supply 10a. That is, load power PL is covered only by DC power supply 10a. Since circulation power value Pr is fixed at 0, the charging/discharging between DC power supplies 10a and 10b does not occur.

Also in the aB mode, power command value Pa* is reliably limited by limiter 260 and/or 290 to fall within the range of Pamax to Pamin. Accordingly, DC power supply 10a used alone can be protected from overpower. By calculating duty ratio Da by the feedback control of electric current Ia of DC power supply 10a in the aB mode, voltage deviation ΔVH can be promptly cancelled as compared to the control for calculating duty ratio Da by the feedback control of output power VH.

In the bB mode, bidirectional DC/DC conversion is executed between DC power supply 10b and electric power line 20 (load 30) by the boost chopper circuit formed by switching elements S1 to S4 by the switching operation shown at (a) and (b) of FIG. 6, without using DC power supply 10a. Therefore, in the bB mode, switching elements S1 to S4 are controlled in accordance with control pulse signal SDb based on duty ratio Db for controlling the output from DC power supply 10b. Specifically, on/off of switching elements S2 and S3 constituting the lower arm element of the boost chopper circuit shown at (a) and (b) of FIG. 6 is controlled in common in accordance with control pulse signal SDb. Similarly, on/off of switching elements S1 and S4 constituting the upper arm element of the boost chopper circuit is controlled in common in accordance with control pulse signal /SDb.

Referring to FIGS. 40 and 37, also in the bB mode, total electric power command value PH* is set based on voltage deviation ΔVH of output voltage VH, similarly to the PB mode and aB mode. Since DC power supply 10a is not used in the bB mode, power upper limit value PHmax and power lower limit value PHmin supplied to limiter 230 can be set to be equivalent to power upper limit value Pbmax and power lower limit value Pbmin of DC power supply 10b. Similarly, circulation power value Pr is fixed at 0.

Furthermore, by fixing power distribution ratio k at 0, power command value Pb* is set at PH*, while power command value Pa* is set at 0. In this case, the limitation by limiter 260 is unnecessary. That is, in the bB mode, DC power supply 10b can be directly protected from overpower by limiter 230.

Furthermore, in the configuration of FIG. 38, the current feedback control is executed only for DC power supply 10b. That is, similarly to the PB mode, current control unit 310 calculates duty ratio Db by the feedback control indicated by Expression (20) based on the current deviation between current command value Ib* set in accordance with power command value Pb* and a detected value of electric current Ib as well as the feedforward control indicated by Expression (21) based on the voltage ratio (Db=Dfbb+Dfbb).

On the other hand, since control pulse signal SDa is unnecessary in the bB mode as described above, the operation of current control unit 300 can be stopped. That is, the calculation of duty ratio Da is stopped.

Figure 42:
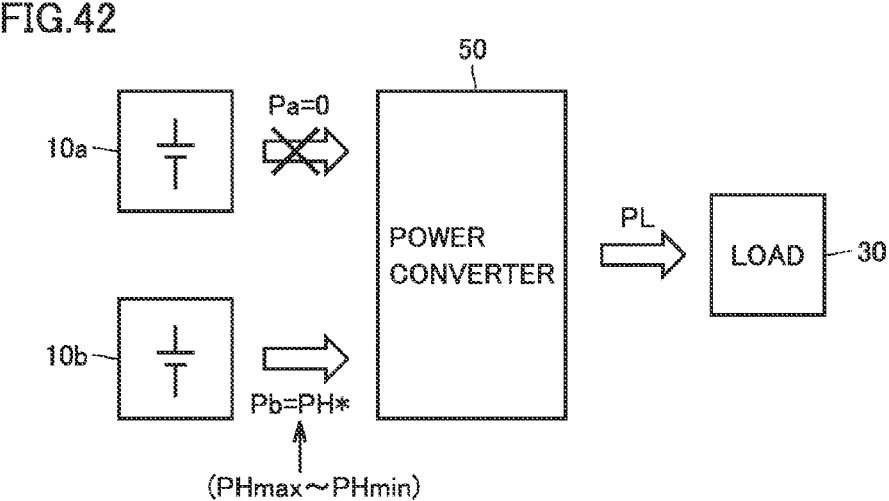
FIG. 42 is a conceptual view for describing a power flow in the power supply system in a bB mode achieved by the power converter control according to the second embodiment.

FIG. 42 shows a conceptual view for describing a power flow in the power supply system in the bB mode.

Referring to FIG. 42, in the bB mode, power command value PH* required for controlling output voltage VH to be voltage command value VH* is entirely distributed to DC power supply 10b. That is, load power PL is covered only by DC power supply 10b. Since circulation power value Pr is fixed at 0, the charging/discharging between DC power supplies 10a and 10b does not occur.

Also in the bB mode, power upper limit value PHmax and power lower limit value PHmin supplied to limiter 230 can be set to be equivalent to power upper limit value Pbmax and power lower limit value Pbmin of DC power supply 10b. Accordingly, power command value Pb* is reliably limited to fall within the range of Pbmax to Pbmin. In the bB mode, the operation command value for load 30 will be generated limitedly within the range where Pbmin≤PL≤Pbmax holds. As a result, DC power supply 10b used alone can be protected from overpower. By performing the feedback control of electric current Ib of DC power supply 10b in the bB mode, occurred voltage deviation ΔVH can be promptly cancelled as compared to the control for directly cancelling DC voltage VH by feedback control.

Next, a control operation in the SB mode will be described.

Figure 43:
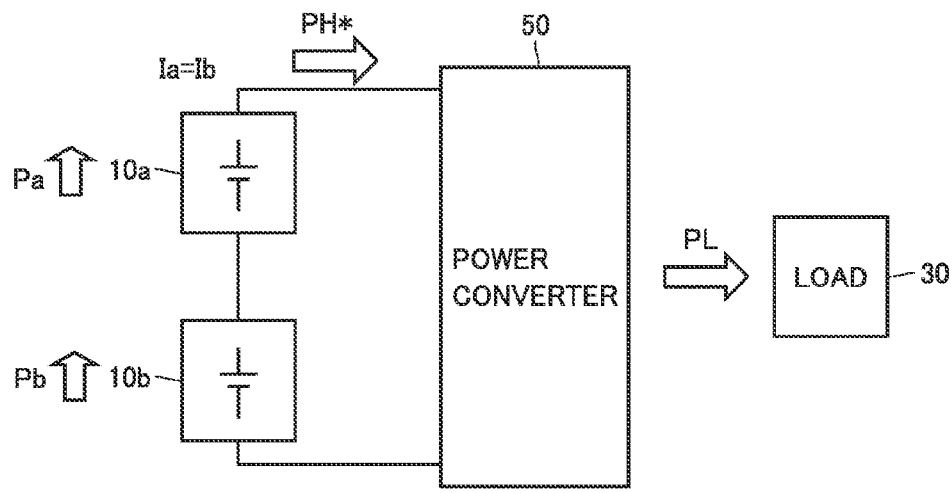
FIG. 43 is a conceptual view for describing a power flow in the power supply system in the SB mode achieved by the power converter control according to the second embodiment.

FIG. 43 shows a conceptual view for describing a power flow in the power supply system in the SB mode.

Referring to FIG. 43, in the SB mode, bidirectional DC/DC conversion is executed between DC power supplies 10a, 10b connected in series and electric power line 20 (load 30). Therefore, a common electric current flows through DC power supply 10a and DC power supply 10b (Ia=Ib). For this reason, output power Pa of DC power supply 10a and output power Pb of DC power supply 10b cannot be controlled directly. That is, the ratio between electric power Pa and electric power Pb in the SB mode is automatically determined by the ratio between voltages Va and Vb in accordance with Expression (4) above.

Referring again to FIG. 41, in the SB mode, power distribution ratio k is set based on the present values (detected values) of voltages Va and Vb of DC power supplies 10a and 10b in accordance with Expression (22) obtained in line with Expression (4).

$$k=Va/(Va+Vb) \tag{22}$$

Since the charging/discharging between DC power supplies 10a and 10b cannot be performed in the SB mode, circulation power value Pr is set at 0.

Accordingly, in the configuration of FIG. 37, total electric power command value PH* is set based on voltage deviation ΔVH of output voltage VH, similarly to the SB mode. Total electric power command value PH* can be set by limiter 230 to fall within the range of PHmax to PHmin. Furthermore, in accordance with Expression (11), total electric power command value PH* is distributed between power command values Pa* and Pb* in accordance with power distribution ratio k between DC power supplies 10a and 10b connected in series based on voltages Va and Vb at present. On this occasion, power command value Pa* is limited by limiter 260 to fall within the range of Pamax to Pamin.

Since Ia=Ib holds in the SB mode as shown in FIG. 43, current feedback control is executed for only one of DC power supplies 10a and 10b. For example, current feedback control is executed for DC power supply 10a for which the power command value can be directly limited, that is, which is strictly protected from overpower.

Referring again to FIG. 38, current control unit 300 calculates duty ratio Da by the feedback control indicated by Expression (12) based on the current deviation between current command value Ia* set in accordance with power command value Pa* and a detected value of electric current Ia as well as the feedforward control based on the voltage ratio indicated by Expression (19) (Da=Dfba+Dfba), similarly to the PB mode.

On the other hand, current feedback control is not executed in current control unit 310 by setting the control gains in control arithmetic unit 316, specifically, Kp and Ki in Expression (20), at zero. Therefore, current control unit 310 calculates duty ratio Db only by the feedforward control based on voltage Vb (Db=Dffb). FF control amount Dffb can be set in accordance with Expression (21).

PWM control unit 400 generates control signals SG1 to SG4 for switching elements S1 to S4 by the pulse width modulation control based on duty ratios Da and Db set by current control units 300 and 310 as well as carrier waves CWa and CWb received from carrier wave generation unit 410. As described above, also in the SB mode, by combining the carrier phase difference control described in the variation of the first embodiment, control signals SG1 to SG4 in the SB mode can be generated using control pulse signals SDa (/SDa) and SDb (/SDb) (FIG. 35).

Furthermore, since duty ratio Da can be calculated by the current feedback control for DC power supply 10a, voltage deviation ΔVH in the SB mode can be promptly cancelled, as compared to the control of calculating the duty ratio (Dc) by the feedback control of output voltage VH. Moreover, since the operation modes can be smoothly switched by sharing the control calculation among the respective operation modes, controllability can be improved further.

As described above, with the power converter control according to the present second embodiment, for the control operation of power converter 50 shown in FIG. 1, the control configurations shown in FIGS. 37 and 38 can be shared among the respective operation modes belonging to the boosting mode of controlling output voltage VH to be voltage command value VH*.

Specifically, by switching power distribution ratio k as well as the control gains for current control units 300 and 310 among the operation modes, it is possible to apply the common control calculation in accordance with FIGS. 37 and 38 to the respective operation modes. Therefore, it is possible to reduce a control calculation load in control of power converter 50 in which a plurality of operation modes are selectively applied.

It is noted that although the present embodiment has described hybrid vehicle 1000 as an example of electric-powered vehicle on which a powertrain having a power generation mechanism is mounted, the application of the present invention is not limited to such a case. That is, in the application of the present invention, the powertrain mounted on the electric-powered vehicle can have any configuration as long as it has a mechanism (power generation mechanism) capable of actively generating electric power for charging DC power supplies 10a, 10b during vehicle traveling or during a vehicle stop. It is noted that in order to configure a power generation mechanism, a motive power source (e.g., the engine illustrated in the present embodiment, or a fuel cell or the like) different from motor-generators that generate vehicle driving force using electric power of a plurality of DC power supplies needs to be mounted on the electric-powered vehicle. That is, the electric-powered vehicle includes both a hybrid vehicle on which an engine and an electric motor (motor-generator) are mounted, and a fuel-cell vehicle on which an engine is not mounted. For example, in a fuel-cell vehicle, an operation command (output power command) for a fuel cell can be set reflecting the SOC control (charging/discharging request power value Pchg) described in the present embodiment.

Also in the application to a hybrid vehicle, the configuration of the powertrain is not limited to the illustration in the present embodiment to which the power split device implemented by the planetary gear is applied, including the number of motor-generators disposed.

For example, even with a configuration in which the engine and only one motor-generator are disposed, electric power for charging DC power supplies can be generated by providing a specific mode of generating electric power by the motor-generator outputting negative torque serving as a traveling load during vehicle traveling. In this case, a power generation mechanism will be configured by using the motor-generator for generating vehicle driving force in the above-mentioned specific mode. In this way, the power generation mechanism is not necessarily limited to an element different from a motor-generator for traveling. It is noted that in the specific mode, control can be exerted such that the engine outputs total power including requested power for vehicle traveling and charging request power for DC power supplies, similarly to the present embodiment.

Alternatively, the configuration where an engine and a plurality of motor-generators are mounted may be provided with a motor-generator dedicated to power generation by means of engine output separately from a motor-generator for traveling. Also in this case, operation commands for the engine and the motor-generators can be set reflecting the SOC control (charging/discharging request power value Pchg) described in the present embodiment.

It is noted that although the present embodiment has illustrated power converter 50# that executes DC/DC conversion between two DC power supplies 10a, 10b and common electric power line 20, the configuration of the power converter is not limited to this example. That is, as long as a power converter connected across a plurality of arbitrary DC power supplies and an electric power line connected to a load mounted on an electric-powered vehicle is configured to operate with one of a plurality of operation modes different in the manner of power conversion between the plurality of DC power supplies and the electric power line being applied, thereby controlling the voltage of the electric power line, the present invention is applicable when the power converter is used for a power supply system of an electric-powered vehicle.

It should be understood that the embodiments disclosed herein are illustrative and non-restrictive in every respect. The scope of the present invention is defined by the claims not by the description above, and is intended to include any modification within the meaning and scope equivalent to the terms of the claims.

REFERENCE SIGNS LIST 5 power supply system; 10a, 10b DC power supply; 15 line; 20 electric power line; 21 ground line; 30 load; 40 control device; 50 power converter; 101, 102 operating point; 105 operation line; 106 equivalent power line; 110, 120 active region; 115 engine; 130 power split device; 131 sun gear; 132 pinion gear; 133 carrier; 134 ring gear; 140 reduction gear; 145 drive wheel; 150, 151, 160, 161, 170-174 current path; 180, 190 inverter; 182, 192 neutral point; 200 voltage control unit; 210, 304, 314 deviation arithmetic unit; 220, 306, 316 control arithmetic unit; 230, 260 limiter; 240 power distribution unit; 250 circulation power addition unit; 270 subtraction unit; 300, 310 current control unit; 302, 312 current command generation unit; 308, 318 addition unit; 400 PWM control unit; 410 carrier wave generation unit; 500 power management unit; 510 power upper limit value setting unit; 510# power lower limit value setting unit; 512 arithmetic unit; 530a, 530b SOC control unit; 520 driving power setting unit; 540 charging/discharging request power setting unit; 550 traveling control unit; 560 power circulation control unit; 570 power distribution ratio setting unit; 1000 hybrid vehicle; CH smoothing capacitor; CW, CWa, CWb carrier wave; D1-D4 antiparallel diode; Da, Db, Dc duty ratio; Dfba, Dfbb control amount (FB); Dffa, Dffb control amount (FF); Ia, Ib electric current (DC power supply); Ia*, Ib* current command value; L1, L2 reactor; N1, N2, N3 node; Ne engine speed; PH total electric power; PH* total power command value; PHmax total power upper limit value; PHmin total power lower limit value; PL load power; Pa, Pb electric power (DC power supply); Pa*, Pb* power command value; Pchg charging/discharging request power value; Pchga, Pchgb charging request power; Pdr driving power; Pe engine request power; Pr circulation power value; Pth threshold value; S1-S4 switching element; SDa, SDb, SDc control pulse signal; SG1-SG4 control signal; Sr control central value (SOC); Ta, Tb temperature (DC power supply); Te engine torque; V vehicular speed; VH output voltage; VH* output voltage command value; Va, Va voltage (DC power supply); k power distribution ratio.

The invention claimed is:

1. A power supply system in which a powertrain of an electric-powered vehicle configured to include a first motor-generator for generating vehicle driving force serves as a load, the power supply system comprising:

an electric power line electrically connected to said load;
a plurality of DC power supplies;
a power converter connected across said plurality of DC power supplies and said electric power line; and
a control device configured to control operations of said load and said power converter,
said load being configured to have a power generation mechanism for generating electric power for charging said plurality of DC power supplies during vehicle traveling or during a vehicle stop, in accordance with an operation command from said control device,
said power converter including a plurality of switching elements and being configured to control a voltage of said electric power line by operating with one operation mode among a plurality of operation modes being applied, the plurality of operation modes being different in a manner of power conversion between said plurality of DC power supplies and said electric power line,
said plurality of operation modes including:
 a first mode of executing DC voltage conversion in parallel between each of said plurality of DC power supplies and said electric power line by controlling on/off of said plurality of switching elements, and
 a second mode of executing DC voltage conversion between said plurality of DC power supplies connected in series and said electric power line by controlling on/off of said plurality of switching elements,
said control device including
 a charging/discharging control unit configured to make a charging/discharging request power setting for said plurality of DC power supplies, so as to bring a SOC of each of said plurality of DC power supplies close to a control target, and
 an operation command generation unit configured to generate an operation command for said load so as to ensure driving request power based on a traveling condition of said electric-powered vehicle said charging/discharging request power setting,
said plurality of DC power supplies being implemented by a first DC power supply and a second DC power supply having different capacities, and
said charging/discharging control unit in said first mode, adjusting said charging/discharging request power setting so as to bring SOC of each of said first and second DC power supplies close to the control target, and in said second mode, adjusting said charging/discharging request power setting so as to bring SOC of one DC power supply having lower capacity than the other of said first and second DC power supplies close to the control target.

2. The power supply system according to of claim 1, wherein said control device includes
a control arithmetic unit configured to calculate overall input/output power from said first and second DC power supplies as a whole to the electric power line based on a deviation between a voltage detection value of said electric power line and a voltage command value,
a power distribution ratio setting unit configured to switch a power distribution ratio between said first and second DC power supplies in accordance with a change of said operation mode,
a power command value arithmetic unit configured to set a first power command value for said first DC power supply and a second power command value for said second DC power supply in accordance with said overall input/output power and said power distribution ratio, a first current control unit configured to calculate a first duty ratio for controlling output from said first DC power supply based on a deviation of a current detection value of said first DC power supply from a first current command value obtained by dividing said first power command value by an output voltage of said first DC power supply, a second current control unit configured to calculate a second duty ratio for controlling output from said second DC power supply based on a deviation of a current detection value of said second DC power supply from a second current command value obtained by dividing said second power command value by an output voltage of said second DC power supply, and a pulse width modulation unit configured to generate on/off control signals for said plurality of switching elements based on first and second control pulse signals respectively obtained in accordance with pulse width modulation by comparing a first carrier wave and said first duty ratio and comparing a second carrier wave and said second duty ratio.

3. A power supply system
in which a powertrain of an electric-powered vehicle configured to include a first motor-generator for generating vehicle driving force serves as a load, the power supply system comprising:
an electric power line electrically connected to said load;
a plurality of DC power supplies;
a power converter connected across said plurality of DC power supplies and said electric power line; and
a control device configured to control operations of said load and said power converter,
said load being configured to have a power generation mechanism for generating electric power for charging said plurality of DC power supplies during vehicle traveling or during a vehicle stop, in accordance with an operation command from said control device,
said power converter including a plurality of switching elements and being configured to control a voltage of said electric power line by operating with one operation mode among a plurality of operation modes being applied, the plurality of operation modes being different in a manner of power conversion between said plurality of DC power supplies and said electric power line,
said control device including
  a charging/discharging control unit configured to make a charging/discharging request power setting for said plurality of DC power supplies, so as to bring a SOC of each of said plurality of DC power supplies close to a control target, and
  an operation command generation unit configured to generate an operation command for said load so as to ensure driving request power based on a traveling condition of said electric-powered vehicle and said charging/discharging request power setting,
said charging/discharging control unit switching said charging/discharging request power setting in accordance with said operation mode, wherein
said plurality of DC power supplies are implemented by a first DC power supply and a second DC power supply having different capacities,
said plurality of switching elements include
  a first switching element electrically connected across a first node and said electric power line,
  a second switching element electrically connected across a second node and said first node,
  a third switching element electrically connected across a third node, electrically connected to a negative electrode terminal of said second DC power supply, and said second node, and
  a fourth switching element electrically connected across a negative electrode terminal of said first DC power supply and said third node,
said power converter further includes
  a first reactor electrically connected across said second node and a positive electrode terminal of said first DC power supply, and
  a second reactor electrically connected across said first node and a positive electrode terminal of said second DC power supply,
said plurality of operation modes include:
  a first mode of executing DC voltage conversion in parallel between said first and second DC power supplies and said electric power line by controlling on/off of said first to fourth switching elements, and
  a second mode of executing DC voltage conversion between said first and second DC power supplies connected in series and said electric power line by keeping said third switching element on and controlling on/off of said first, second and fourth switching elements, and
said charging/discharging control unit, in said first mode, sets said charging/discharging request power so as to bring a SOC of each of said first and second DC power supplies close to a control target, and in said second mode, sets said charging/discharging request power so as to bring SOC of one DC power supply having lower capacity than the other of said first and second DC power supplies close to the control target.

4. The power supply system according to claim 3, wherein said plurality of operation modes further include a third mode in which said first to fourth switching elements are kept on/off to maintain the state where said first and second DC power supplies are connected in series with said electric power line, and
said charging/discharging control unit, in said third mode, sets said charging/discharging request power so as to bring SOC of said one DC power supply having lower capacity than the other of said first and second DC power supplies close to the control target.

5. The power supply system according to claim 4, wherein said plurality of operation modes further include
  a fourth mode of executing DC voltage conversion between one of said first and second DC power supplies and said electric power line by controlling on/off of said first to fourth switching elements, and maintaining the state where the other one of said first and second DC power supplies is electrically disconnected from said electric power line, and
  a fifth mode of keeping on/off of said first to fourth switching elements to maintain the state where one of said first and second DC power supplies is electrically connected to said electric power line and the other one of said first and second DC power supplies is electrically disconnected from said electric power line, and
said charging/discharging control unit, in each of said fourth and fifth modes, sets said charging/discharging request power so as to bring SOC of said one of said first and second DC power supplies close to the control target.

6. The power supply system according to claim 3, wherein said control device forcedly selects said first mode when present SOC in said first or second DC power supply reaches a control upper limit value or a control lower limit value.

7. The power supply system according to claim 3, wherein said control device includes a control arithmetic unit configured to calculate overall input/output power from said first and second DC power supplies as a whole to the electric power line based on a deviation between a voltage detection value of said electric power line and a voltage command value, a power distribution ratio setting unit configured to switch a power distribution ratio between said first and second DC power supplies in accordance with a change of said operation mode, a power command value arithmetic unit configured to set a first power command value for said first DC power supply and a second power command value for said second DC power supply in accordance with said overall input/output power and said power distribution ratio, a first current control unit configured to calculate a first duty ratio for controlling output from said first DC power supply based on a deviation of a current detection value of said first DC power supply from a first current command value obtained by dividing said first power command value by an output voltage of said first DC power supply, a second current control unit configured to calculate a second duty ratio for controlling output from said second DC power supply based on a deviation of a current detection value of said second DC power supply from a second current command value obtained by dividing said second power command value by an output voltage of said second DC power supply, and a pulse width modulation unit configured to generate on/off control signals for said first to fourth switching elements based on first and second control pulse signals respectively obtained in accordance with pulse width modulation by comparing a first carrier wave and said first duty ratio and comparing a second carrier wave and said second duty ratio.

* * * * *

UNITED STATES PATENT AND TRADEMARK OFFICE
CERTIFICATE OF CORRECTION

PATENT NO. : 9,555,714 B2
APPLICATION NO. : 14/897028
DATED : January 31, 2017
INVENTOR(S) : Shuji Tomura et al.

Page 1 of 1

It is certified that error appears in the above-identified patent and that said Letters Patent is hereby corrected as shown below:

In the Specification

At Column 41, Line 9, change the content from:
"$Dfba = Kp \cdot \Delta Ia + I(Ki \cdot \Delta Ia)$"
To:
"$Dfba = Kp \cdot \Delta Ia + \Sigma (Ki \cdot \Delta Ia)$"

At Column 41, Line 43, change the content from:
"$Dfbb = Kp \cdot \Delta Ib + I (Ki \cdot \Delta Ib)$"
To:
"$Dfbb = Kp \cdot \Delta Ib + \Sigma (Ki \cdot \Delta Ib)$"

At Column 48, Line 39, change the content from:
"vehicle said"
To:
"vehicle and said"

Signed and Sealed this
Twenty-fourth Day of July, 2018

Andrei Iancu
*Director of the United States Patent and Trademark Office*